US012613220B2

(12) United States Patent
Lim et al.

(10) Patent No.: US 12,613,220 B2
(45) Date of Patent: Apr. 28, 2026

(54) ELECTROPHORESIS SYSTEM AND METHODS

(71) Applicants: Life Technologies Holdings PTE Limited, Singapore (SG); Life Technologies Corporation, Carlsbad, CA (US)

(72) Inventors: Beng Heng Lim, Singapore (SG); Wuh Ken Loh, Singapore (SG); Hwee Siong Kuah, Singapore (SG); Jing Han Wong, Singapore (SG); Jefferson Cruz Gangcuangco, Singapore (SG); Jin Xin Ong, Singapore (SG); Soo Yong Lau, Singapore (SG); Yanping Xu, Singapore (SG); Victor Shapiro, San Diego, CA (US); Zhi Da Teh, Singapore (SG); Chee Woei Chong, Singapore (SG); Kuan Moon Boo, Singapore (SG)

(73) Assignees: LIFE TECHNOLOGIES HOLDINGS PTE LIMITED, Singapore (SG); LIFE TECHNOLOGIES CORPORATION, Carlsbad, CA (US)

( * ) Notice: Subject to any disclaimer, the term of this patent is extended or adjusted under 35 U.S.C. 154(b) by 487 days.

(21) Appl. No.: 18/084,587

(22) Filed: Dec. 20, 2022

(65) Prior Publication Data
US 2023/0221280 A1     Jul. 13, 2023

Related U.S. Application Data

(60) Provisional application No. 63/292,318, filed on Dec. 21, 2021.

(51) Int. Cl.
*G01N 27/447*          (2006.01)

(52) U.S. Cl.
CPC .............................. *G01N 27/44721* (2013.01)

(58) Field of Classification Search
None
See application file for complete search history.

(56) References Cited

U.S. PATENT DOCUMENTS 5,582,702 A     12/1996  Cabilly et al.
D895,841 S       9/2020  Mathers et al.
(Continued)

FOREIGN PATENT DOCUMENTS

CN          108490204 A      9/2018
CN          304876031       11/2018
(Continued)

OTHER PUBLICATIONS

PCT/US2022/053452, International Search Report and Written Opinion, May 12, 2023, 20 pages.

*Primary Examiner* — J. Christopher Ball
(74) *Attorney, Agent, or Firm* — Priya D. Subramony

(57)          ABSTRACT
A gel electrophoresis system includes a base module and a camera module. The base module includes a cassette slot for receiving a gel electrophoresis cassette, and a light element that functions to illuminate the gel electrophoresis cassette. The camera module is selectively attachable to and detachable from the base module. When attached to the base module, the camera module facilitates imaging of the gel electrophoresis cassette and provides additional imaging capabilities.

26 Claims, 58 Drawing Sheets

(56)  References Cited

U.S. PATENT DOCUMENTS

| | | | |
|---|---|---|---|
| 2013/0242099 A1 * | 9/2013 | Sauer | H04N 23/57 |
| | | | 348/148 |
| 2016/0061774 A1 | 3/2016 | Updyke et al. | |
| 2022/0261943 A1 * | 8/2022 | Cho | B25J 9/1697 |

FOREIGN PATENT DOCUMENTS

| | | | | |
|---|---|---|---|---|
| CN | 109314625 | A | 2/2019 | |
| CN | 307088455 | | 1/2022 | |
| JP | 3921083 | B2 | 5/2007 | |
| JP | D1423653 | | 9/2011 | |
| KR | 101185912 | B1 | 9/2012 | |
| WO | WO-2005111587 | A1 * | 11/2005 | G01N 21/6456 |

* cited by examiner

Gel Electrophoresis System — 100

812

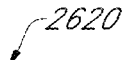
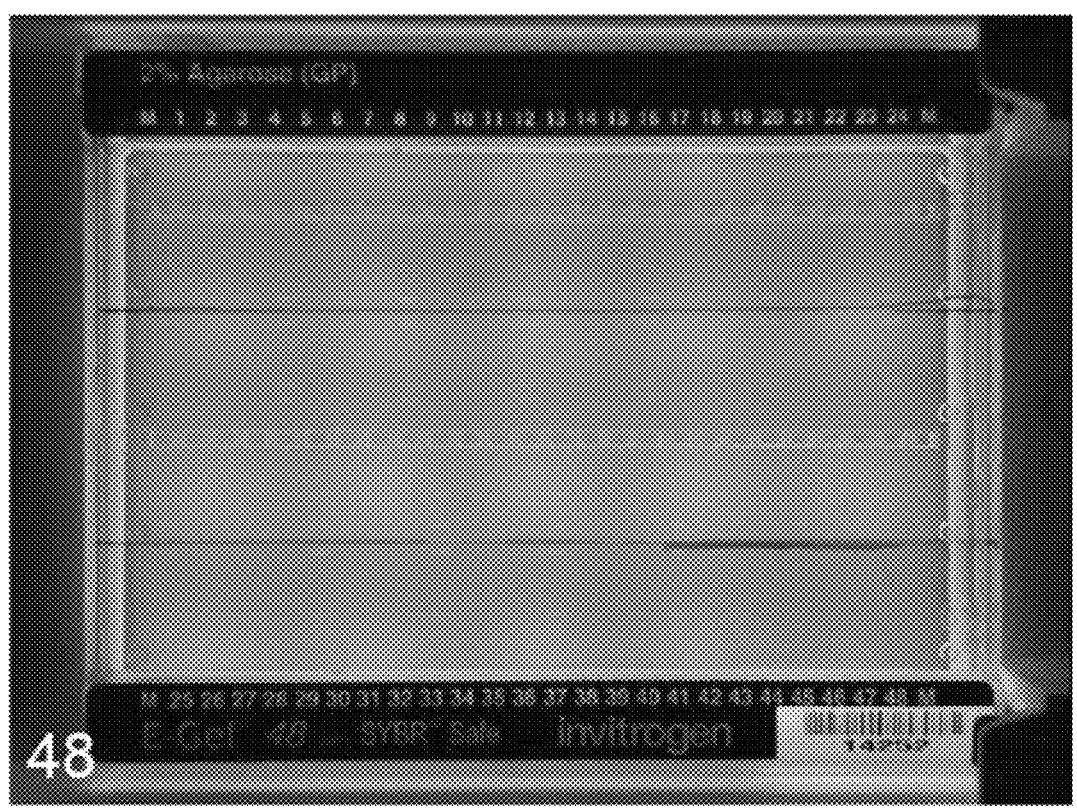
FIG. 26B

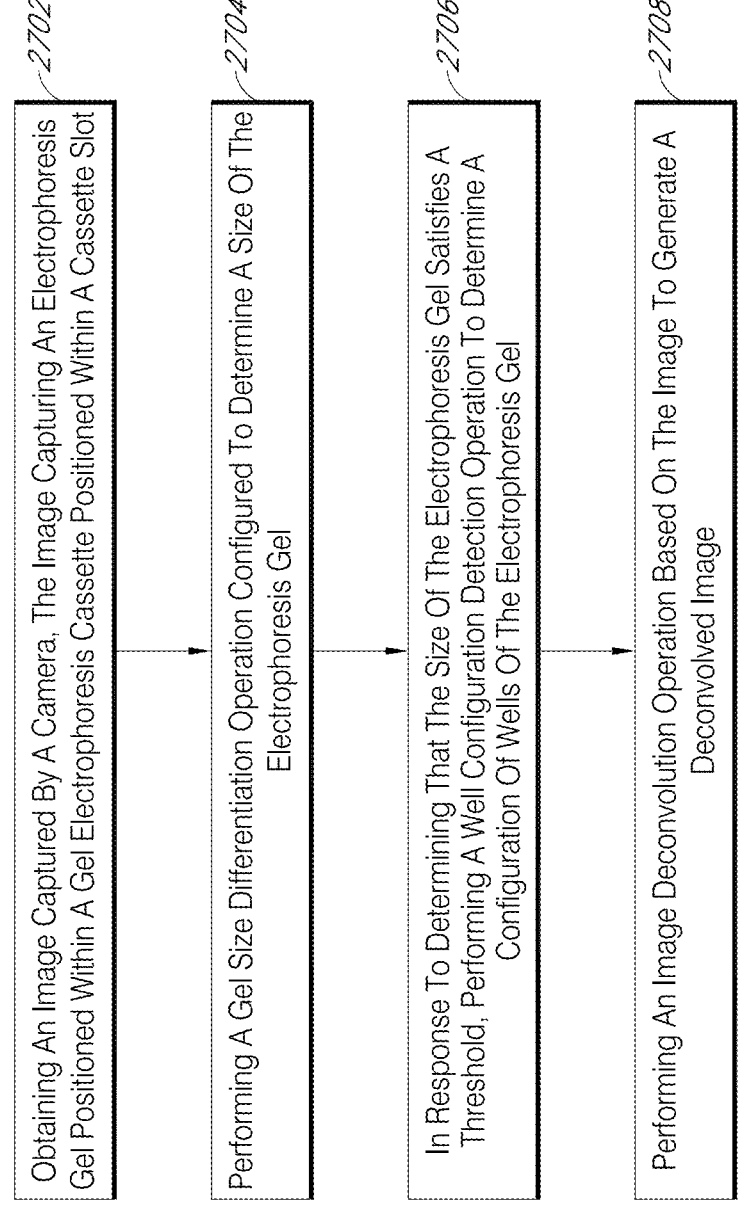

2700

Obtaining An Image Captured By A Camera, The Image Capturing An Electrophoresis Gel Positioned Within A Gel Electrophoresis Cassette Positioned Within A Cassette Slot — 2702

Performing A Gel Size Differentiation Operation Configured To Determine A Size Of The Electrophoresis Gel — 2704

In Response To Determining That The Size Of The Electrophoresis Gel Satisfies A Threshold, Performing A Well Configuration Detection Operation To Determine A Configuration Of Wells Of The Electrophoresis Gel — 2706

Performing An Image Deconvolution Operation Based On The Image To Generate A Deconvolved Image — 2708

Region Of Interest
Operation — 2902

2906

Region Of Interest Operation ~2902

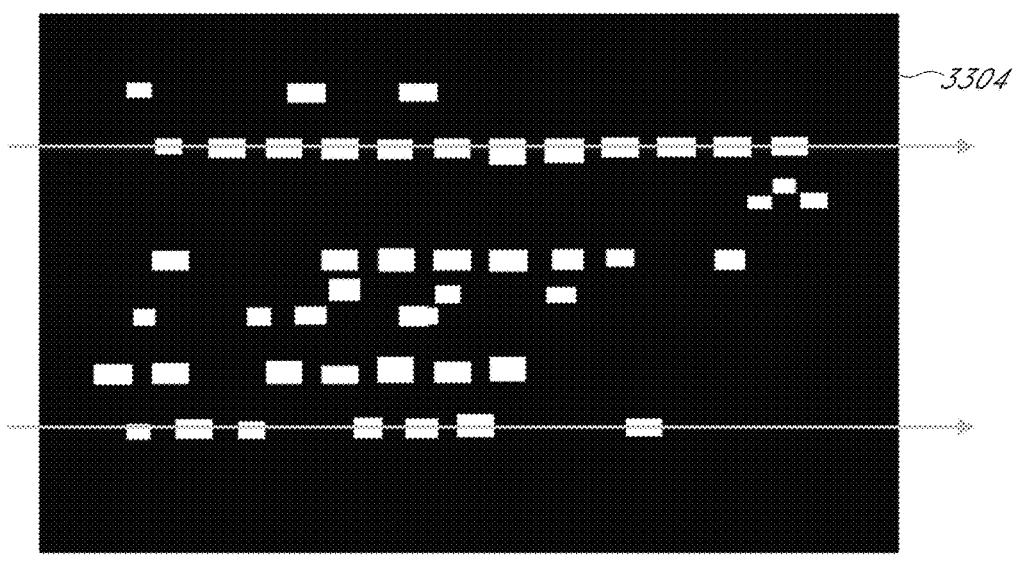
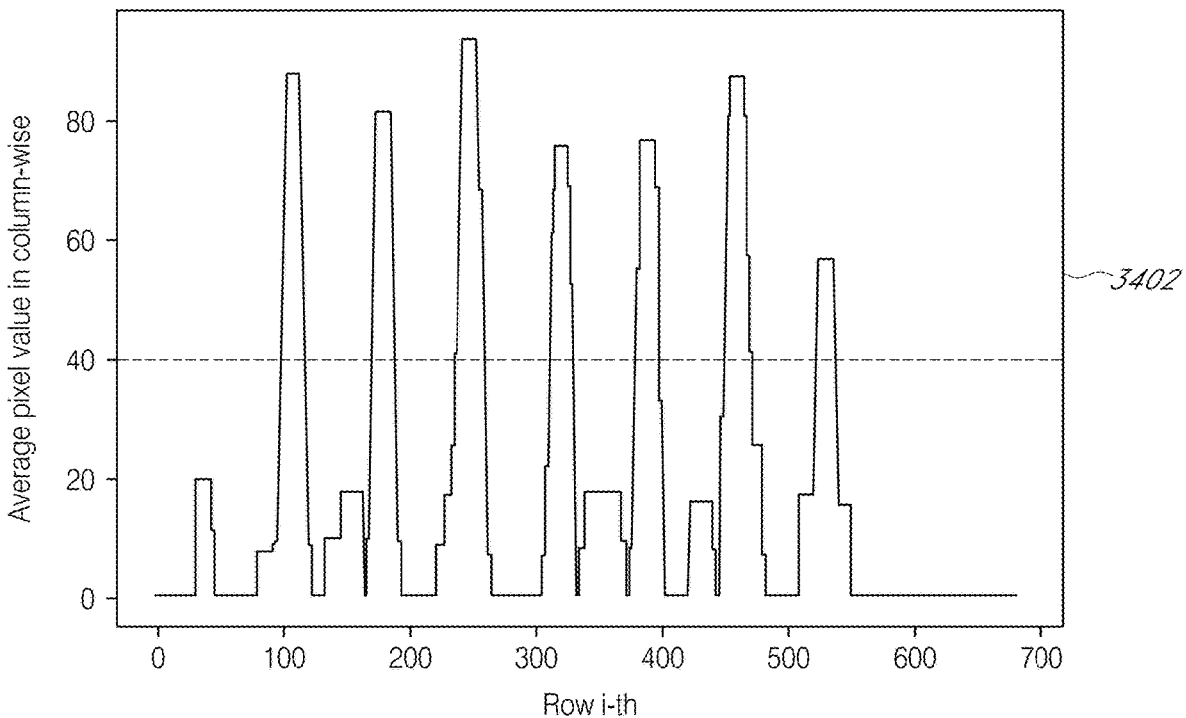
FIG. 34

ELECTROPHORESIS SYSTEM AND METHODS

CROSS-REFERENCE TO RELATED APPLICATION

This application claims the benefit of priority of U.S. Provisional Patent Application No. 63/292,318 filed Dec. 21, 2021, which is incorporated herein by reference.

BACKGROUND

Electrophoresis involves the separation and analysis of macromolecules (such as deoxyribonucleic acid (DNA), ribonucleic acid (RNA), proteins, etc.) and/or fragments thereof based on their size and charge. Nucleic acid molecules may be separated by applying an electric field to cause the negatively charged molecules to move through a matrix, such as agarose gel or another substance. Shorter molecules typically migrate more easily through pores of a gel matrix than longer molecules. Thus, shorter molecules typically move faster and/or migrate farther than longer molecules under gel electrophoresis.

For DNA implementations, gel electrophoresis is often performed for analytical purposes and may be performed in conjunction with amplification of DNA via polymerase chain reaction (PCR). In some instances, gel electrophoresis is performed as a preliminary step preceding other techniques, such as restriction fragment length polymorphism (RFLP), DNA sequencing, Southern blotting, cloning, mass spectrometry, and/or others.

Conventional gel electrophoresis systems suffer from a number of shortcomings, and there is an ongoing need and desire for improved gel electrophoresis systems.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Implementations of the present disclosure extend at least to electrophoresis systems, components thereof, and/or methods associated therewith.

Some embodiments provide an electrophoresis system that includes a base module and a camera module. The base module includes a cassette slot for receiving a gel electrophoresis cassette. The base module also includes a light element that functions to illuminate the gel electrophoresis cassette. The camera module is selectively attachable to and detachable from the base module. When attached to the base module, the camera module facilitates imaging of the gel electrophoresis cassette and provides additional imaging capabilities.

In some embodiments, the base module includes a fan assembly configured to facilitate air cooling of a gel electrophoresis sample positioned within the base module.

In some embodiments, the base module includes an LED array arranged in a checkerboard pattern to facilitate improved illumination uniformity and/or smoothness.

In some embodiments, the base module and/or the camera module include(s) various connection and/or alignment features that facilitate rapid and/or efficient docking of the camera module to the base module.

In some embodiments, the camera module includes a camera adjustment stage that facilitates spherical joint adjustment of the image sensor.

In some embodiments, the camera module includes a focus adjustment assembly that facilitates focus adjustments when the camera module is mounted to the base module.

In some embodiments, the camera module includes one or more supercapacitors to facilitate backup powering of the camera module when the camera module is selectively disconnected from the base assembly.

In some embodiments, the camera module includes one or more air inlets that at least partially prevent external light from entering the interior of the camera module.

Some embodiments provide improved image deconvolution techniques for generating output images that depict a gel electrophoresis sample in a more easily readable format.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the present disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings.

FIGS. 26A, 26B, and 26C illustrate example gel electrophoresis cassettes that may be used with a gel electrophoresis system, in accordance with implementations of the present disclosure;

FIG. 27 illustrate example flow diagrams depicting acts associated with generating a deconvolved image based on an image of a gel electrophoresis cassette captured using a gel electrophoresis system, in accordance with implementations of the present disclosure;

FIG. 34 illustrates a conceptual representation of detecting a band number associated with a well contour image;

DETAILED DESCRIPTION

Figure 1:
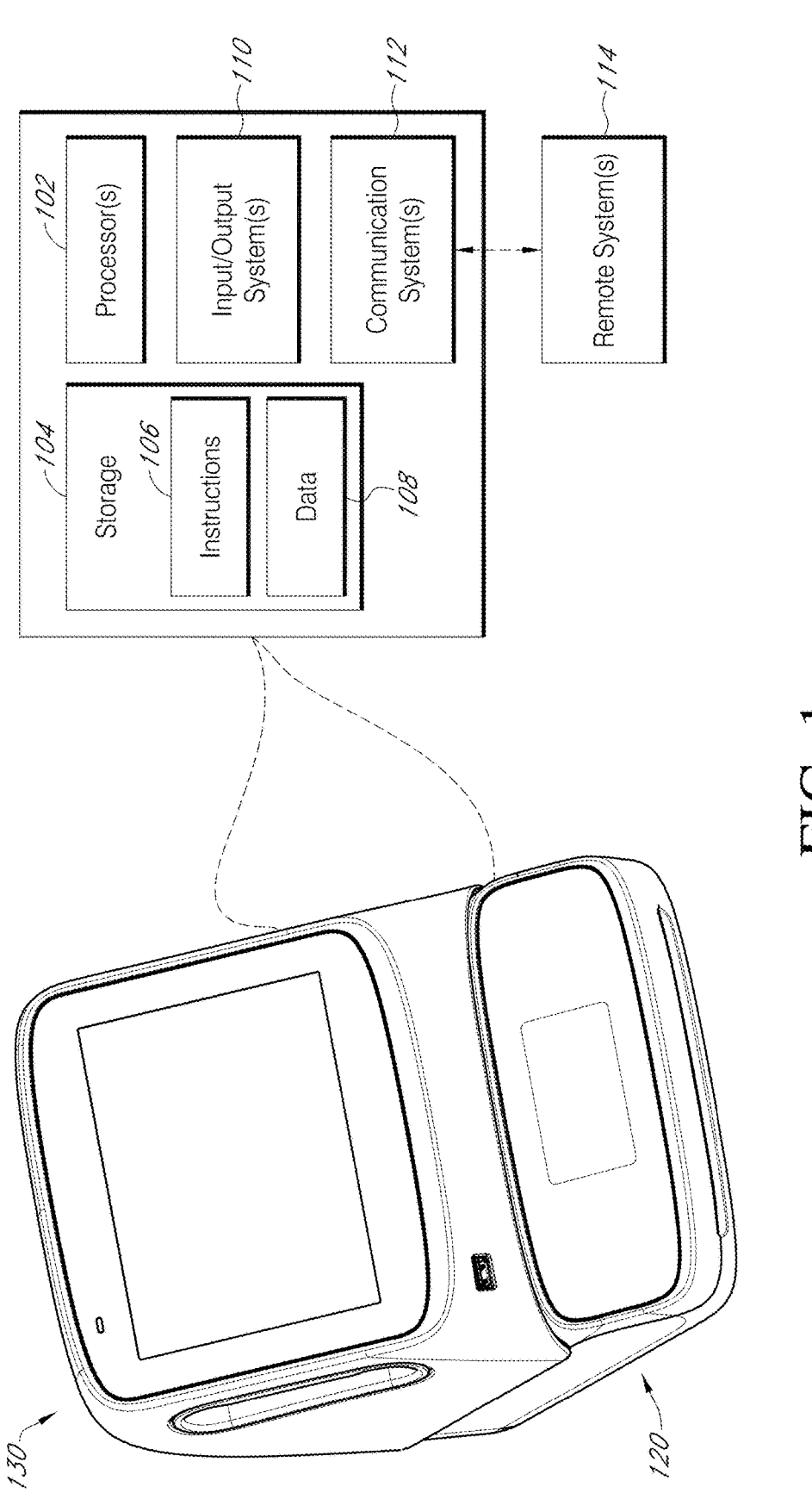
FIG. 1 illustrates example components of a gel electrophoresis system, in accordance with implementations of the present disclosure.

Implementations of the present disclosure extend at least to gel electrophoresis systems, and components thereof. The disclosed embodiments may be implemented to address various shortcomings associated with at least some conventional gel electrophoresis systems and/or techniques.

For example, conventional gel electrophoresis systems and techniques often result in heating of the gel matrix as the electrical current flows through the gel. Such an increase in the temperature of the gel matrix may cause a temperature gradient through the gel, which may in turn lead to a viscosity gradient. The temperature gradient and/or the viscosity gradient may result in poor band separation resolution and/or may result in band loss due to gel melting.

At least some implementations of the present disclosure provide a gel electrophoresis system that includes a fan assembly that is configured to direct air along one or more air cooling paths to facilitate air cooling of contents of a gel electrophoresis cassette. Such functionality may contribute to improved band separation resolution and/or reduced band loss by at least partially ameliorating heating of the electrophoresis gel. The fan assembly may run concurrent with gel electrophoresis processes and/or immediately after gel electrophoresis processes.

As another example, many conventional gel electrophoresis systems include a light source for illuminating a gel matrix to facilitate imaging thereof (and/or to facilitate fluorescent excitation). Such a light source may comprise an array of LEDs (e.g., in a rectangular pattern). However, conventional LED arrays for gel electrophoresis systems often result in degraded illumination uniformity and/or smoothness, which may cause bright spots and/or dark spots to appear. Although implementing additional LEDs may improve uniformity and/or smoothness, power consumption and/or heat dissipation considerations may constrain the number of LEDs that may be implemented in an LED array of a conventional gel electrophoresis system.

At least some implementations of the present disclosure provide an LED array that is arranged in a checkerboard pattern and with an increased distance (relative to conventional systems) from an excitation filter that intervenes between the LED array and the gel electrophoresis sample. The checkerboard pattern and/or increased distance may contribute to improved illumination uniformity and/or smoothness of a gel electrophoresis sample in a manner that accommodates power consumption and/or heat dissipation constraints (e.g., by requiring fewer LEDs than a rectangular pattern LED array would to attain the same results). The checkerboard pattern and/or increased distance may thereby contribute to improved imaging and/or user experiences.

As yet another example, many users utilizing conventional gel electrophoresis systems have difficulty aligning the camera component (e.g., top element) with the base component (e.g., bottom element), which may result in degraded imagery and/or damage to components of the gel electrophoresis system.

At least some implementations of the present disclosure provide alignment and/or connection features that may facilitate rapid alignment and/or connection of a camera component (e.g., camera module) to a base component (e.g., base module) of a gel electrophoresis system. Such features include one or more alignment tabs, engagement walls, flex catches and flex catch slots, pin connection slots, magnetic components, and/or others. Users may thus rapidly connect a camera module to a base module in a manner that results in consistent alignment and that avoids damage to the components.

As still another example, many conventional gel electrophoresis systems include image sensors (e.g., cameras) for capturing images of gel electrophoresis samples (e.g., during or after the application of the electric current). Some conventional image sensors are adjustable along an x-y plane. However, planarly adjustable cameras of conventional gel electrophoresis systems typically fail to resolve misalignments between the imaging plane (e.g., a plane associated with the gel matrix) and the image sensor plane.

At least some implementations of the present disclosure provide a gel electrophoresis system that includes a camera adjustment stage that supports a camera and that forms a spherical interface with a stage support of the camera module. The camera adjustment stage (and therefore the positioning of the camera attached thereto) may be adjusted in a spherical joint fashion, which may facilitate correction of misalignments between the imaging plane and the image sensor plane of the camera. The camera adjustment stage may be secured to the stage support utilizing spherical washers.

By way of further example, at least some conventional gel electrophoresis systems include an adjustable focal lens. However, conventional adjustable focal lenses of conventional gel electrophoresis systems are often difficult to adjust, typically requiring access to the focal lens from within an imaging chamber formed between the camera component and the base component. For example, users often must disconnect the camera component from the base component to adjust the focal lens on a bottom portion of the camera component. Thus, conventional gel electrophoresis systems fail to accommodate focal adjustment while image capture functionality is enabled, which may contribute to increased difficulty in performing fine focal lens adjustments. Furthermore, conventional adjustable focal lenses can inadvertently adjust in response to vibrations or other disturbances (e.g., during transportation).

At least some implementations of the present disclosure provide a gel electrophoresis system that includes lens assembly with a rotatable lens gear. The lens gear is configured to engage with a focus adjustment gear such that adjustment of the focus adjustment gear causes rotation of the lens gear, which causes adjustment of a focal lens. While the lens gear is positioned within an imaging chamber formed by the camera module of the gel electrophoresis system, the focus adjustment gear may be accessible from outside of the imaging chamber, such that focal adjustments may be performed without direct access to the interior of the imaging chamber. Such features may advantageously allow for focal adjustments while the gel electrophoresis system is configured for capturing images (e.g., with the camera module attached to the base module).

By way of additional example, many conventional camera modules of conventional gel electrophoresis systems draw power from the corresponding base module when the camera module is connected to the base module. However, such conventional systems fail to provide power to the camera module when the camera module is disconnected from the base module. Such conventional systems thus prevent users from transferring a camera module to a different base module in an efficient manner. For example, upon disconnecting a conventional camera module from a corresponding base module, the camera module loses power and shuts off. Upon connection of the camera module to a different base module (or the original base module), the camera module begins to receive power again, but the camera module typically undergoes a system boot up process before the camera module can capture images. Thus, users' efficiency may be frustrated by the reboot process upon connection to a different base module (or reconnection to the same base module, such as where the user momentarily disconnects the camera module to make a rapid inspection of one or more components within the imaging chamber).

At least some implementations of the present disclosure provide a camera module that includes one or more supercapacitors integrated into the power board of the camera module. The supercapacitor(s) may become charged upon connection of the camera module to the base module, and the supercapacitor(s) may supply power to the camera module for a period after disconnection of the camera module from the base module (e.g., for a period of about seven seconds or longer; other time periods are within the scope of the present disclosure). Upon reconnection to a base module, the supercapacitor(s) may recharge in preparation for a subsequent disconnection. In this way, users may avoid a boot sequence upon reconnection of a camera module to a base module, which may greatly enhance user experiences.

Deconvolution processing is often performed on images captured using conventional gel electrophoresis systems. In this context, deconvolution processing includes separating image representations of individual lanes present in a gel electrophoresis sample, cropping the individual lanes, and presenting the individual lanes in a reorganized format that is amenable to analysis by users (see, for visualization purposes, FIGS. 39, 40A, 40B, and 40C). A lane may comprise an area that encompasses a well and extends toward adjacent wells (or adjacent well matrix boundaries) in one or more directions (e.g., left, right, down; see, for visualization purposes, the subdivided lanes of FIG. 37).

Under conventional approaches, deconvolution processing is typically performed by out-of-system software. For example, after utilizing a conventional gel electrophoresis system to capture images of a gel electrophoresis sample, the images are transferred to a separate computing system to perform the deconvolution processing. Furthermore, conventional deconvolution processing typically involves prompting users to provide computer input manually dividing the individual lanes of the captured electrophoresis samples (e.g., by drawing box regions). The subdivided lanes are then cropped and reorganized according to a desired template. Such processing is cumbersome for users, particularly where a large number of captured gel electrophoresis images are queued for analysis (e.g., the lanes of each image must be individually subdivided).

In some instances, deconvolution processing performed in accordance with the principles disclosed herein may include one or more of (i) automatically determining a gel size for a gel matrix represented in a gel electrophoresis image, (ii) automatically determining a well configuration of a gel matrix represented in a gel electrophoresis image, and/or (iii) automatically fitting a well matrix template to lanes present in a gel electrophoresis image. Such functionality may advantageously automate subdivision of well lanes in gel electrophoresis images, which may improve user experiences and analysis efficiency. Further advantageously, in some implementations, a gel electrophoresis system of the present disclosure may be configured to perform deconvolution processing on-device.

Still furthermore, at least some conventional gel electrophoresis systems include camera modules that have air inlets to facilitate cooling of the camera module components. However, such air inlets often allow light to pass into the interior of the camera module, which may affect imaging quality/performance.

At least some implementations of the present disclosure provide gel electrophoresis systems that include camera modules having air inlets that include one or more air inlet path bends to at least partially reduce the amount of external light allowed to pass into the interior of the camera module. Such air inlet paths may advantageously be formed between handle and body components of the camera module, making the air inlet paths less impactful on the exterior aesthetic of the gel electrophoresis system (see FIG. 14A).

Attention will now be directed to FIGS. 1 through 40C, which provide various supporting illustrations related to the disclosed embodiments.

Example Gel Electrophoresis System Components

FIG. 1 illustrates various example components of a gel electrophoresis system 100 that may be used to implement one or more disclosed embodiments. Although FIG. 1 illustrates a gel electrophoresis system 100 as including particular components, one will appreciate, in view of the present disclosure, that a gel electrophoresis system 100 may comprise any number of additional or alternative components. Furthermore, one will appreciate, in view of the present disclosure, that the principles disclosed herein are not limited to the particular form and/or features of the gel electrophoresis system 100 shown in FIG. 1.

FIG. 1 illustrates that a gel electrophoresis system 100 may comprise a base module 120 and a camera module 130. The base module 120 and the camera module 130 may operate in conjunction to facilitate various functions related to gel electrophoresis. In some instances, the base module 120 includes a power supply or power adaptor that is configured to supply power to one or more components of the base module 120 (e.g., when the base module is connected to an external power source). Furthermore, in some instances, the camera module 130 is configured to receive power from the base module 120 when the camera module 130 is connected to the base module 120 (e.g., connected over a top portion of the base module, as illustrated in FIG. 1). Additional details related to the base module 120 and the camera module 130 will be provided hereinafter.

FIG. 1 illustrates that a gel electrophoresis system 100 may include processor(s) 102, storage 104, input/output system(s) 110 (I/O system(s) 110), and communication system(s) 112. FIG. 1 illustrates dashed lines extending from these components to both the base module 120 and the 130, indicating that the processor(s) 102, storage 104, input/output system(s) 110 (I/O system(s) 110), and communication system(s) 112 may be distributed among the base module 120 and the camera module 130 in any suitable manner. For instance, the base module 120 and the camera module 130 may comprise respective processor(s) 102, storage 104, input/output system(s) 110 (I/O system(s) 110), and/or communication system(s) 112.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 112 or otherwise), or some combination thereof. Additional details related to processors (e.g., processor(s) 102), computer storage media (e.g., storage 104), and other computer components will be provided hereinafter.

The processor(s) 102 may be configured to execute instructions 106 stored within storage 104 to perform certain actions (e.g., deconvolution processing, activating fans or other components, etc.). The actions may rely at least in part on data 108 stored on storage 104 in a volatile or non-volatile manner.

In some instances, the actions may rely at least in part on communication system(s) 112 for receiving data from remote system(s) 114, which may include, for example, computing devices, sensors, and/or others. The communications system(s) 112 may comprise any combination of software or hardware components that are operable to facilitate communication between on-system components/devices and/or with off-system components/devices. For example, the communications system(s) 112 may comprise ports, buses, or other physical connection apparatuses for communicating with other devices/components. Additionally, or alternatively, the communications system(s) 112 may comprise systems/components operable to communicate wirelessly with external systems and/or devices through any suitable communication channel(s), such as, by way of non-limiting example, Bluetooth, ultra-wideband, WLAN, infrared communication, and/or others.

Furthermore, FIG. 1 illustrates that a gel electrophoresis system 100 may comprise or be in communication with I/O system(s) 110. I/O system(s) 110 may include any type of input or output device such as, by way of non-limiting example, a display, a touch screen, a mouse, a keyboard or button interface, a controller, and/or others, without limitation.

Figure 2:
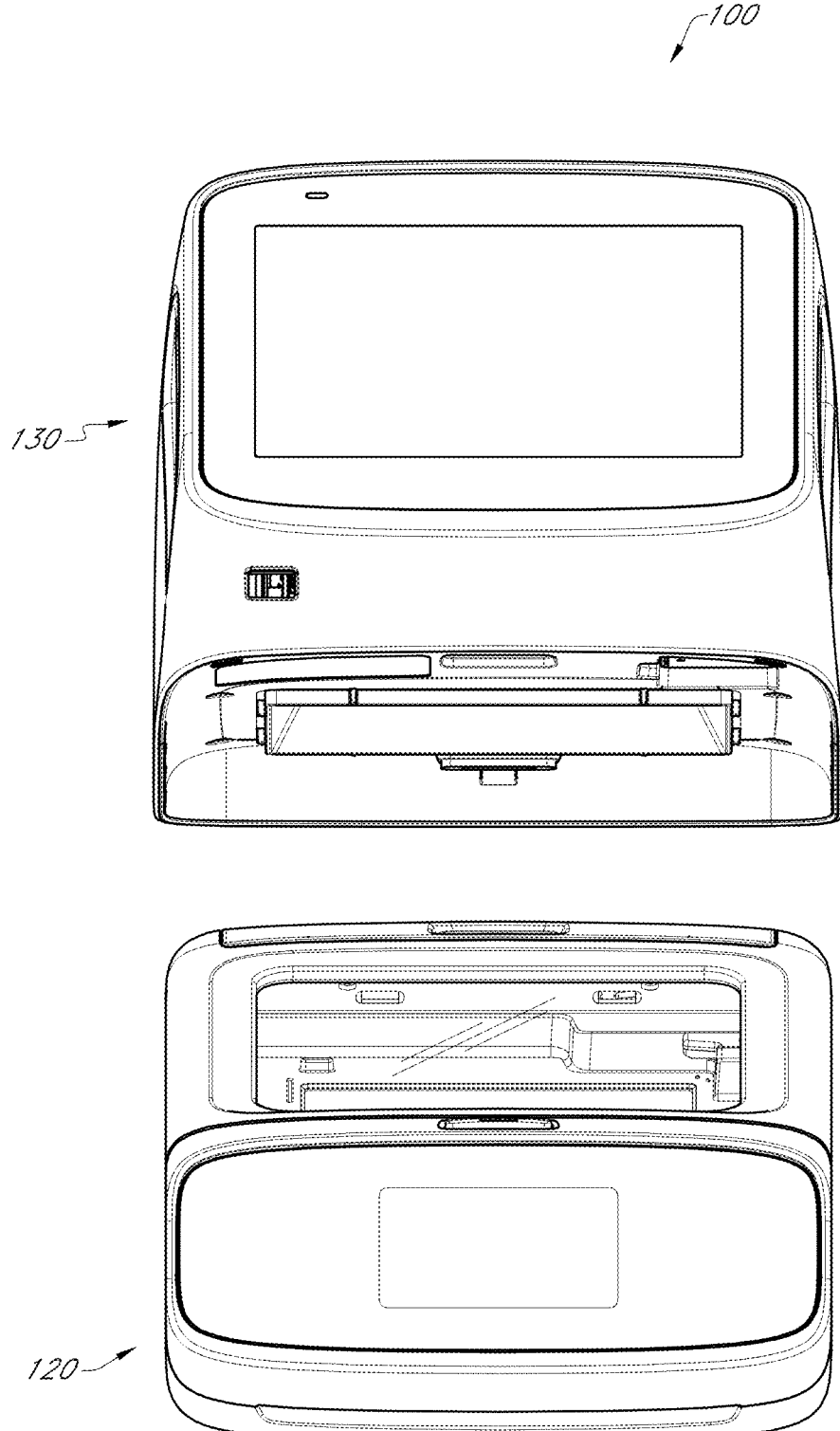
FIG. 2 illustrates an example gel electrophoresis system with a camera module thereof selectively detached from a base module thereof, in accordance with implementations of the present disclosure.

FIG. 2 illustrates an example gel electrophoresis system 100 with the camera module 130 selectively detached from the base module 120. The camera module 130 may be selectively detached from the base module 120 to allow users to access components of the gel electrophoresis system 100 for facilitating performance of gel electrophoresis and/or capturing images of gel electrophoresis samples. For instance, upon placement of a gel electrophoresis cassette within the base module 120, the camera module 130 may be selectively connected to the base module 120 to facilitate imaging of the gel electrophoresis cassette.

Figure 3A:
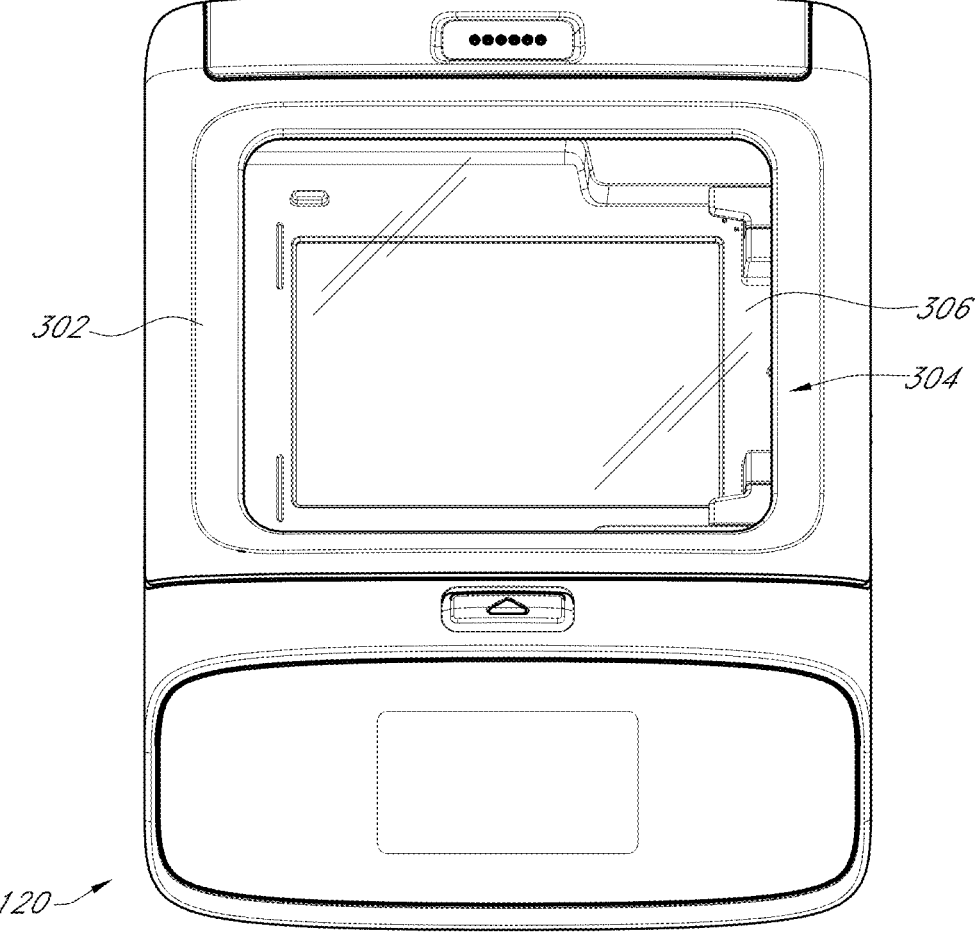
FIG. 3A illustrates an example base module of a gel electrophoresis system with a cover thereof in a closed configuration, in accordance with implementations of the present disclosure.
Figure 3B:
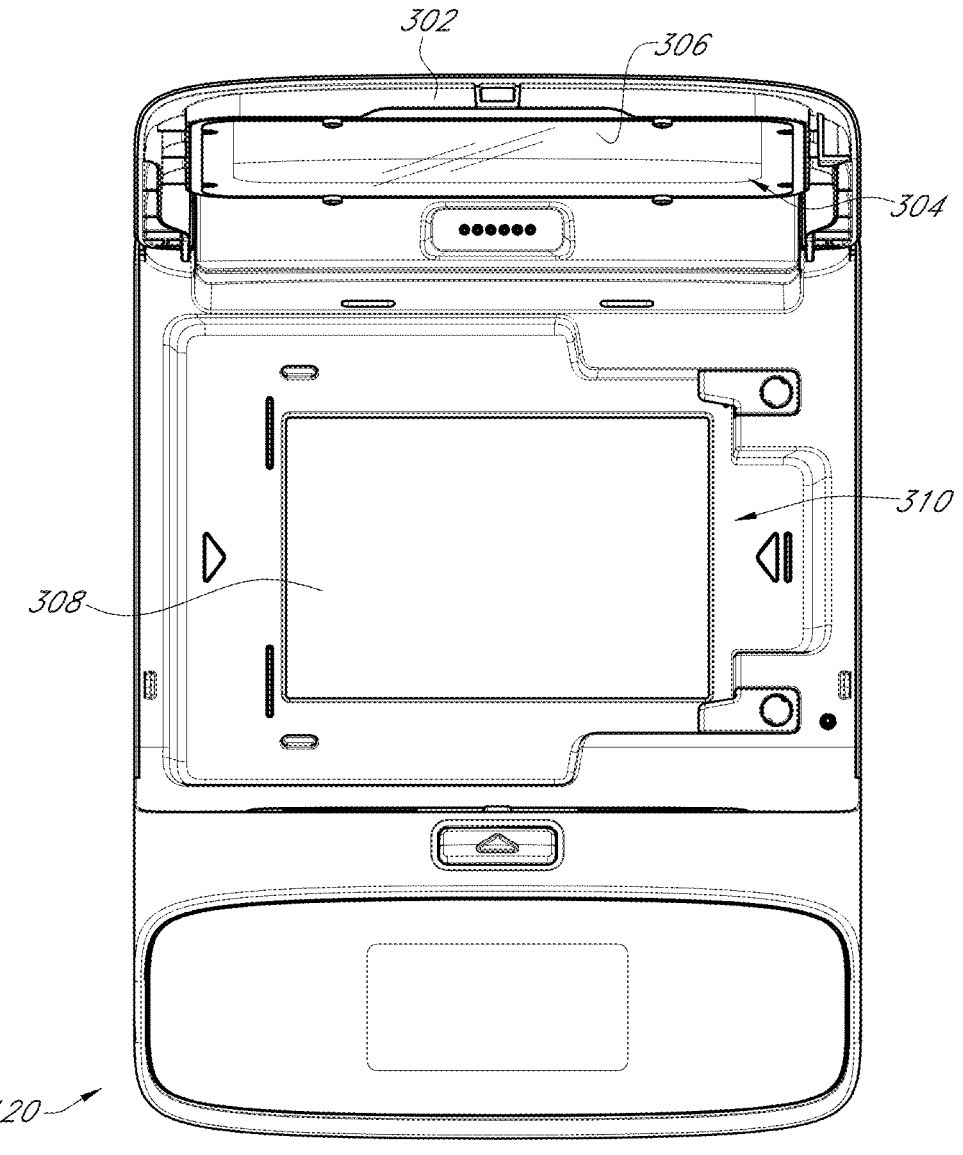
FIG. 3B illustrates an example base module of a gel electrophoresis system with a cover thereof in an open configuration, in accordance with implementations of the present disclosure.

FIG. 3A illustrates an example base module 120 of a gel electrophoresis system 100 with a cover 302 thereof in a closed configuration, whereas FIG. 3B illustrates the cover

Figure 4A:
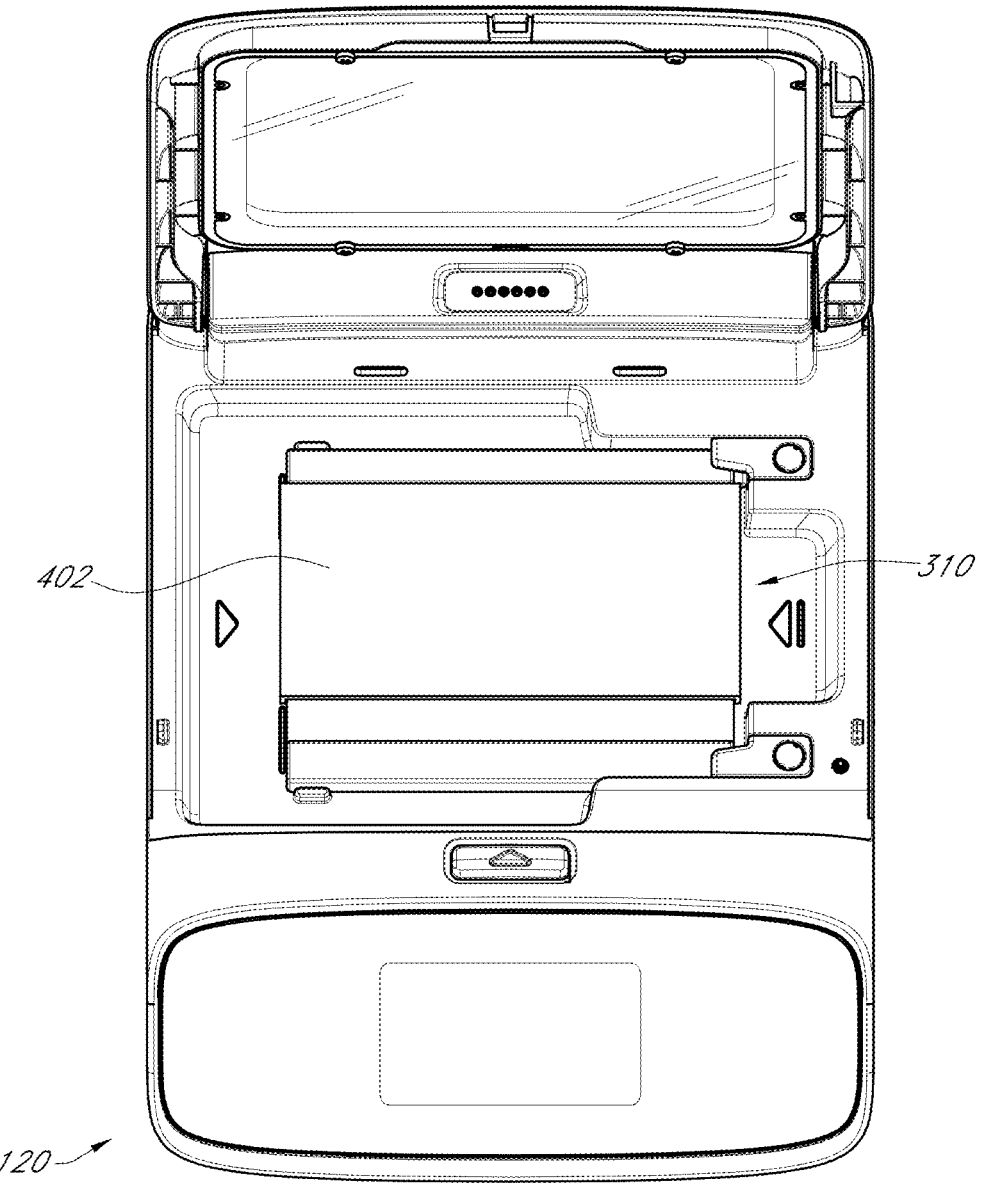
FIG. 4A illustrates an example base module of a gel electrophoresis system with a cover thereof in an open configuration and with a gel electrophoresis cassette positioned therein, in accordance with implementations of the present disclosure.

302 of the base module 120 in an open configuration. As is evident from FIG. 3B, opening of the cover 302 of the base module 120 may expose a cassette slot 310, which may be sized and shaped to receive an electrophoresis gel cassette. FIG. 4A illustrates a gel electrophoresis cassette 402 positioned within the cassette slot 310 of the base module 120.

Figure 4B:
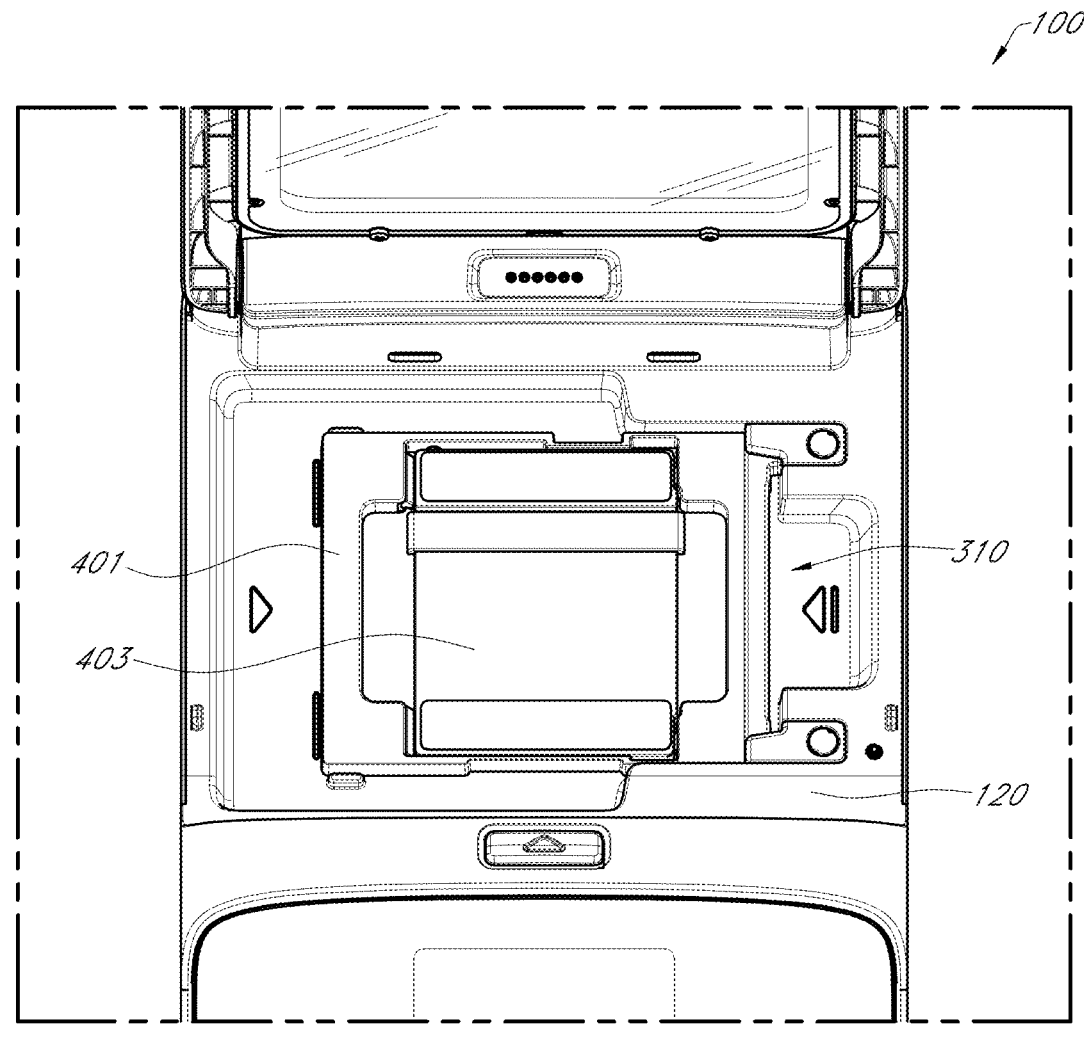
FIGS. 4B through 4E illustrate an example cassette adaptor that may be utilized with the base module of the gel electrophoresis system to improve positioning and interfacing with smaller cassettes (e.g., 11 or 22 well cassettes)
Figure 4C:
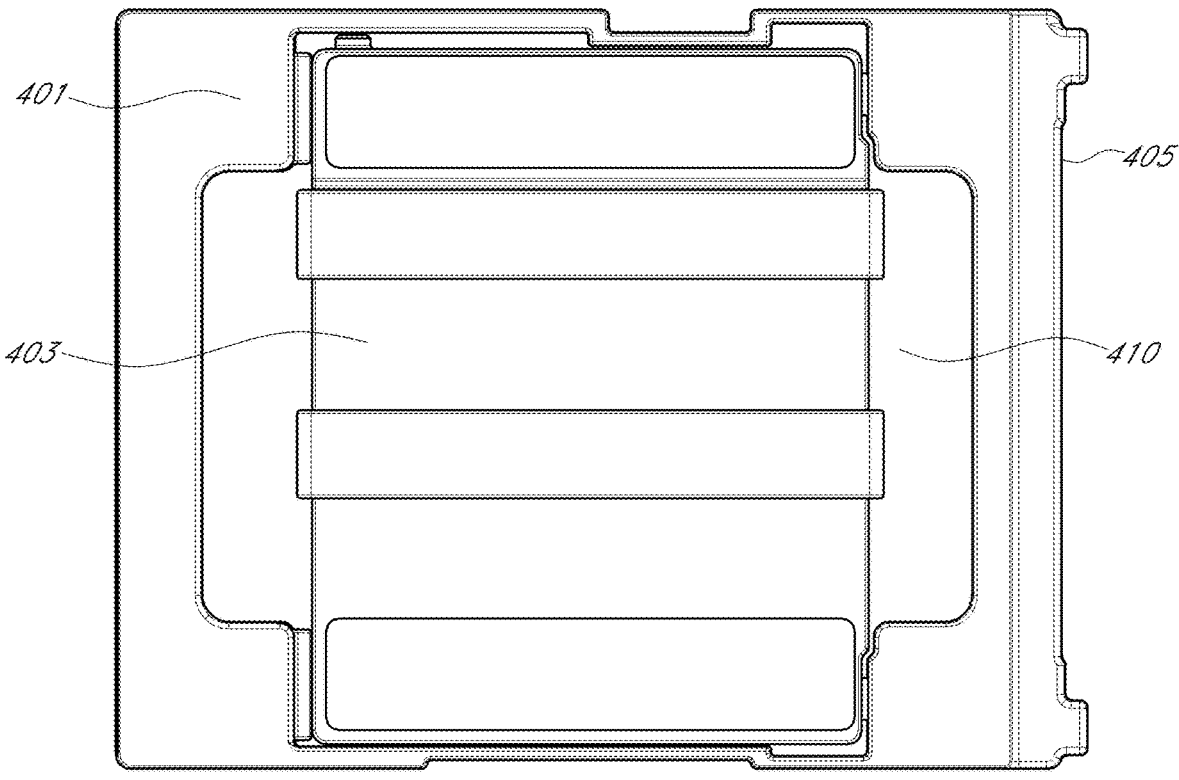
Figure 4D:
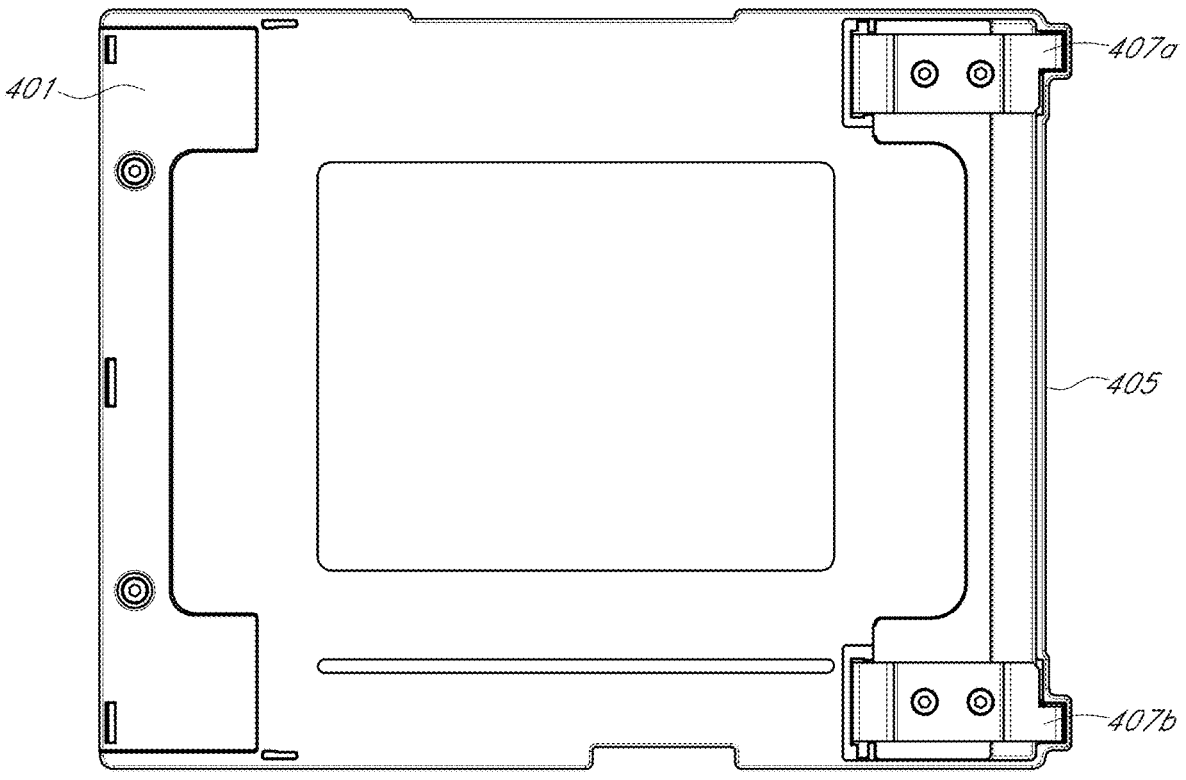
Figure 4E:
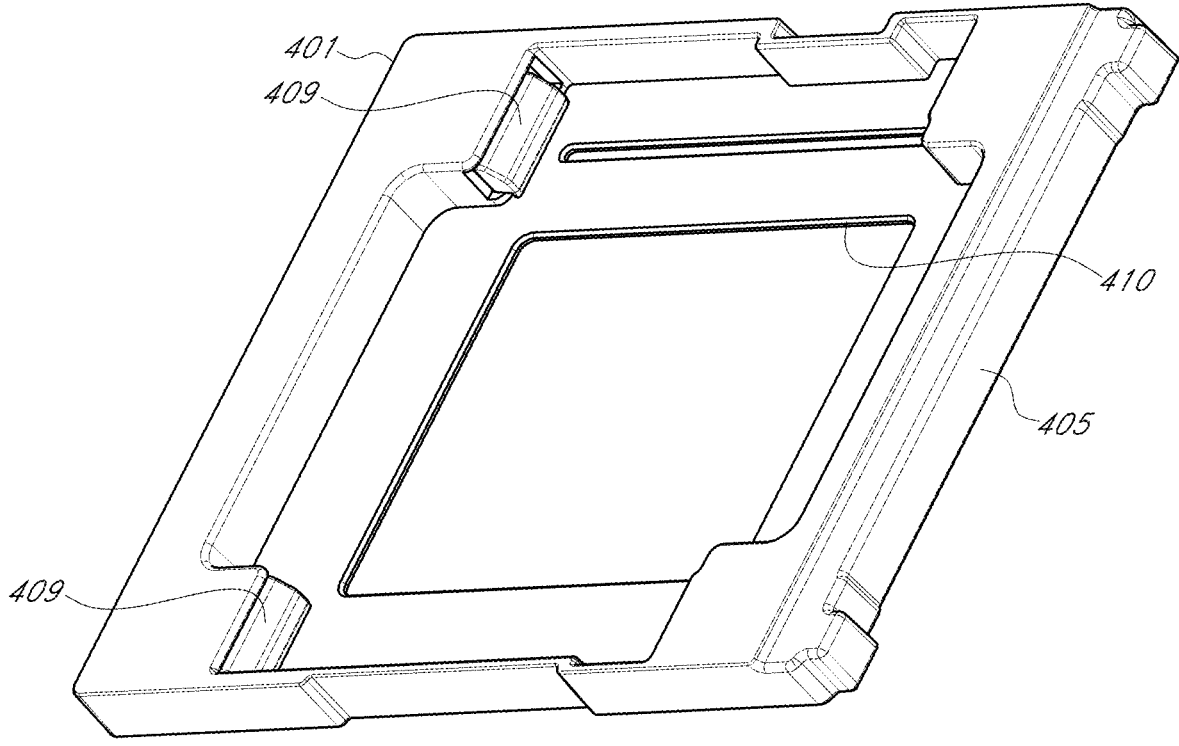

As shown in FIG. 4B, in some embodiments, the gel electrophoresis system 100 includes a cassette adaptor 401 configured to receive a smaller cassette 403 (e.g., an 11 or 22 well cassette). The cassette adaptor 401 is sized to fit within the cassette slot 310 of the base module 120. The cassette adaptor 401 beneficially centers the cassette 403 for more effective viewing, while also enabling effective electrical contact between the base module 120 and the cassette 403. FIGS. 4C and 4D illustrate the cassette adaptor 401 in more detail, with FIG. 4D showing a top plan view and FIG. 4E showing a back plan view. As shown, the cassette adaptor 401 includes a cassette receiving slot 410 and an instrument interface end 405. The instrument interface end 405 includes a pair of contacts 407a and 407b (visible in FIG. 4D) that contact the electrodes of the base module 120 when the cassette adaptor 401 is positioned in the cassette slot 310. The other ends of the contacts 407a and 407b contact the smaller cassette 403 when the smaller cassette 403 is positioned in the cassette receiving slot 410. The contacts 407a and 407b thus form a conductive bridge between the instrument electrodes of the base module 120 and the smaller cassette 403 so that the complete electrophoretic circuit is formed.

FIG. 4D is another view of the cassette adaptor 401 with cassette 403 removed to better illustrate internal features. As shown, the illustrated embodiment includes spring tabs 409 on the side of the cassette receiving slot 410 opposite the instrument interface end 405. The spring tabs 409 are biased outward toward the instrument interface end 405. In this manner, the spring tabs 409 function to bias the inserted cassette 403 against the instrument interface end 405 to ensure effective contact with contacts 407a and 407b. Alternative embodiments may use other biased components, or alternatively positioned or alternative numbers of biased components to account for size variation in cassettes and/or otherwise promote good contact with the contacts 407a and 407b.

In the example of FIGS. 3A, 3B, 4A and 4B, the cover 302 includes a viewing window 304 through which the cassette slot 310 (and/or a gel electrophoresis cassette 402 positioned therein) may be viewed when the cover 302 is in a closed configuration. The cassette slot 310 (and/or a gel electrophoresis cassette 402 positioned therein) may therefore be visible to a camera of a camera module 130 when the camera module 130 is positioned over the top of the base module 120 (e.g., as shown in FIG. 1) with the cover 302 of the base module 120 in a closed configuration (thereby arranging the viewing window 304 over the cassette slot 310).

The example of FIGS. 3A, 3B, 4A, and 4B further illustrates an emission filter 306 extending throughout the viewing window 304. The emission filter 306 may operate to transmit fluorescence from a gel electrophoresis sample toward a camera of a camera module 130 (while blocking unwanted traces of excitation light).

FIG. 3B furthermore illustrates an excitation filter 308 arranged on the base module 120. FIG. 3B illustrates the excitation filter 308 arranged below the cassette slot 310 of the base module, such that the excitation filter 308 resides below a gel electrophoresis cassette when such a cassette is positioned within the cassette slot 310 (see FIG. 4). The excitation filter 308 may operate to transmit light of one or more desired excitation wavelengths from an illumination source toward a gel electrophoresis cassette. The illumination source (or light element) may be positioned on an opposite side of the excitation filter 308 relative to the cassette slot 310, such that the excitation filter 308 intervenes between the illumination source and the cassette slot 310.

Example Illumination Elements of Gel Electrophoresis Systems

As indicated above, a base module 120 of a gel electrophoresis system 100 may include a light element configured to illuminate a gel electrophoresis cassette (e.g., gel electrophoresis cassette 402) when the gel electrophoresis cassette is positioned within the cassette slot 310.

Figure 5:
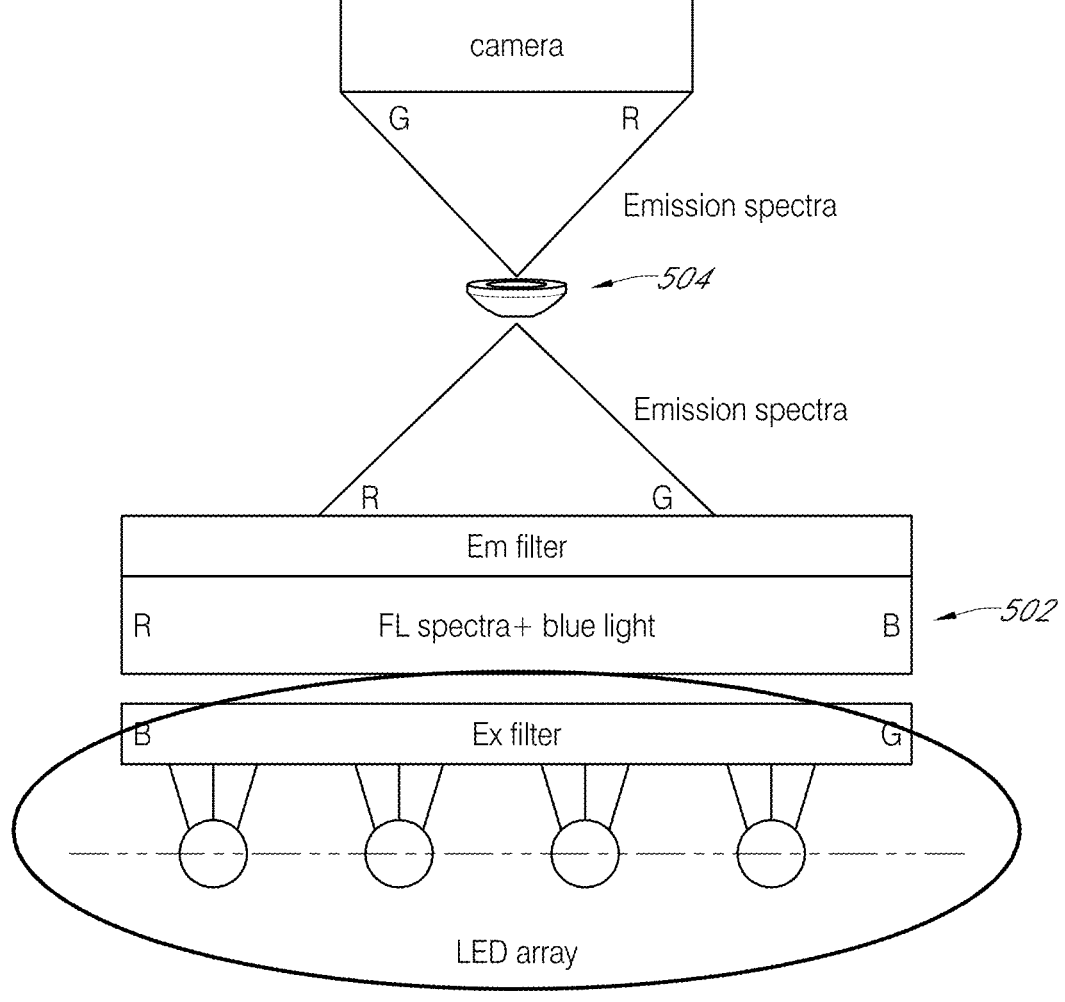
FIG. 5 illustrates a schematic representation of light emitting and optical components of an electrophoresis system, in accordance with implementations of the present disclosure.

FIG. 5 illustrates a schematic representation of light emitting and optical components of a gel electrophoresis system 100. FIG. 5 depicts an example in which the light element (or illumination source or illumination element) of the base module is implemented as an LED array (labeled "LED array" in FIG. 5) positioned below an excitation filter (labeled "Ex filter" in FIG. 5, which may correspond to the excitation filter 308 of FIG. 3B). The light from the LED array that transmits through the excitation filter (labeled "blue light" in FIG. 5) reaches a gel electrophoresis cassette 502 (e.g., corresponding to gel electrophoresis cassette 402 of FIG. 4) and may interact with one or more portions of a gel electrophoresis sample within the gel electrophoresis cassette 502 to generate fluorescent light (labeled "FL spectra" in FIG. 5). The fluorescent light and the blue light (labeled "FL spectra+blue light" in FIG. 5) may then be filtered by an emission filter (labeled "Em filter" in FIG. 5, which may correspond to the emission filter 306 of FIGS. 3A and 3B). The light transmitted through the emission filter (labeled "Emission spectra" in FIG. 5) may be focused by one or more lenses and/or other optics 504 of the gel electrophoresis system 100 and be detected by a camera of the camera module 130 (labeled "camera" in FIG. 5).

Figure 6A:
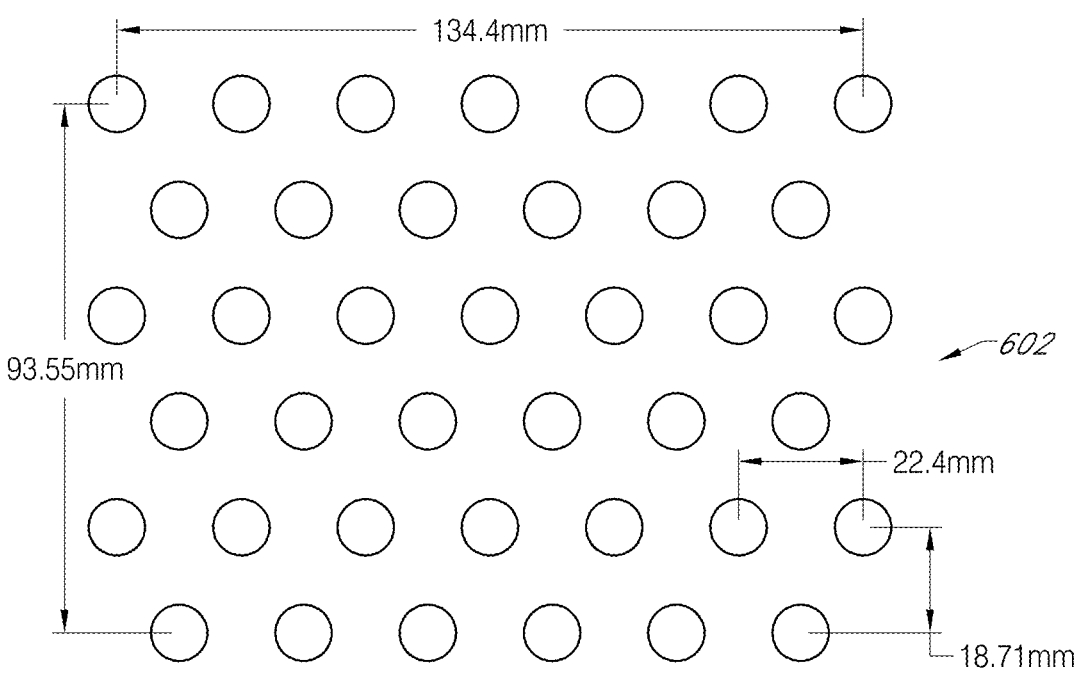
FIGS. 6A and 6B illustrate schematic representations of a light emitting diode (LED) array of a base module of an electrophoresis system, in accordance with implementations of the present disclosure.
Figure 6B:
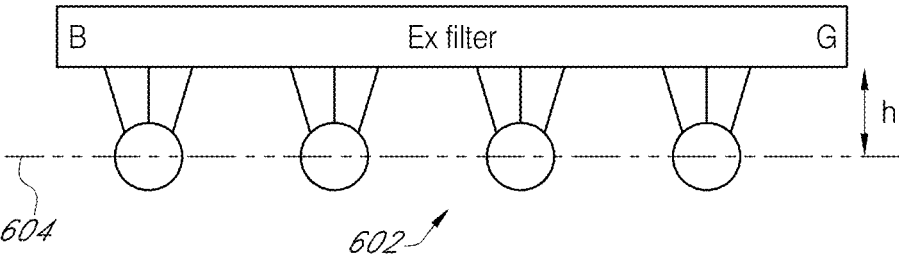

As noted above, the gel electrophoresis system 100 of the present disclosure may comprise a light element that is ideally configured and distanced from the excitation filter to facilitate uniform and/or smooth illumination of the gel electrophoresis cassette 502. FIGS. 6A and 6B illustrate schematic representations of a light emitting diode (LED) array 602 of a base module 120 of an electrophoresis system 100. In particular, FIG. 6A illustrates the LED array 602 arranged in a checkerboard pattern, which includes alternating rows with different numbers of LEDs. For example, in the example LED array 602 of FIG. 6A, the checkerboard pattern includes six rows of LEDs, where the first row, the third row, and the fifth row each include 7 LEDs, whereas the second row, the fourth row, and the sixth row each include 6 LEDs.

As will be discussed in more detail hereinafter, it has been shown that the particular checkerboard pattern of FIG. 6A provides improved illumination smoothness and/or uniformity than conventional light elements for conventional gel electrophoresis systems (see FIG. 7A). However, the particular checkerboard pattern shown in FIG. 6A is provided by way of example only and may be altered in accordance with the scope of the present disclosure. For example, the first, third, and fifth rows of a checkerboard pattern may comprise 6 LEDs, whereas the second, fourth, and sixth rows may include 7 LEDs. Furthermore, although the checkerboard pattern of FIG. 6A includes 39 LEDs, an LED array in a checkerboard pattern may comprise additional or fewer LEDs (e.g., within a range of about 35 to 45 LEDs), and, correspondingly, different numbers of LEDs in the rows of the checkerboard pattern. For example, different LEDs may be associated with different illumination output, power consumption, heat dissipation, etc., such that a checkerboard pattern comprising fewer higher-power LEDs may achieve similar illumination uniformity/smoothness results (while complying with power consumption and/or heat dissipation constraints). Similarly, a checkerboard pattern comprising additional lower-power LEDs may achieve similar illumination uniformity/smoothness results (while complying with power consumption and/or heat dissipation constraints). Thus, an LED array with a checkerboard pattern may comprise various numbers of LEDs in accordance with the present disclosure.

FIG. 6A provides dimensions associated with the example LED array 602 in the checkerboard pattern. For instance, FIG. 6A shows the center-to-center distance between adjacent LEDs within the same row to be 22.4 mm FIG. 6A furthermore illustrates the center-to-center row offset distance between adjacent rows of the checkerboard pattern to be 18.7 mm In addition, FIG. 6A illustrates the distance between the center of the leftmost LEDs and the center of the rightmost LEDs to be 134.4 mm FIG. 6A also illustrates the distance between the center of top row LEDs and the center of the bottom row LEDs to be 93.55 mm.

Although an LED array with a checkerboard pattern corresponding to the dimensions shown in FIG. 6A has been shown to achieve desirable illumination smoothness and/or uniformity (see FIG. 7A), one will appreciate, in view of the present disclosure, that these particular dimensions are provided by way of example only and are non-limiting. For example, in some instances, a checkerboard pattern of LEDs for a gel electrophoresis system 100 may include a center to center distance between adjacent LEDs within a same row within a range of about 21.5 mm to about 23.5 mm. As another example, a center to center row offset distance between adjacent rows of the checkerboard pattern may be within a range of about 17.5 mm to about 19.5 mm. Furthermore, a checkerboard pattern of an LED array of a gel electrophoresis system may include a width within a range of about 130 mm to about 138 mm and/or a height within a range of about 90 mm to about 96 mm.

FIG. 6B depicts a representation of the LED array 602 arranged along a plane 604 that is substantially parallel to the excitation filter (labeled "Ex filter" in FIG. 6B). FIG. 6B illustrates a height h that indicates a distance between the LED array 602 and the excitation filter. Although a higher height h is correlated with increased illumination uniformity, a higher height h is also correlated with reduced illumination intensity, which may require correspondingly increased power consumption by the LED array 602 to achieve desirable illumination intensity.

An LED array 602 arranged in a checkerboard pattern as discussed above with reference to FIG. 6A is configured to enable a height h within a range of about 20 mm to about 27 mm, which, in some instances, contributes to improved illumination uniformity and/or smoothness. For example, at least some conventional gel electrophoresis systems implement a height h of about 17 mm or lower, which degrades the illumination uniformity and/or smoothness achievable by conventional systems.

Figure 7A:
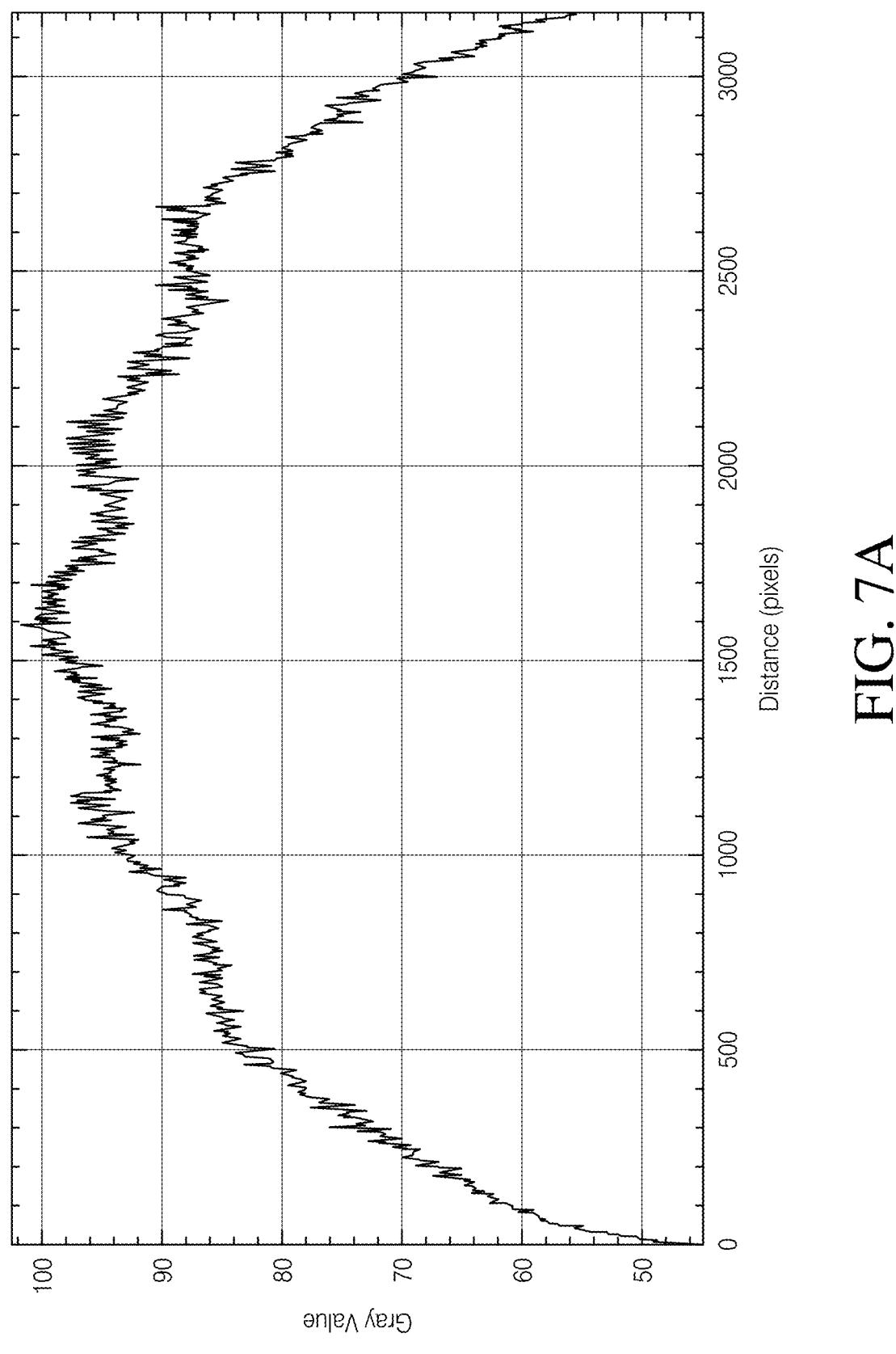
FIG. 7A illustrates an example graph depicting gray values obtained for a row of pixels of an image captured under illumination by an LED array of a base module of an electrophoresis system, in accordance with implementations of the present disclosure.
Figure 7B:
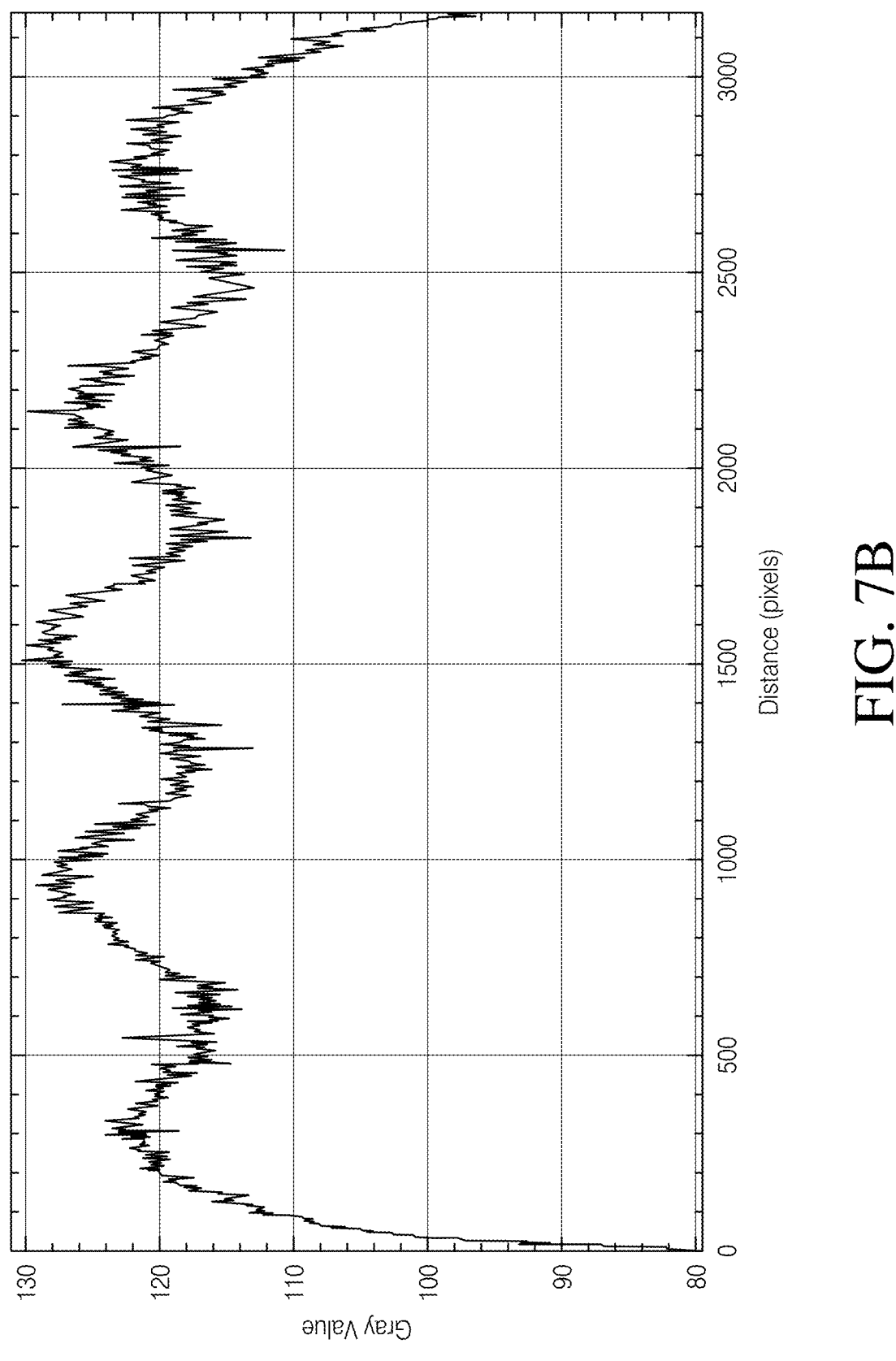
FIG. 7B illustrates an example graph depicting gray values obtained for a row of pixels of an image captured under illumination by a conventional LED array of a conventional base module of a conventional electrophoresis system.

FIG. 7A illustrates an example graph depicting gray values obtained for a row of pixels of an image captured under illumination by an LED array 602 of a base module 120 of a gel electrophoresis system 100, in accordance with the present disclosure. FIG. 7B illustrates an example graph depicting gray values obtained for a row of pixels of an image captured under illumination by a conventional LED array of a conventional gel electrophoresis system (e.g., with a rectangular arrangement of LEDs and with a height h of about 17 mm). As is evident from FIGS. 7A and 7B, greater illumination uniformity and smoothness are achieved by implementing an LED array 602 as discussed above rather than a conventional LED array.

Example Fan Assemblies of Gel Electrophoresis Systems

As indicated above, a base module 120 of a gel electrophoresis system 100 may include a fan assembly and air cooling paths to facilitate cooling of a gel electrophoresis sample in a manner that improves band separation resolution and/or reduces band loss (e.g., due to gel melting).

Figure 8A:
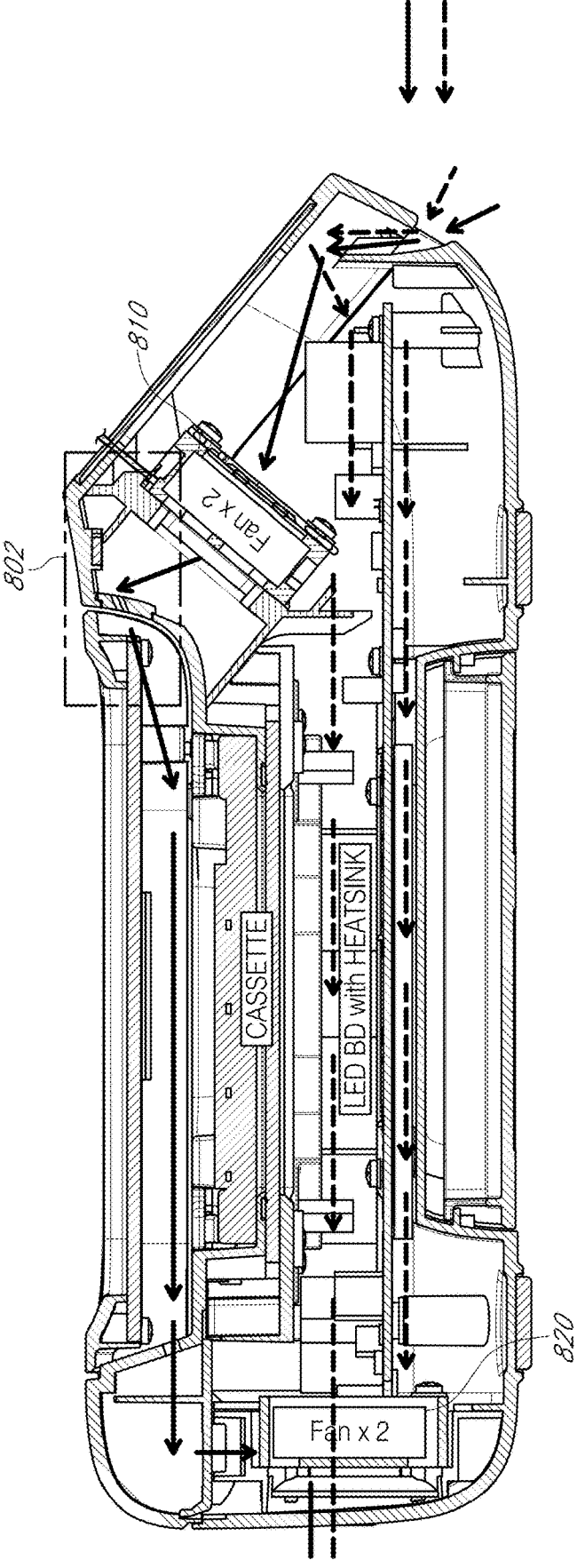
FIG. 8A illustrates a cross-sectional side view of a base module of a gel electrophoresis system, illustrating a fan assembly and air cooling paths of the base module, in accordance with implementations of the present disclosure.

FIG. 8A illustrates a cross-sectional side view of a base module 120 of a gel electrophoresis system 100, illustrating a fan assembly and air cooling paths of the base module 120. In the example shown in FIG. 8A, the fan assembly of the base module 120 includes a first set of fans 810 and a second set of fans 820. The first set of fans 810 and the second set of fans 820 each include two respective fans (indicated by the "Fan x 2" labels of FIG. 8A). The fans of the fan assembly are configured to facilitate air cooling of contents of the gel electrophoresis cassette (labeled "CASSETTE" in FIG. 8A, which may correspond to the gel electrophoresis cassette 402 of FIG. 4) when the gel electrophoresis cassette is positioned within the cassette slot (e.g., corresponding to cassette slot 310 of FIG. 3B).

The fan assembly of FIG. 8A (comprising the first set of fans 810 and the second set of fans 820) is configured to direct air along an upper air cooling path. The upper air cooling path is denoted in FIG. 8A by black arrows. As shown in FIG. 8A, the upper air cooling path extends over a top of the gel electrophoresis cassette when the gel electrophoresis cassette is positioned within the cassette slot. At least a portion of the upper air cooling path extends between the gel electrophoresis cassette and the cover of the base module (e.g., cover 302 of FIG. 3B, with the associated emission filter 306). Under the configuration shown in FIG. 8A, the first set of fans 810 is primarily responsible for directing air along the upper air cooling path.

FIG. 8A furthermore illustrates that the fan assembly is configured to direct air along a bottom air cooling path that extends below the cassette slot and below (or through) a heatsink associated with the LED array and/or board (labeled "LED BD with HEATSINK" in FIG. 8A, where the LED array may correspond to the LED array 602 of FIGS. 6A and 6B). The bottom air cooling path is denoted in FIG. 8A by dotted arrows. Under the configuration shown in FIG. 8A, the second set of fans 820 is primarily responsible for directing air along the bottom air cooling path.

Although the base module 120 of FIG. 8A is illustrates as including four fans directing air along two air cooling paths, a base module 120 may comprise any number of fans (e.g., one, two, three, or more than four) and may direct air along any number of cooling paths (e.g., only an upper air cooling path, only a bottom air cooling path, additional air cooling paths, etc.). Furthermore, the particular positioning of the first and second sets of fans of the fan assembly of FIG. 8A (e.g., with the first set of fans being oriented with an angular offset and a translational offset (in 2 dimensions) relative to the first) is provided by way of example only and is non-limiting.

Figure 8B:
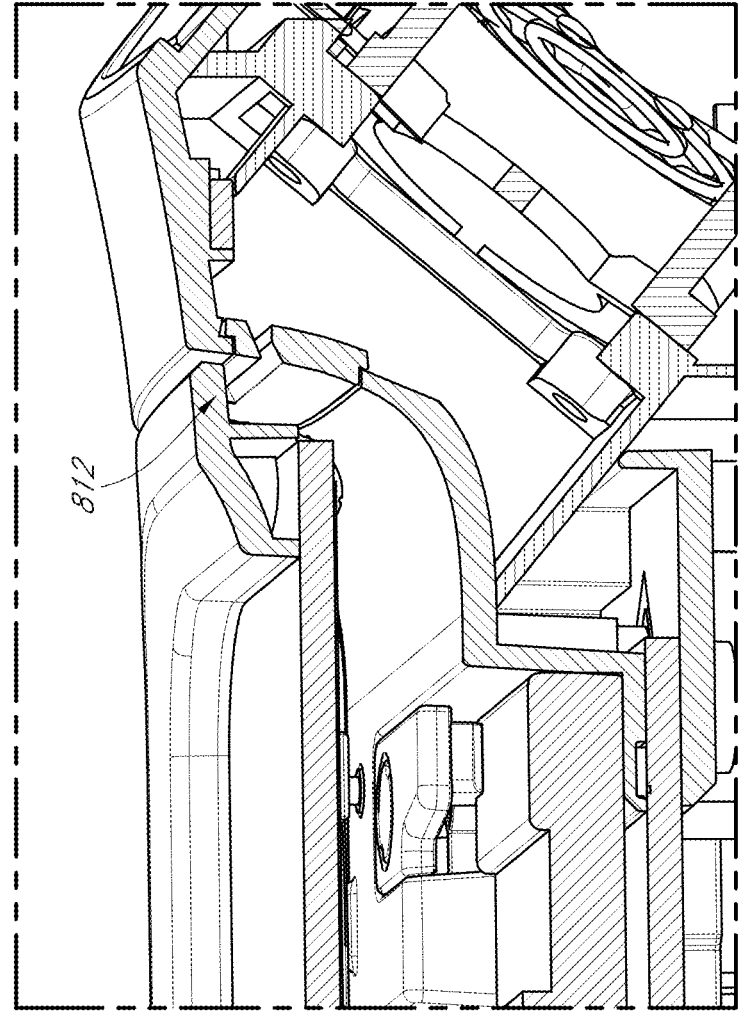
FIG. 8B illustrates a close-up cross-sectional view of an inclined air duct along an upper air cooling path of a base module of a gel electrophoresis system, in accordance with implementations of the present disclosure.

FIG. 8B illustrates a close-up cross-sectional view of a portion of the upper air cooling path of FIG. 8A. The portion of the upper air cooling path depicted in FIG. 8B is denoted by box 802 in FIG. 8A. FIG. 8B illustrates an inclined air duct 812 defining at least a portion of the upper air cooling path (the portion of the upper air path where the air enters the space between the gel electrophoresis cassette and the cover 302 of the base module 120). In some instances, the inclined air duct 812 is adapted to advantageously prevent seepage of liquid from the cassette slot (e.g., cassette slot 310 of FIG. 3B) toward other components of the base module 120.

Example Connection Interfaces of Gel Electrophoresis Systems

Figure 9A:
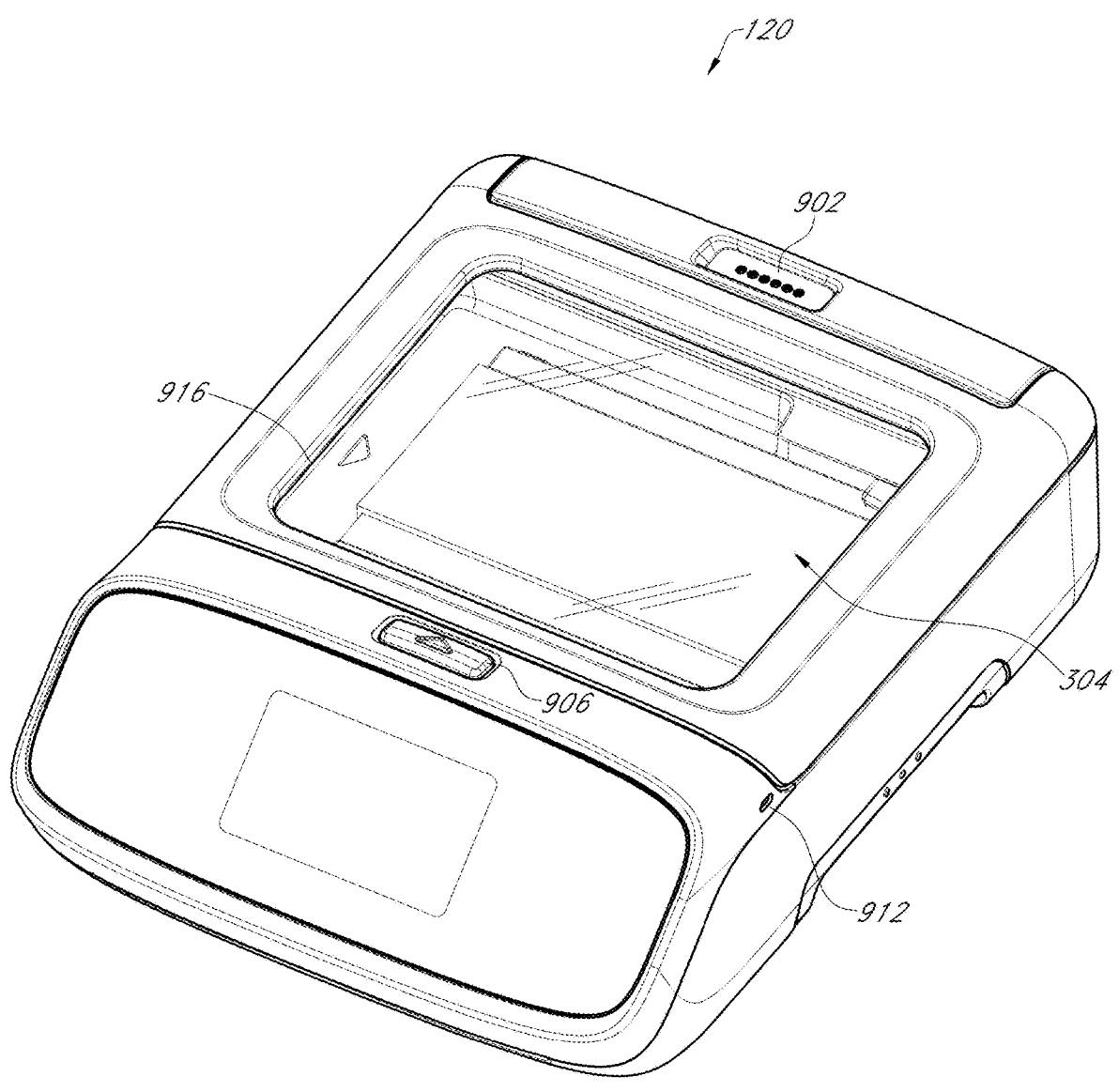
FIG. 9A illustrates a perspective view of a base module of a gel electrophoresis system, in accordance with implementations of the present disclosure.
Figure 9B:
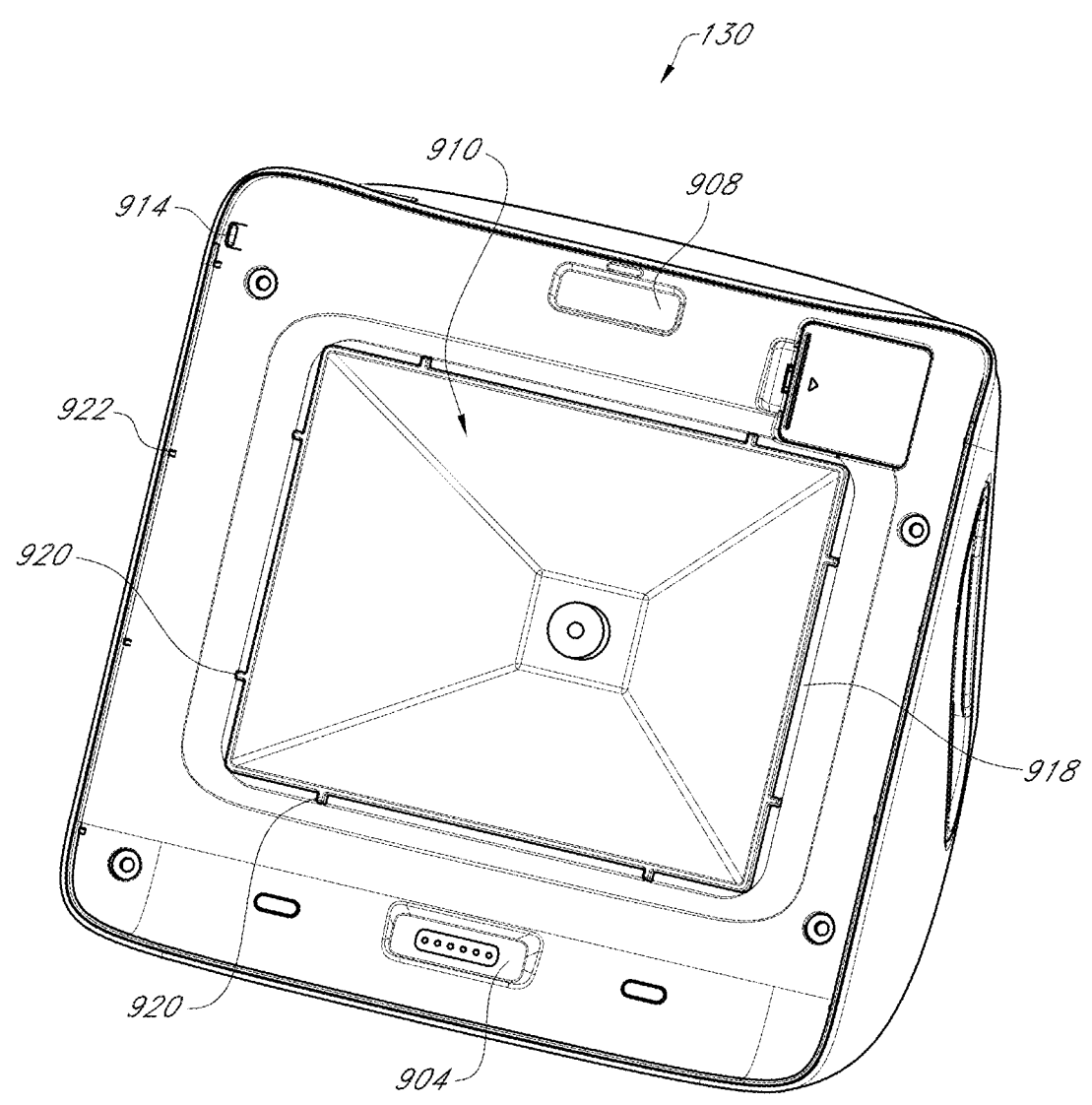
FIG. 9B illustrates a bottom perspective view of a camera module of a gel electrophoresis system, in accordance with implementations of the present disclosure.

As indicated above, a gel electrophoresis system 100 of the present disclosure may include alignment and/or connection features that may facilitate rapid alignment and/or connection of a camera module 130 to a base module 120. FIG. 9A illustrates a perspective view of a base module 120 of a gel electrophoresis system 100, and FIG. 9B illustrates a bottom perspective view of a camera module 130 of a gel electrophoresis system 100.

As further indicated above, the camera module 130 may be configured to receive power from the base module 120 when the camera module 130 is selectively connected over the top portion of the base module 120. To this end, in some implementations, a set of spring-loaded pin connectors (e.g., POGO pin connectors) facilitates electrical communication between the camera module 130 and the base module 120 when the camera module 130 is selectively connected to the base module 120.

Figure 10:
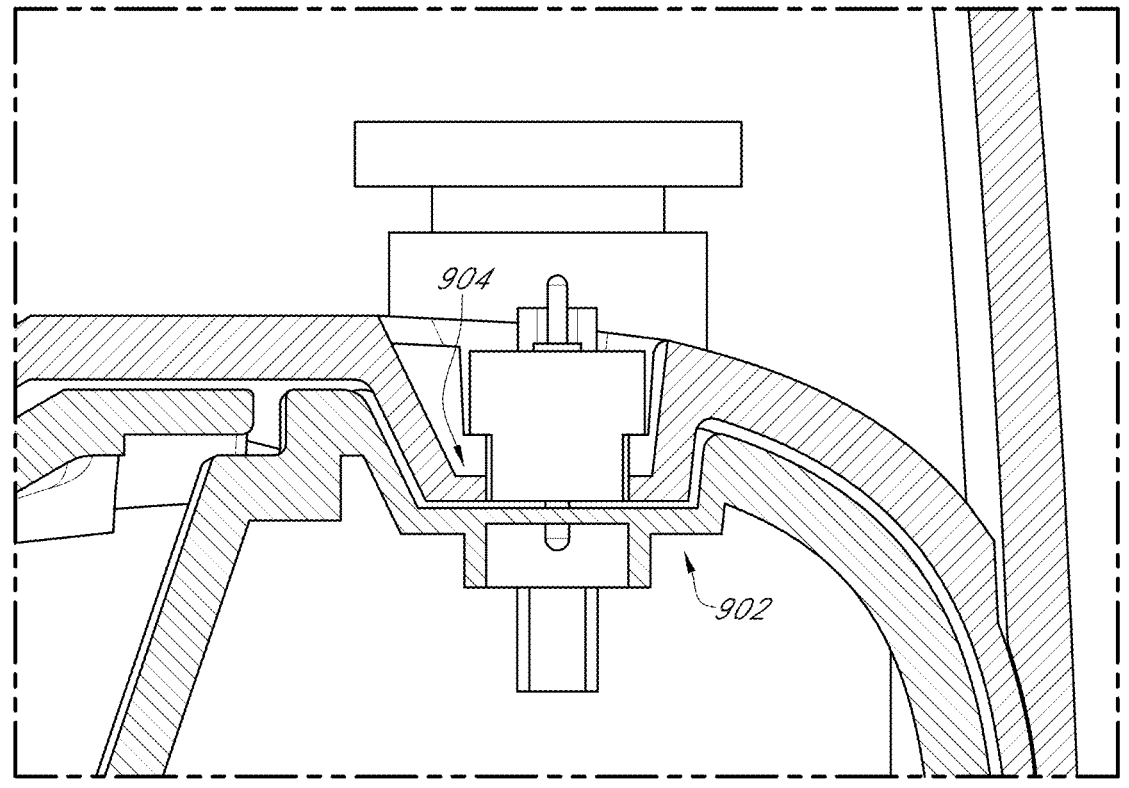
FIG. 10 illustrates a close-up sectional view of a pin connection slot of a gel electrophoresis system, in accordance with implementations of the present disclosure.

FIG. 9A illustrates the base module 120 as including a pin connection slot 902, within which the set of spring-loaded pin connectors may be configured to reside when connecting the camera module 130 to the base module 120. FIGS. 9B and 10 illustrate the camera module 130 as including a corresponding pin connection protrusion 904 configured to insert within and interface with the pin connection slot 902 of the base module 120.

FIG. 10 illustrates a close-up sectional view of the pin connection slot 902 with the pin connection protrusion 904 inserted therein, allowing the set of pin connectors to connect with their corresponding insertion points. In some implementations, the pin connection slot 902 includes a depth within a range of about 2.2 mm to about 5.4 mm. Such a range of depths may comprise an increase in depth relative to conventional gel electrophoresis systems. In some instances, the increased depth of the pin connection slot 902 may contributed to easier alignment and/or connection of the camera module 130 to the base module 120.

FIG. 9A also illustrates an additional connection element 906 positioned opposite the viewing window 304 (e.g., see FIG. 3B) of the base module 120 relative to the pin connection slot 902. FIG. 9B illustrates a corresponding additional connection element 908 positioned opposite the imaging chamber 910 relative to the pin connection protrusion 904. The camera module 130 and base module 120 may include features that enable detection of proper interfacing between the camera module 130 and base module 120. For example, the connection elements (collectively, 902, 904, 906 and/or 908) may comprise one or more sensors or switches to enable detection of whether corresponding connection elements are connected to or interfaced with one another. In some implementations, the elements 902 and 904 and/or the connection elements 906 and 908 may operate in conjunction with each other to detect proper interfacing with one another such that the camera module 130 refrains from booting up or powering on until the connection elements are properly interfaced with their corresponding counterparts. For example, a connection element on the base module 120 may include a magnet sensor while a corresponding connection element on the camera module 130 includes a magnet, or vice versa. Such functionality may assist users in avoiding inadvertent boot-ups while attempting to align the camera module 130 with the base module 120 for placement thereover.

Figure 11:
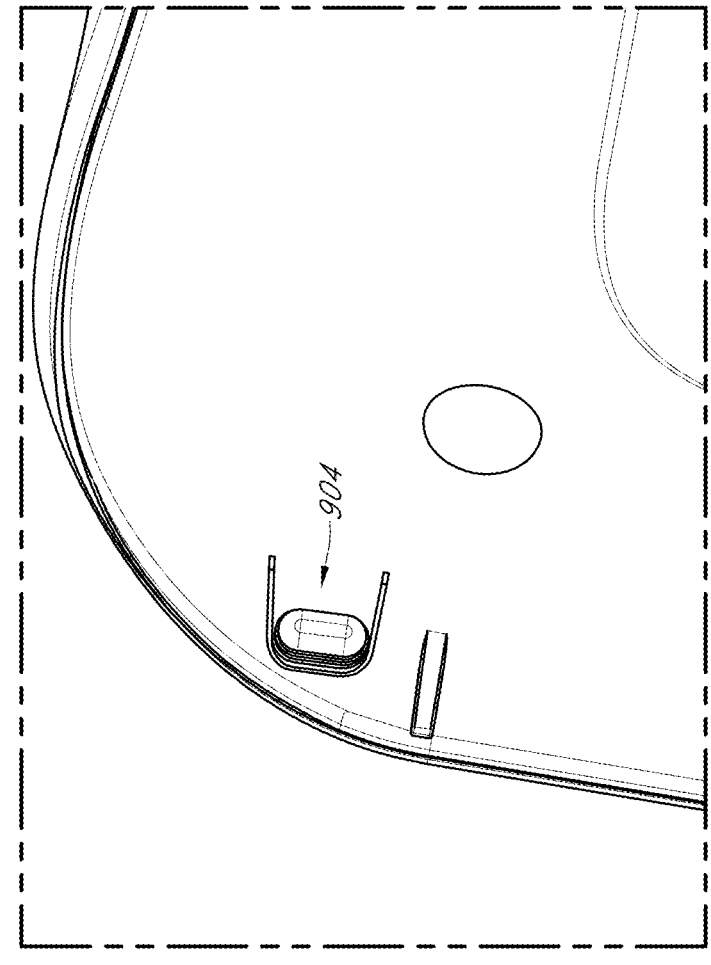
FIG. 11 illustrates a close-up view of a flex catch of a camera module of a gel electrophoresis system, in accordance with implementations of the present disclosure.

FIG. 9A furthermore illustrates that the base module 120 may comprise a flex catch slot 912, and FIG. 9B illustrates that the camera module 130 may comprise a corresponding flex catch 914. FIG. 11 provides a close-up view of the flex catch 914 of the camera module 130. In some implementations, the flex catch slot 912 of the base module 120 and the corresponding flex catch 914 of the camera module 130 are configured to engage with one another when the camera module 130 is selectively connected over the top portion of the base module 120 to reduce tilting motion of the camera module 130 relative to the base module 120.

One will appreciate, in view of the present disclosure, that the arrangement of the flex catch on the camera module and the flex catch slot on the base module may be reversed in some implementations.

FIG. 9A illustrates that the base module 120 may comprise a perimeter wall 916 extending upward from and about the perimeter of the viewing window 304 (and/or upward from and about the perimeter of the emission filter 306 that spans the viewing window 304, see FIGS. 3A and 3B). FIG. 9B furthermore illustrates the imaging chamber 910 formed on the underside of the camera module 130, with an engagement wall 918 extending thereabout. The imaging chamber 910 is configured to become disposed over the viewing window 304 of the base module 120 when the camera module 130 is selectively connected to the base module 120.

Figure 12:
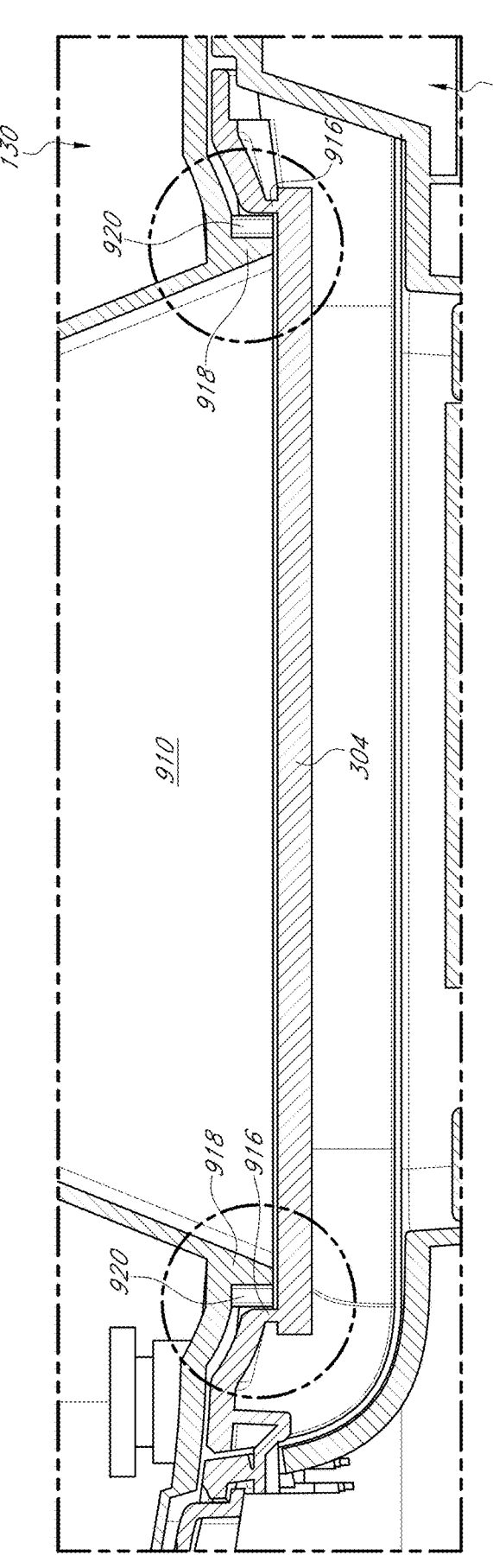
FIG. 12 illustrates a close-up sectional view of an interface between a camera module and a base module of a gel electrophoresis system, in accordance with implementations of the present disclosure.

FIG. 12 illustrates a close-up sectional view of an interface between a camera module 130 and a base module 120 when the camera module 130 is selectively connected over the base module 120. FIG. 12 shows the engagement wall 918 of the camera module 130 (e.g., extending about a perimeter of the imaging chamber 910). FIG. 12 furthermore shows the arrangement of the perimeter wall 916 and viewing window 304 of the base module 120 relative to the engagement wall 918 of the camera module 130 when the camera module 130 is connected to the base module 120 (emphasized by the grey circles shown in FIG. 12).

As is evident in FIG. 12, the engagement wall 918 of the camera module is configured to reside over the viewing window 304 and within a perimeter defined by the perimeter wall 916 of the base module 120 when the camera module 130 is selectively connected to the base module 120. In this way, the engagement wall 918 of the camera module 130 may be configured to fit within a depression formed by perimeter wall 916 and the viewing window 304 (e.g., the emission filter 306), thereby facilitating easy connection of the camera module 130 to the base module 120 for users. In some implementations, the perimeter wall includes a height within a range of about 2 mm to about 5 mm, but other heights are within the scope of the present disclosure.

FIG. 9B furthermore illustrates that, in some instances, the engagement wall 918 of the camera module includes tabs 920 extending outward therefrom. These tabs 920 are also illustrated in FIG. 12. The tabs 920 are configured to intervene between the engagement wall 918 and the perimeter wall 916 when the camera module 130 is selectively connected over the top portion of the base module 120. In some instances, the tabs 920 advantageously contribute to tightened engagement between the camera module 130 and the base module 120.

FIG. 9B also shows that the camera module 130 may comprise one or more outer tabs 922 to further tighten engagement between the camera module 130 and the base module 120 when the camera module 130 is selectively connected over the top portion of the base module 120.

Figure 13:
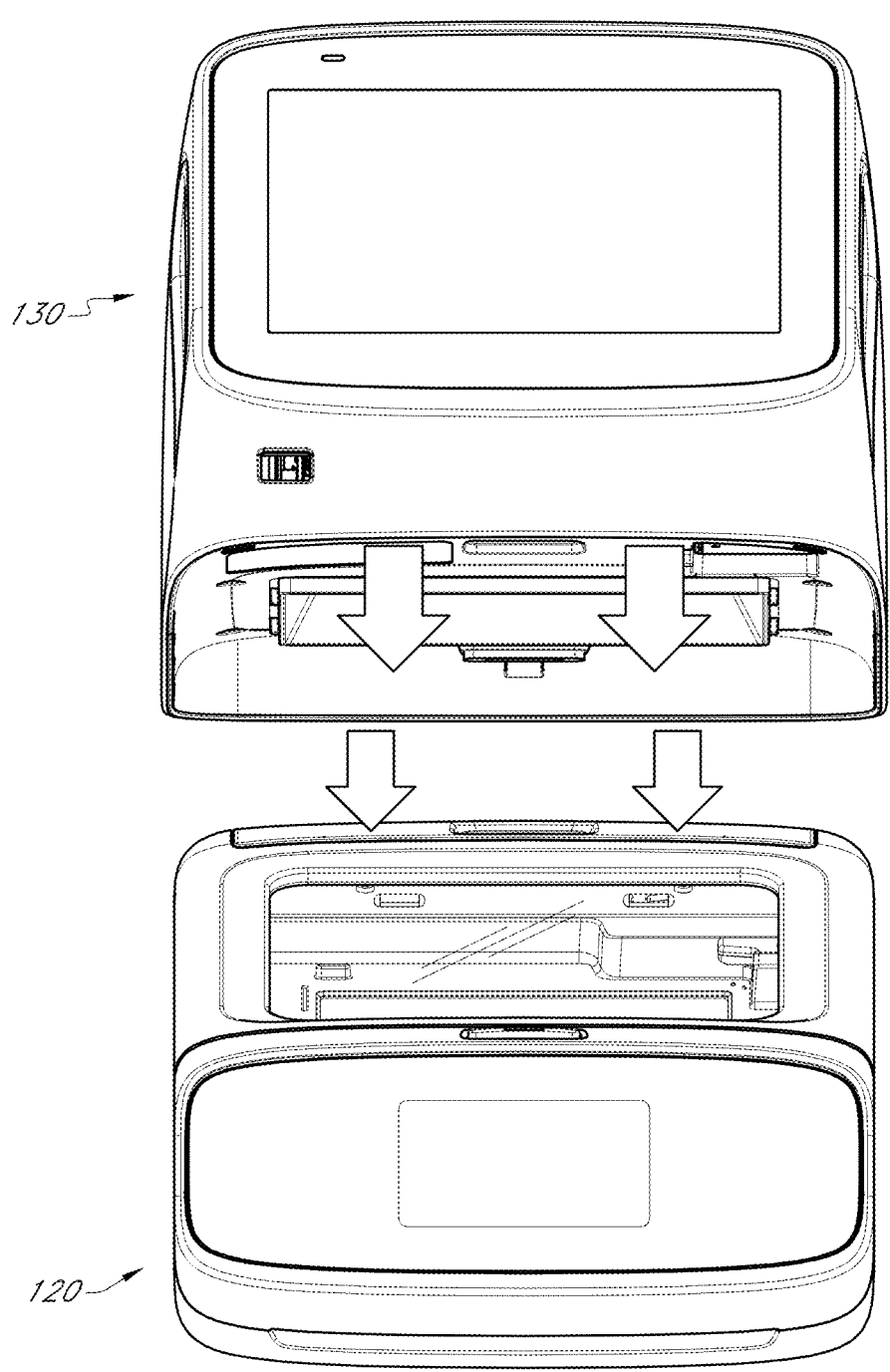
FIG. 13 illustrates a conceptual representation of magnetic connection elements of a gel electrophoresis system, in accordance with implementations of the present disclosure.

FIG. 13 illustrates a conceptual representation of magnetic connection elements of a gel electrophoresis system 100. For example, FIG. 13 shows a base module 120 and a camera module 130 disconnected from one another. The arrows shown in FIG. 13 extending from the camera module 130 illustrate example positions magnet elements on the camera module 130. The magnetic elements of the camera module 130 may interact with correspondingly placed magnetic elements on the base module to further improve ease of mounting of the camera module 130 onto the base module.

Example Camera Module Air Inlets of Gel Electrophoresis Systems

Figure 14A:
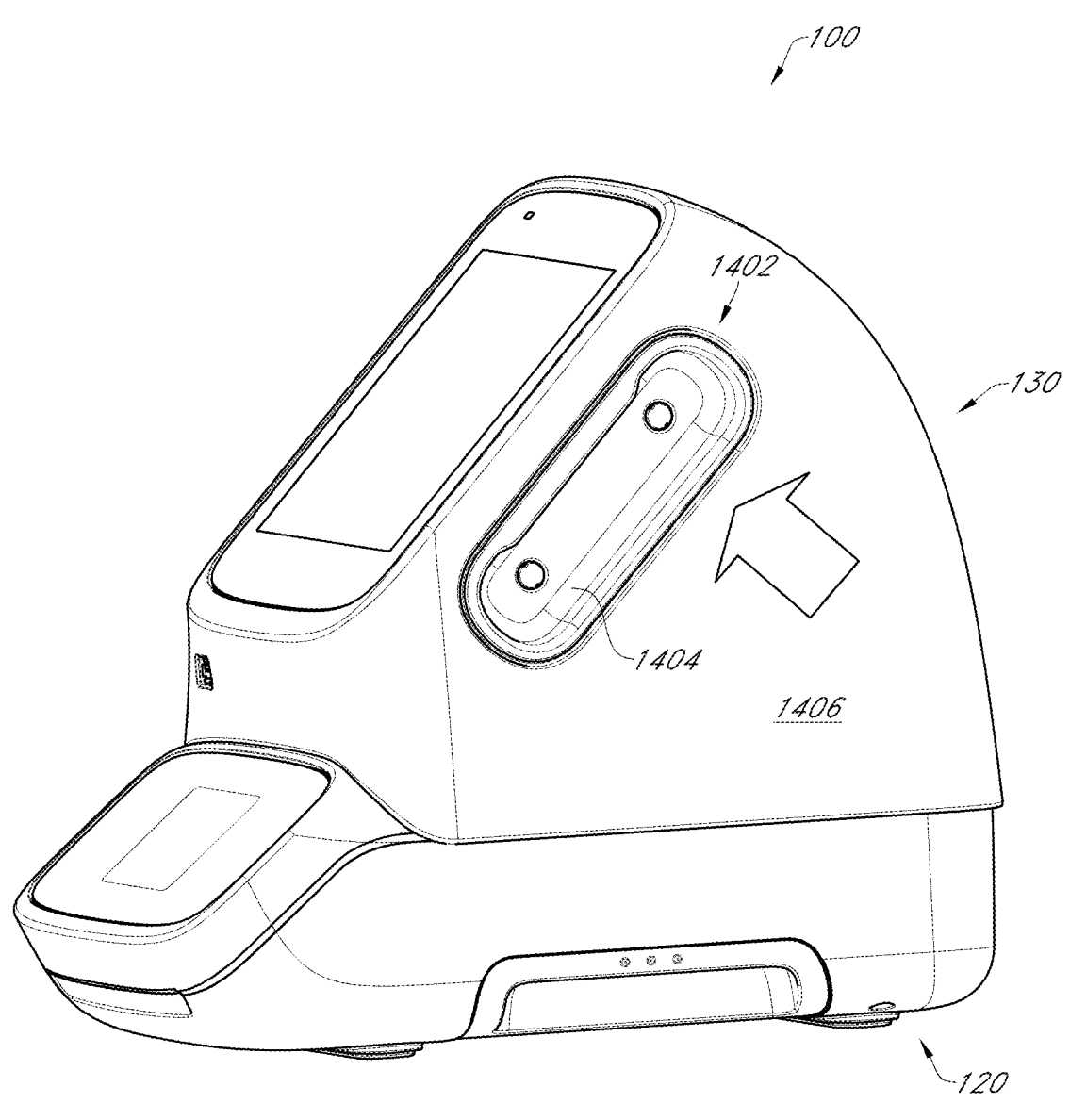
FIG. 14A illustrates an example air inlet of a camera module of a gel electrophoresis system, in accordance with implementations of the present disclosure.
Figure 14B:
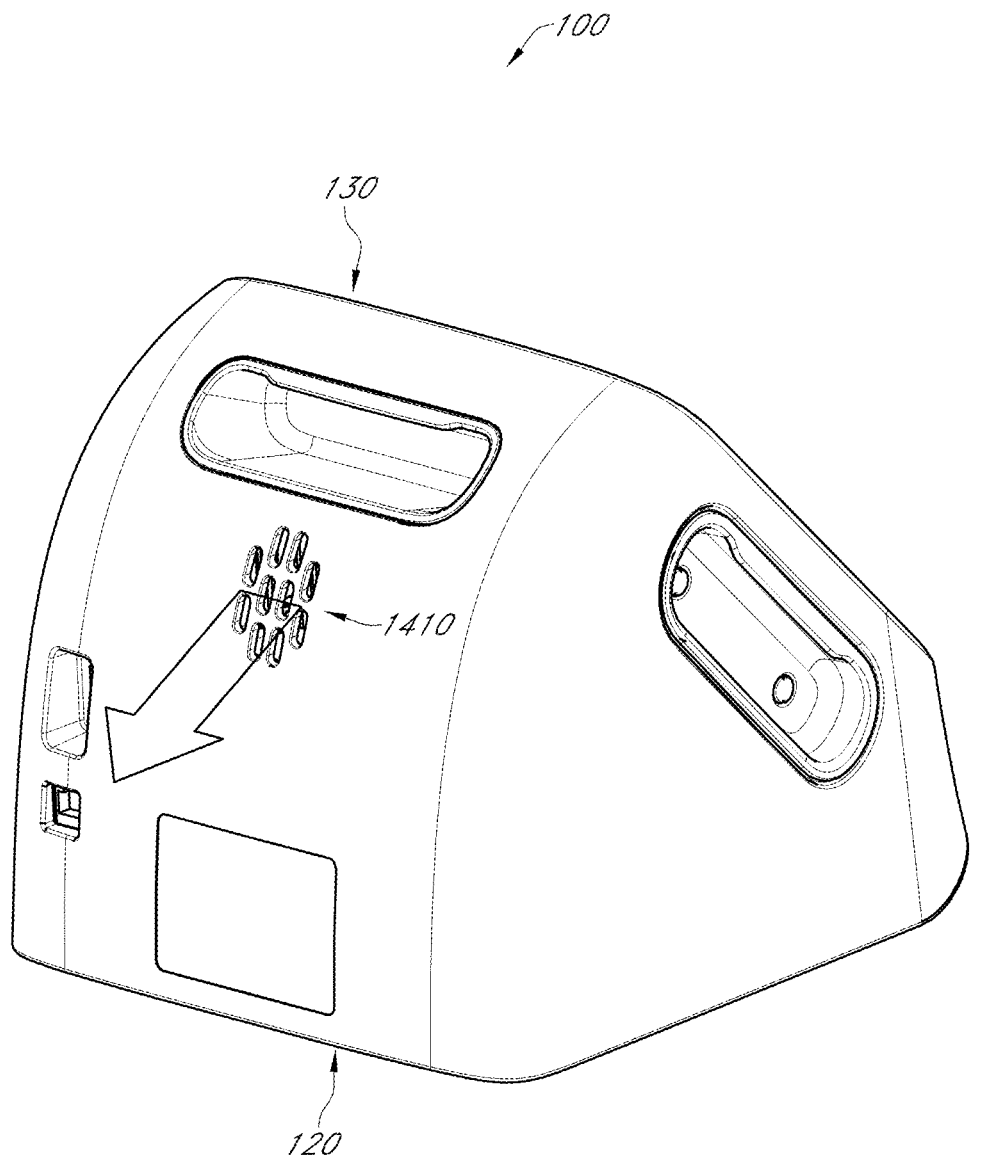
FIG. 14B illustrates an example air outlet of a camera module of a gel electrophoresis system, in accordance with implementations of the present disclosure.

As indicated above, at least some gel electrophoresis systems 100 of the present disclosure may include camera module air inlets that facilitate air entry while at least partially preventing external light from entering the camera module interior. FIG. 14A illustrates an example air inlet path 1402 of a camera module 130 of a gel electrophoresis system 100. FIG. 14B illustrates an example air outlet path 1410 of a camera module 130 of a gel electrophoresis system 100.

The arrow in FIGS. 14A and 14B indicate the direction of air flow into the air inlet path 1402 and out of the air outlet path 1410 of the camera module 130. As will be shown in more detail hereinafter, the air inlet path 1402 may be formed between the handle 1404 and the outer housing 1406 of the camera module 130. Thus, as is evident from FIG. 14A, the presence of the air inlet path 1402 may be substantially concealed by the handle 1404 of the camera module 130, providing an improved exterior aesthetic.

Figure 15:
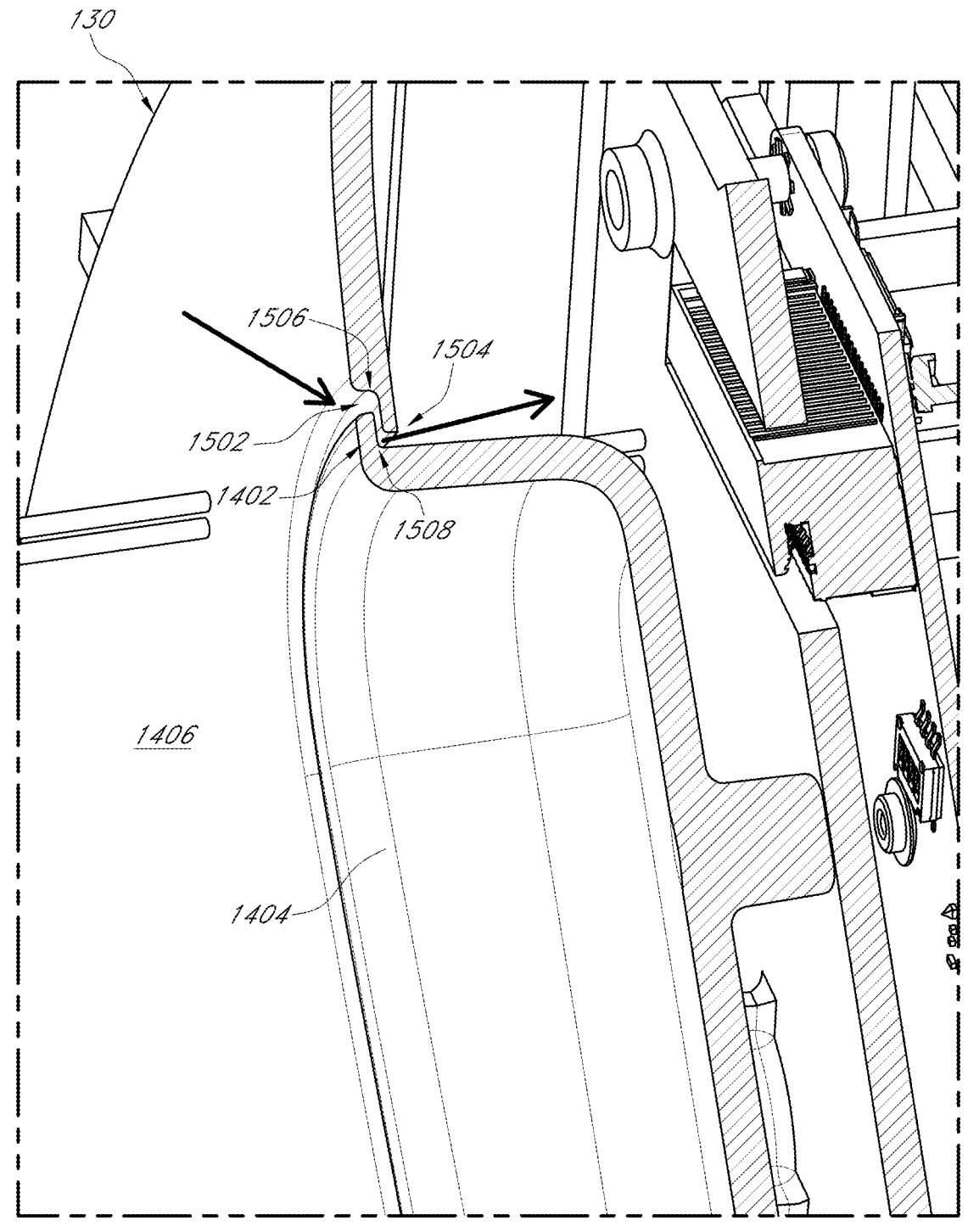
FIG. 15 illustrates a close-up sectional view of an air inlet path of a camera module of a gel electrophoresis system, in accordance with implementations of the present disclosure.

FIG. 15 illustrates a close-up sectional view of an air inlet path 1402 of a camera module 130 of a gel electrophoresis system 100. The arrows in FIG. 15 indicate the direction of air flow through the air inlet path 1402. As is evident from FIG. 15, the air inlet path 1402 extends from an exterior opening 1502 of the camera module 130 to an interior opening 1504 of the camera module. FIG. 15 also shows that the air inlet path includes two path bends 1506 and 1508 between the exterior opening 1502 and the interior opening 1504 (any number of path bends may be used).

FIGS. 14A and 15 illustrate that the exterior opening 1502 of the air inlet path 1402 comprises an elongated exterior opening that extends about the exterior perimeter of the handle 1404. The exterior opening 1502 thus forms an exterior shape on the exterior of the camera module 130 (e.g., corresponding to the shape of the outer perimeter of the handle 1404). Correspondingly, the interior opening 1504 comprises an elongated interior opening that extends about a perimeter of an opening of the outer housing 1406 of the camera module 130 through which the handle 1404 extends. The interior opening 1504 thus forms an interior shape on an interior of the camera module 130. In the example shown in FIG. 15, the interior shape formed by the interior opening 1504 of the air inlet path 1402 has a smaller perimeter than the exterior shape formed by the exterior opening 1502 of the air inlet path. In some implementations, the relative sizes of the interior and exterior shapes may be reversed.

Although not shown in FIG. 14A or 15, a second air inlet path may be arranged on the camera module 130 at a position that is opposite to the air inlet path 1402 discussed above (e.g., formed between a second handle of the camera module 130 and the exterior housing 1406 of the camera module 130).

Although the air inlet path 1402 of FIG. 15 is illustrated as formed between the handle 1404 and the outer housing 1406 of the camera module 130, one or more air inlet paths with one or more path bends may be formed on other portions of the camera module 130 in accordance with the present disclosure.

Figure 16A:
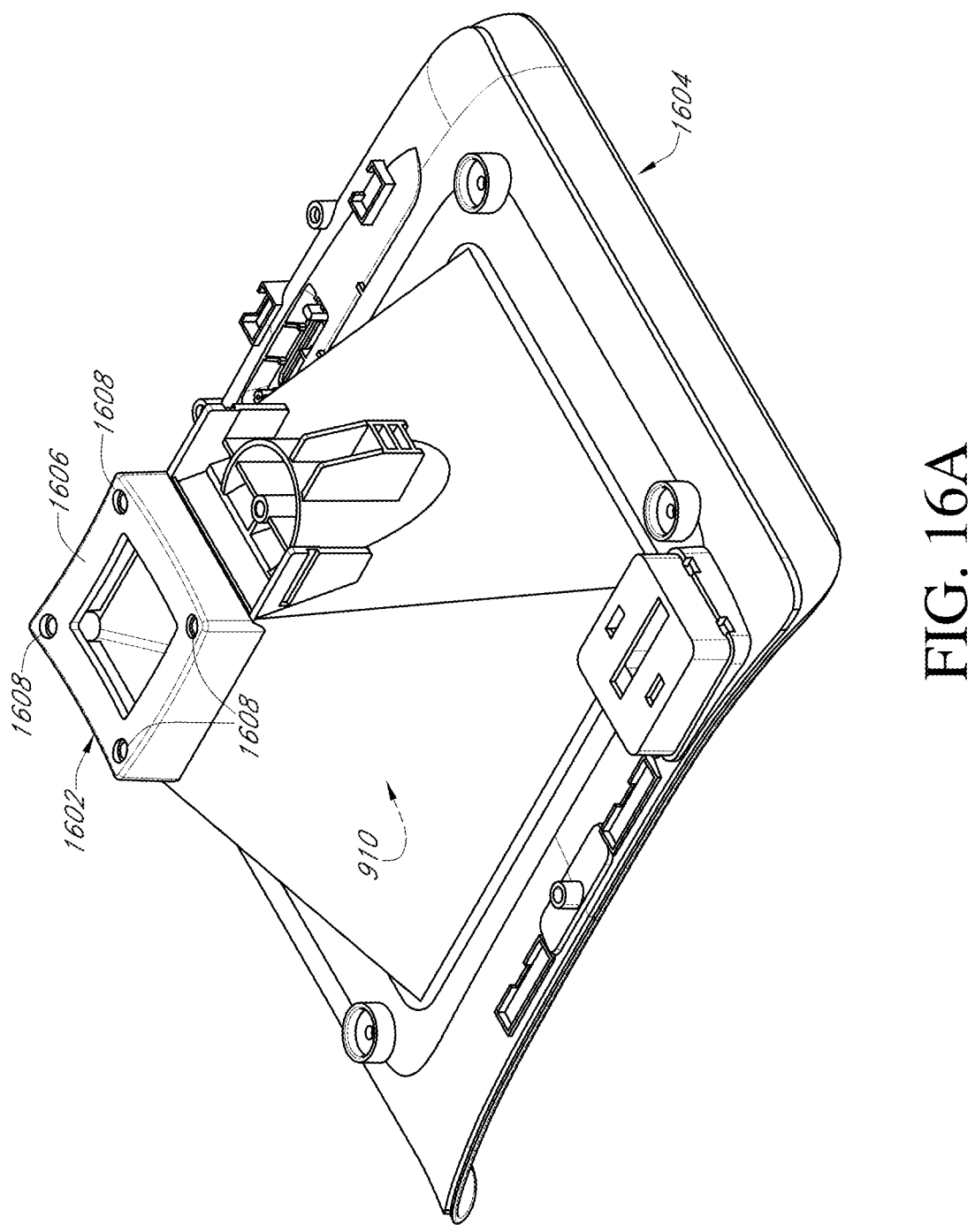
FIGS. 16A and 16B illustrate example views of a stage support of a camera module of a gel electrophoresis system, in accordance with implementations of the present disclosure.
Figure 16B:
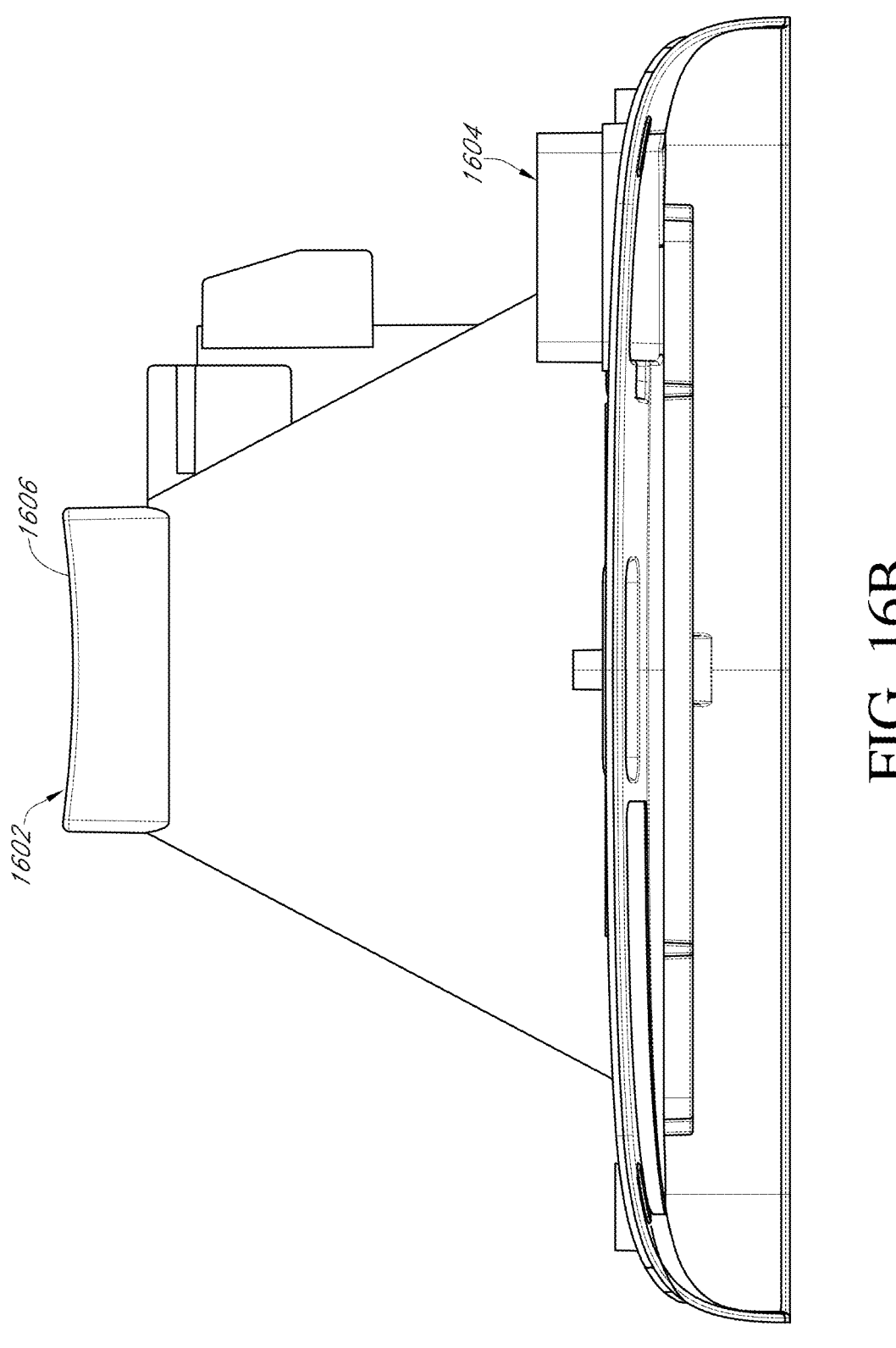

Example Camera and Lens Adjustment Components of Gel Electrophoresis Systems As indicated above, a gel electrophoresis system 100 may include a camera adjustment stage that supports a camera and that forms a spherical interface with a stage support of the camera module 130. FIGS. 16A and 16B illustrate example views of a stage support 1602 of a camera module 130 of a gel electrophoresis system 100. In the example shown in FIGS. 16A and 16B, the stage support 1602 comprises part (e.g., a top part) of a housing component 1604 of the camera module 130 that also forms the imaging chamber discussed hereinabove (e.g., imaging chamber 910 of FIG. 9B, also shown in FIG. 16A). As shown (perhaps most clearly) in FIG. 16B, the stage support 1602 of the camera module 130 includes or forms a spherical surface 1606.

Figure 17A:
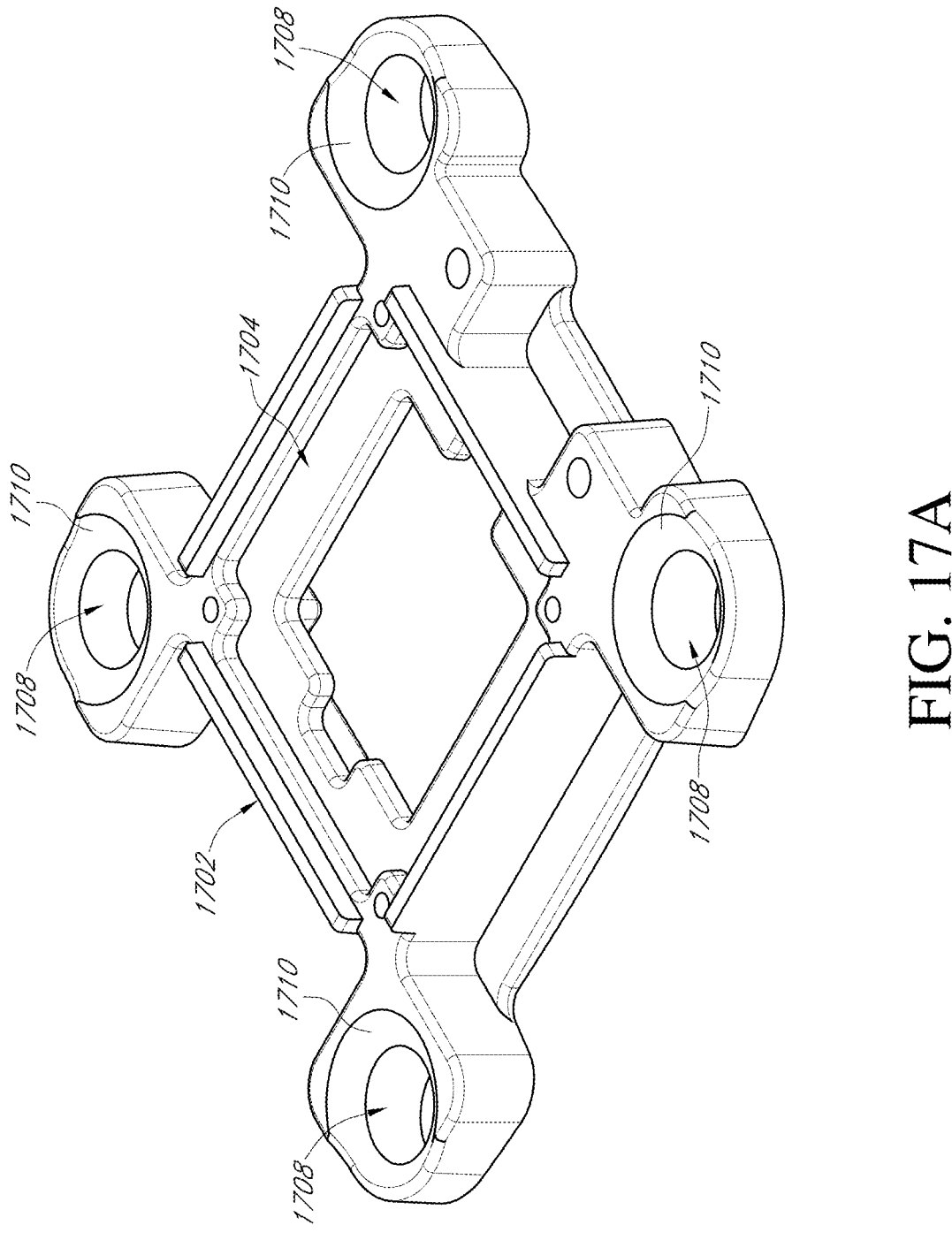
FIGS. 17A, 17B, and 17C illustrate example views of a camera adjustment stage of a camera module of a gel electrophoresis system, in accordance with implementations of the present disclosure.
Figure 17B:
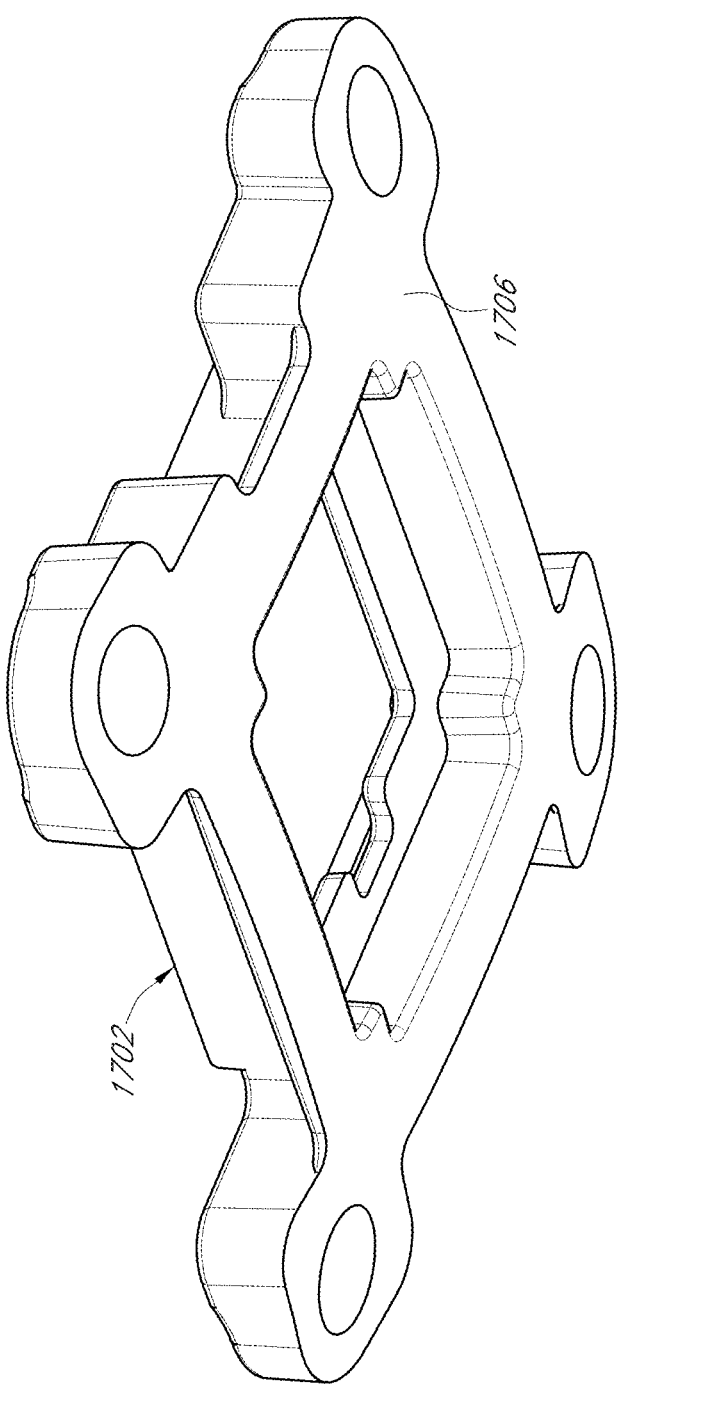
Figure 17C:
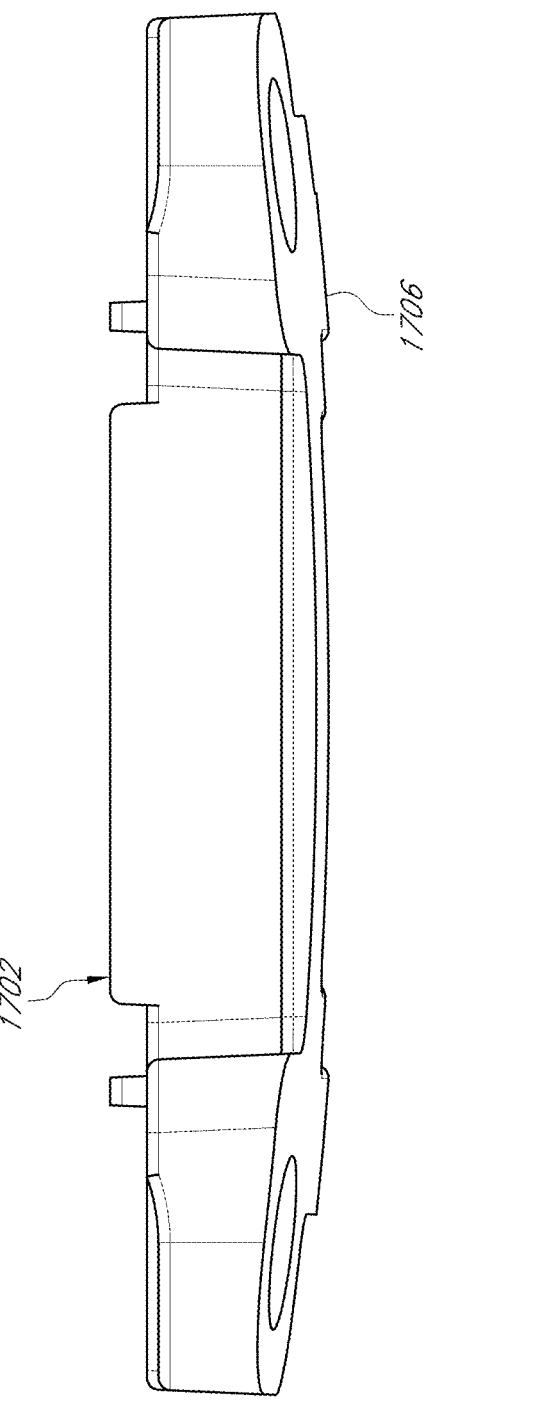

FIGS. 17A, 17B, and 17C illustrate example views of a camera adjustment stage 1702 of a camera module 130 of a gel electrophoresis system 100. In particular, FIG. 17A shows a top perspective view of the camera adjustment stage 1702, FIG. 17B shows a bottom perspective view thereof, and FIG. 17C shows a side view thereof.

Figure 18:
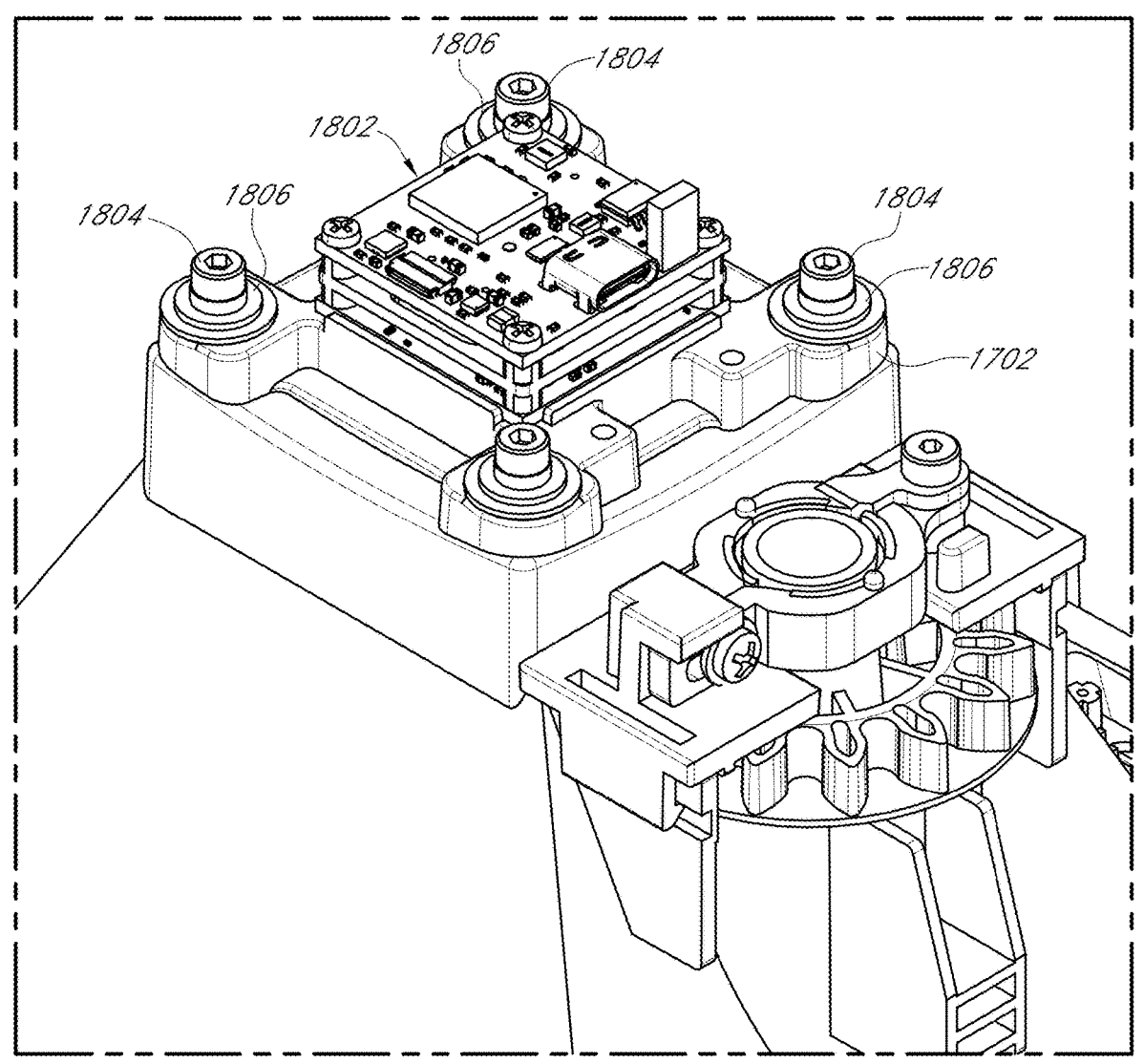
FIG. 18 illustrates a camera adjustment stage with camera components positioned thereon, where the camera adjustment stage is secured to a stage support of a camera module of a gel electrophoresis system, in accordance with implementations of the present disclosure.

FIG. 17A shows that the example camera adjustment stage 1702 includes a camera mount 1704 configured to support one or more components of a camera of the camera module 130 (see FIG. 18, with the camera components 1802 mounted to the camera adjustment stage 1702). FIGS. 17B and 17C illustrate that the camera adjustment stage 1702 includes a spherical surface 1706 that corresponds to the spherical surface 1606 of the stage support 1602 of the camera module 130. The spherical surface 1706 of the camera adjustment stage 1702 is configured to interface with the spherical surface 1606 of the stage support 1602 such that the spherical surfaces 1706 and 1606 are able to remain in contact with one another despite rotational adjustments (e.g., polar rotations and/or azimuthal rotations) of the camera adjustment stage 1702 relative to the stage support 1602. Stated differently, the spherical surfaces 1706 and 1606 facilitate spherical joint adjustment of the camera adjustment stage 1702, which may be accomplished by adjusting the positioning (e.g., the polar and/or azimuthal rotational positioning) of the spherical surface 1706 of the camera adjustment stage 1702 relative to the spherical surface 1606 of the stage support 1602.

When a desired spherical joint positioning of the camera adjustment stage 1702 is achieved relative to the stage support 1602, the camera adjustment stage 1702 may be secured to the stage support 1602. The example of FIG. 16A shows that the stage support 1602 may include threaded holes 1608 for receiving screws to secure the camera adjustment stage 1702 to the stage support 1602. The example of FIG. 17A shows that the camera adjustment stage 1702 may include holes 1708 through which the screws may pass before entering the threaded holes 1608 of the stage support 1602. To facilitate securement of the camera adjustment stage 1702 to the stage support 1602 in a manner that accommodates multiple spherical joint positionings of the camera adjustment stage 1702, spherical washers may be used to intervene between the screw heads of the screws and the camera adjustment stage 1702. Such spherical washers may be arranged on additional spherical interfaces 1710 of the camera adjustment stage (shown in FIG. 17A).

FIG. 18 illustrates the camera adjustment stage 1702 with camera components 1802 mounted thereon. The camera adjustment stage 1702 of FIG. 18 is mounted to the stage support 1602 via screws 1804 and corresponding spherical washers 1806. As discussed above, the spherical washers facilitate securement of the camera adjustment stage 1702 to the stage support 1602 of the camera module 130 in a manner that accommodates multiple positionings of the camera adjustment stage 1702 relative to the stage support 1602.

Although FIGS. 16A through 18 show four spherical washers, screws, and corresponding holes are shown in association with respective corners of the camera adjustment stage and stage support, one will appreciate, in view of the present disclosure, that additional or fewer spherical washers, screws, and/or corresponding holes may be utilized.

Figure 19:
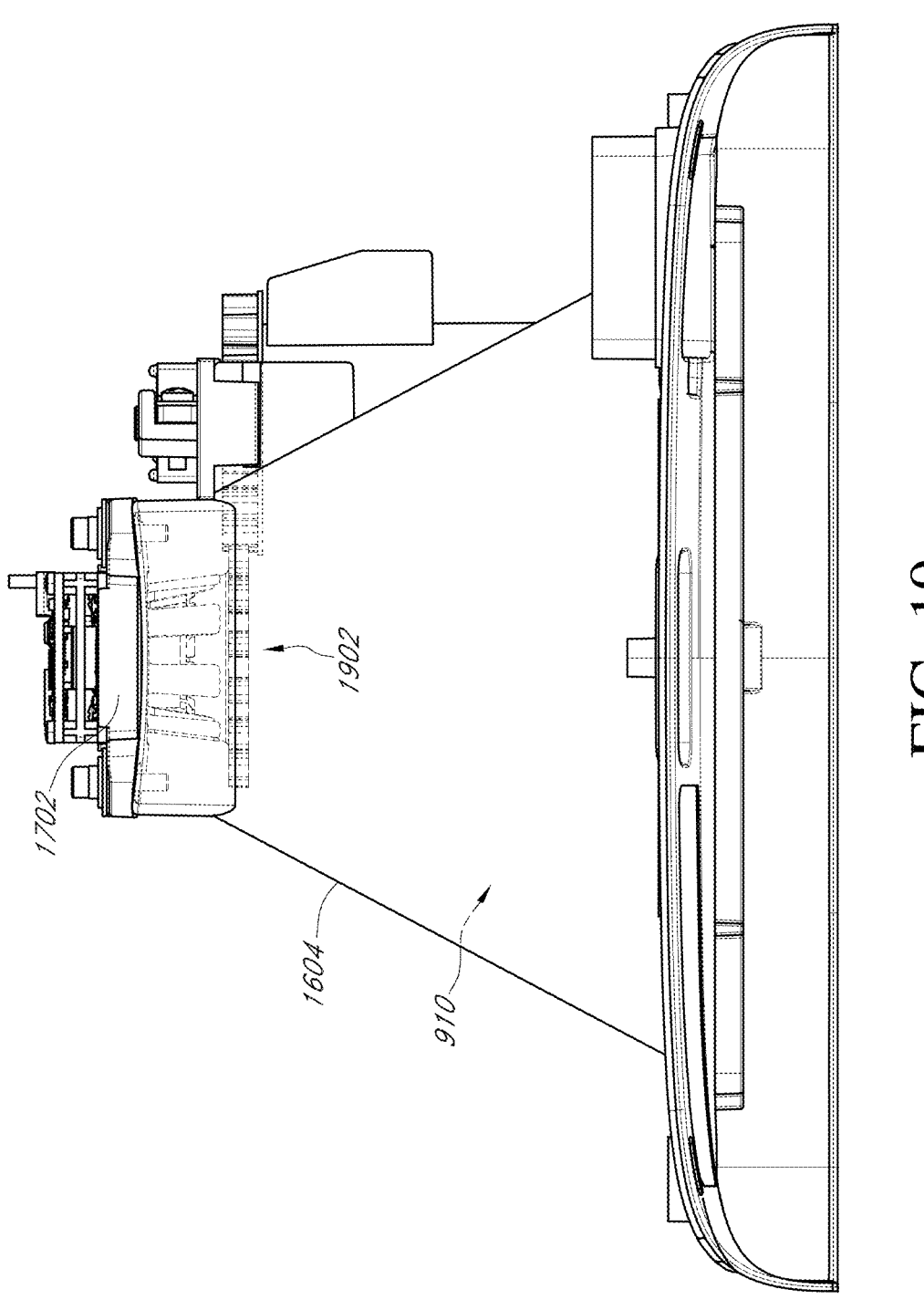
FIG. 19 illustrates an example lens assembly extending from a camera adjustment stage of a camera module of a gel electrophoresis system, in accordance with implementations of the present disclosure.

FIG. 19 illustrates an example lens assembly 1902 extending downward from the camera adjustment stage 1702 within the imaging chamber 910 of the camera module 130 (the housing component 1604 of the camera module 130 is made partially transparent to clearly illustrate the lens assembly 1902 within the imaging chamber 910). The lens assembly 1902 includes a lens sleeve that houses a lens for focusing light onto an image sensor of the camera of the camera module 130. The lens sleeve is rotatable to facilitate focal adjustment of the lens within the lens sleeve.

Figure 20A:
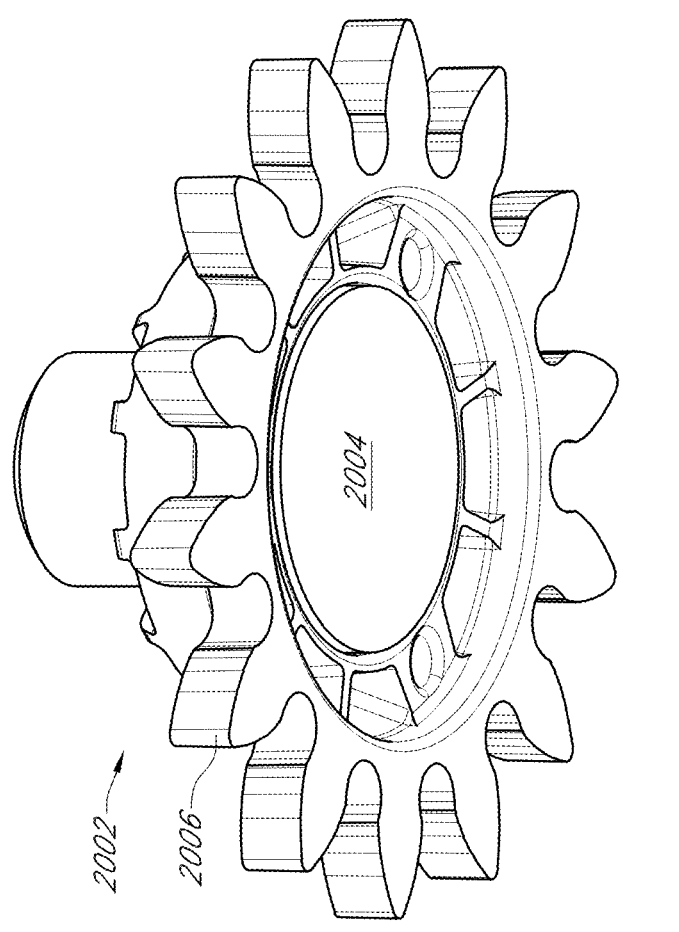
FIGS. 20A and 20B illustrate example views of a lens sleeve of a lens assembly of a camera module of a gel electrophoresis system, in accordance with implementations of the present disclosure.
Figure 20B:
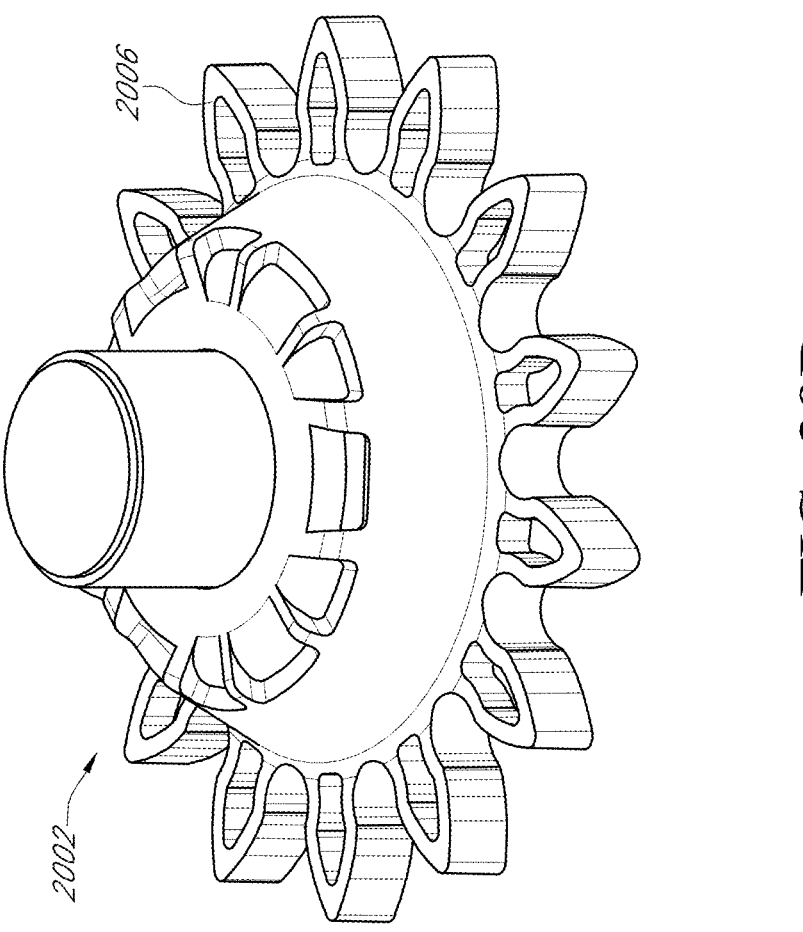

FIGS. 20A and 20B illustrate example views of a lens sleeve 2002 of the lens assembly 1902 of the camera module 130. FIG. 20A illustrates the lens 2004 arranged within the lens sleeve 2002. To facilitate adjustment of the lens 2004, the lens sleeve 2002 includes a lens gear 2006 with gear teeth extending radially outward from the lens sleeve 2002. The lens gear 2006 is coupled to the lens sleeve 2002 such that rotation of the lens gear 2006 causes rotation of the lens sleeve 2002 to facilitate adjustment of the lens 2004.

As shown in FIG. 19, the lens gear 2006 is positioned within the imaging chamber 910. Thus, to facilitate focal adjustments of the lens 2004 without direct access to the lens gear 2006 within the imaging chamber 910, the lens gear 2006 may engage with a separate gear.

Figure 21:
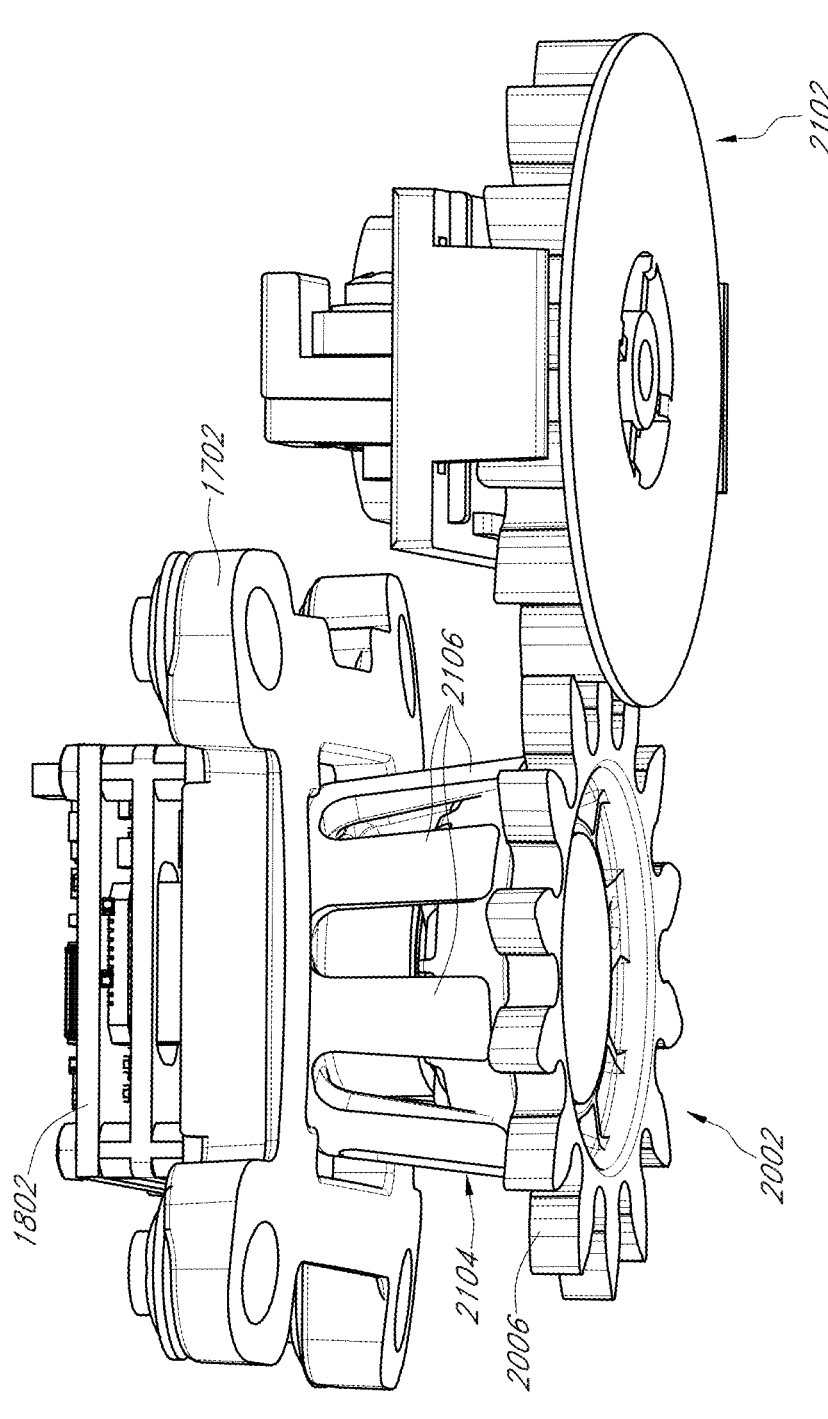
FIG. 21 illustrates a lens sleeve and a focus adjustment gear of a camera module of a gel electrophoresis system, in accordance with implementations of the present disclosure.

FIG. 21 illustrates the gear teeth of the lens sleeve 2002 engaged with corresponding gear teeth of a focus adjustment gear 2102. Although not shown in FIG. 21, the focus adjustment gear 2102 may be separately mounted to the housing component 1604 of the camera module 130 and may be accessible from an outside of the imaging chamber 910 (see, briefly, FIG. 19, showing one portion of the focus adjustment gear 2102 extending into the imaging chamber 910 and another portion of the focus adjustment gear extending outside of the imaging chamber 910).

Figure 22:
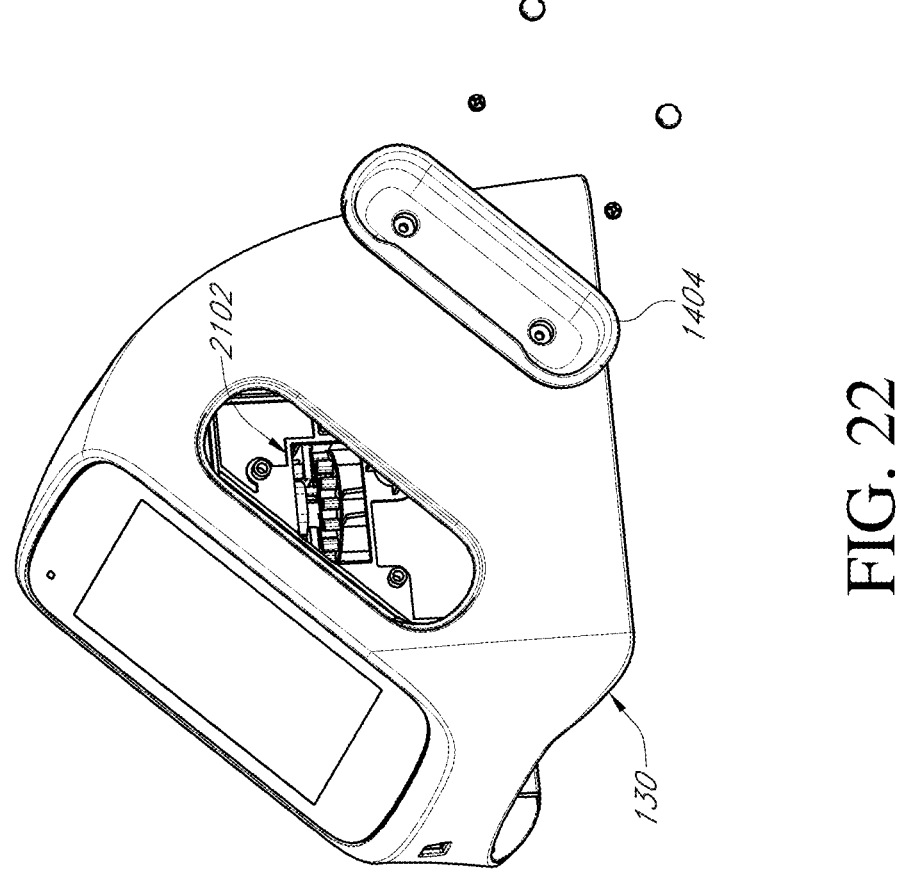
FIG. 22 illustrates an example camera module of a gel electrophoresis system with a handle removed therefrom, in accordance with implementations of the present disclosure.

With the focus adjustment gear 2102 engaged with the lens gear 2006, when a user rotates of the focus adjustment gear 2102 (e.g., from outside of the imaging chamber 910, such as when the camera module 130 is mounted to the base module 120), the focus adjustment gear 2102 causes rotation of the lens gear 2006 and the lens sleeve 2002, thereby causing adjustment to the focus position of the lens 2004. Users may thus advantageously adjust the focus position of the lens 2004 without removing the camera module 130 from the base module 120 to directly access components within the imaging chamber. For instance, FIG. 22 illustrates an example camera module 130 of a gel electrophoresis system 100 with a handle 1404 removed therefrom. In some implementations, the focus adjustment gear 2102 is advantageously accessible through an opening formed after removing the handle 1404 from the camera module 130.

As noted above, the positioning of the camera of the camera module 130 is adjustable via adjustment of the camera adjustment stage 1702. Thus, in some implementations, one or more alignment or biasing members are used to maintain the optical alignment of the lens relative to the camera throughout adjustments of the camera adjustment stage 1702. For example, FIG. 21 illustrates an octopus ring 2104 positioned about the lens sleeve 2002 and secured to the camera adjustment stage 1702. The octopus ring 2104 includes alignment members 2106 positioned about the lens sleeve 2002. In some instances, at least some of the alignment members 2106 exert a biasing force on the lens sleeve 2002 (e.g., an inward force) to maintain the alignment of the lens sleeve (and lens) relative to the camera components 1802 mounted to the camera adjustment stage 1702.

Figure 23:
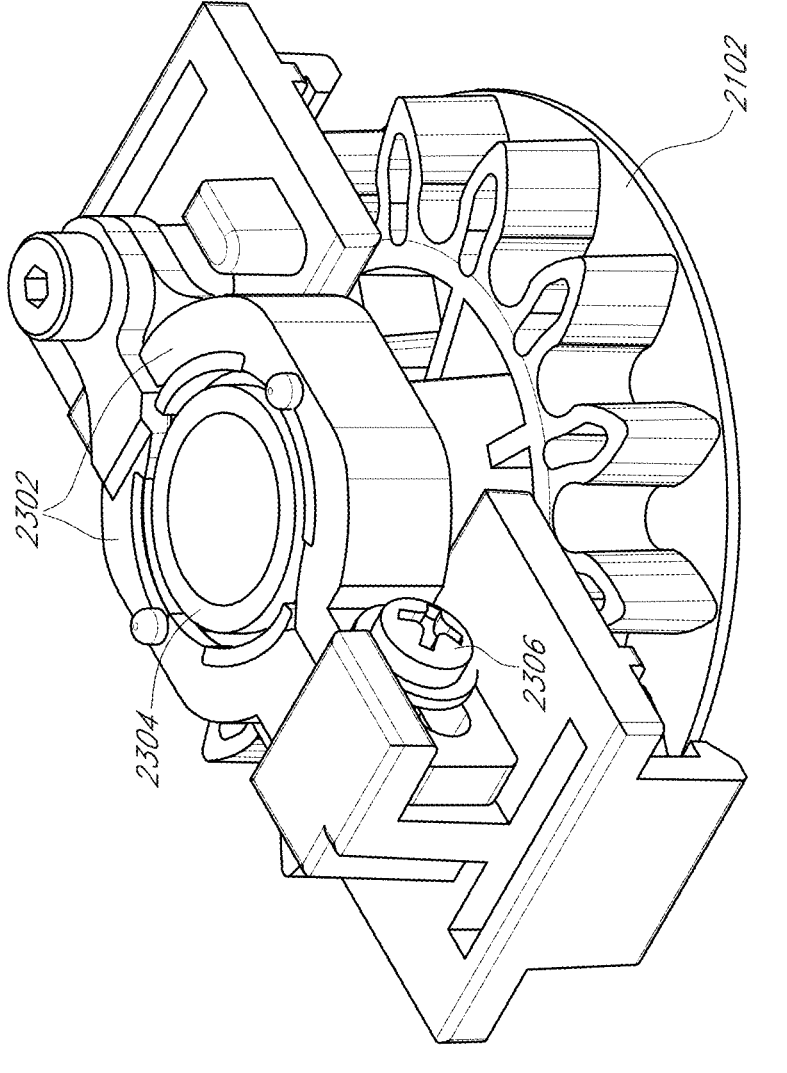
FIG. 23 illustrates a focus adjustment gear of a camera module of a gel electrophoresis system, in accordance with implementations of the present disclosure.

FIG. 23 illustrates a perspective view of a focus adjustment gear 2102. In some implementations, the position of the focus adjustment gear 2102 is selectively lockable, which may prevent inadvertent adjustments to the focus position of the lens sleeve 2002 (e.g., due to vibrations, transportation of the camera module 130, etc.). For example, in some implementations, selective locking of the position of the focus adjustment gear 2102 is facilitated utilizing a pair of locking members 2302, which are configured to selectively tighten about at least a portion of the focus adjustment gear 2102 to selectively lock the position of the focus adjustment gear 2102.

In the example of FIG. 23, the pair of locking members 2302 are positioned on opposing sides of an upper portion 2304 of the focus adjustment gear 2102. A locking screw 2306 is utilized to facilitate selective tightening of the locking members 2302 to secure the position of the focus adjustment gear 2102. For example, rotation of the locking screw 2306 in a first direction may draw the locking members 2302 toward one another (thereby securing the position of the focus adjustment gear 2102), whereas rotation of the locking screw 2306 in an opposite direction may draw the locking members 2302 away from one another (thereby allowing free adjustment of the focus adjustment gear 2102). In some implementations, the locking screw 2306 is also accessible through the opening formed after removing the handle 1404 from the camera module 130 (see FIG. 22).

Example Camera Module Supercapacitor Implementations

As indicated above, the base module 120 of a gel electrophoresis system 100 may include a power supply that is configured to supply power to the components of the base module 120. The camera module 130 may receive power from the base module 120 when the camera module 130 is selectively connected over the top portion of the base module 120 (e.g., via the spring-loaded pin connectors discussed above with reference to FIGS. 9A through 10).

As further indicated above, a gel electrophoresis system 100 of the present disclosure may include one or more supercapacitors integrated into the power board of the camera module 130. The supercapacitor array may be configured to become charged when the camera module 130 is selectively connected to the base module 120. When the supercapacitor array is charged, the supercapacitor array may supply power to one or more components of the camera module 130 when the camera module 130 is selectively disconnected from the base module 120.

Figure 24:
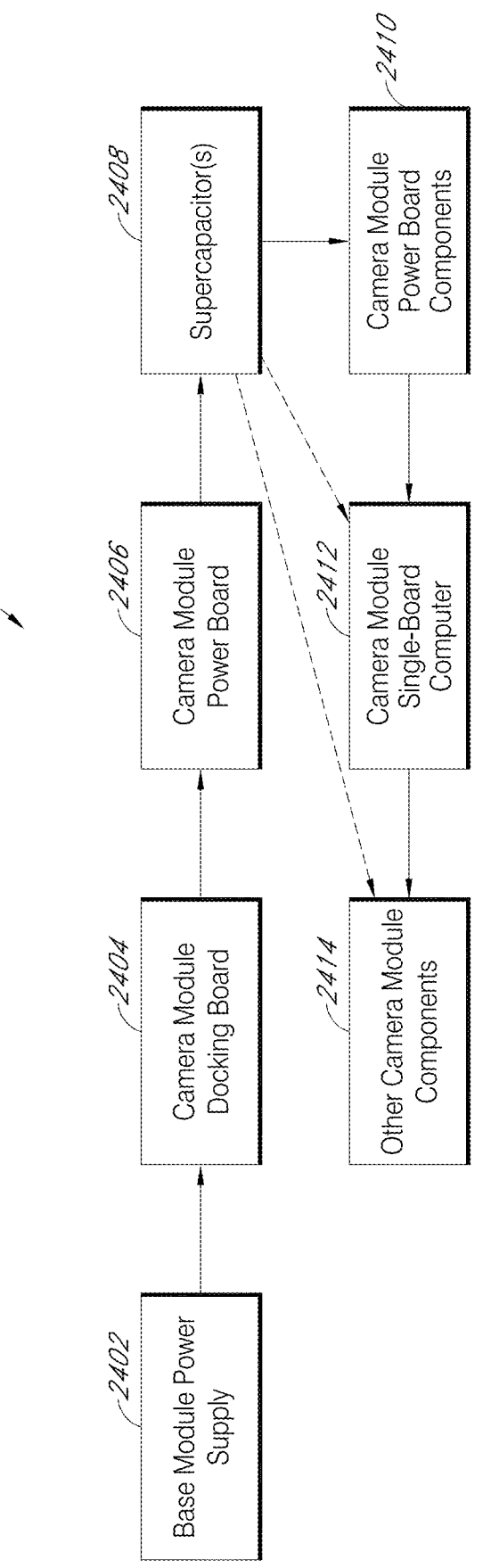
FIG. 24 illustrates an example flow diagram depicting signal flow of a camera module of a gel electrophoresis system, in accordance with implementations of the present disclosure.

FIG. 24 illustrates an example signal flow diagram 2400 of a camera module 130 of a gel electrophoresis system 100. Signal flow diagram 2400 illustrates that power may be supplied from the base module power supply 2402 to the camera module docking board 2404 (e.g., via spring-loaded pin connectors). In some instances, 48V are supplied from the base module power supply 2402 to the camera module docking board 2404 (other voltages are within the scope of the present disclosure).

Signal flow diagram 2400 further illustrates that power may proceed from the camera module docking board 2404 to the camera module power board 2406. Signal flow diagram 2400 further shows that power may proceed from the camera module power board 2406 to supercapacitor(s) 2408. In some implementations 12V are supplied to the supercapacitor(s) 2408. The voltage supplied to the supercapacitor(s) 2408 may charge the supercapacitor(s) 2408 to enable the supercapacitor(s) 2408 to supply power to camera module components after disconnection of the camera module 130 from the base module power supply 2402.

Signal flow diagram 2400 furthermore illustrates that power may be supplied from the supercapacitor(s) 2408 to the camera module power board components 2410. In some implementations, 12V are supplied under normal operation (e.g., when the camera module 130 is connected to the base module power supply 2402), and 11.5V are supplied under backup operation (e.g., when the camera module 130 is disconnected from the base module power supply 2402). The camera module power board components 2410 may comprise, by way of non-limiting example, one or more microcontroller units, analog-to-digital converters, fans, and/or others.

Signal flow diagram 2400 also shows that power may be supplied from the camera module power board components 2410 (or more directly from the supercapacitor(s) 2408) to the camera module single-board computer 2412 (camera module SBC 2412). Signal flow diagram 2400 additionally shows that power and/or data signals may be supplied from the camera module SBC 2412 (or more directly from the supercapacitor(s) 2408) to the other camera module components 2414, which may include, by way of non-limiting example, one or more displays, touch screens, cameras, connection ports (e.g., external USB connection ports), other input/output devices, etc.

The supercapacitor(s) 2408 may be configured in various ways and may take on various forms. For example, the supercapacitor(s) 2408 may comprise any number of supercapacitors (e.g., a single supercapacitor, or two, three, or more supercapacitors arranged as a supercapacitor array). The supercapacitor(s) 2408 may comprise double-layer capacitors, aluminum electrolytic capacitors, pseudo capacitors, hybrid capacitors, combinations thereof, and/or others.

The supercapacitor(s) 2408 may be configured to have an initial charging time that is less than 20 seconds (e.g., after initial connection of the camera module 130 to the base module power supply 2402). In some instances, the initial charging time is within a range of about 10 to 16 seconds or about 12 to 16 seconds. In some implementations, the supercapacitor(s) 2408 comprise a capacitance within a range of about 30 farads to about 50 farads (or greater). When charged, the supercapacitor(s) may supply power to the components of the camera module 130 (e.g., when the camera module is selectively disconnected from the base module 120) for about three seconds or longer, preferably about 7 seconds or longer (it has been found that users need about 7 seconds to transfer a camera module 130 from one base module 120 to another).

Figure 25:
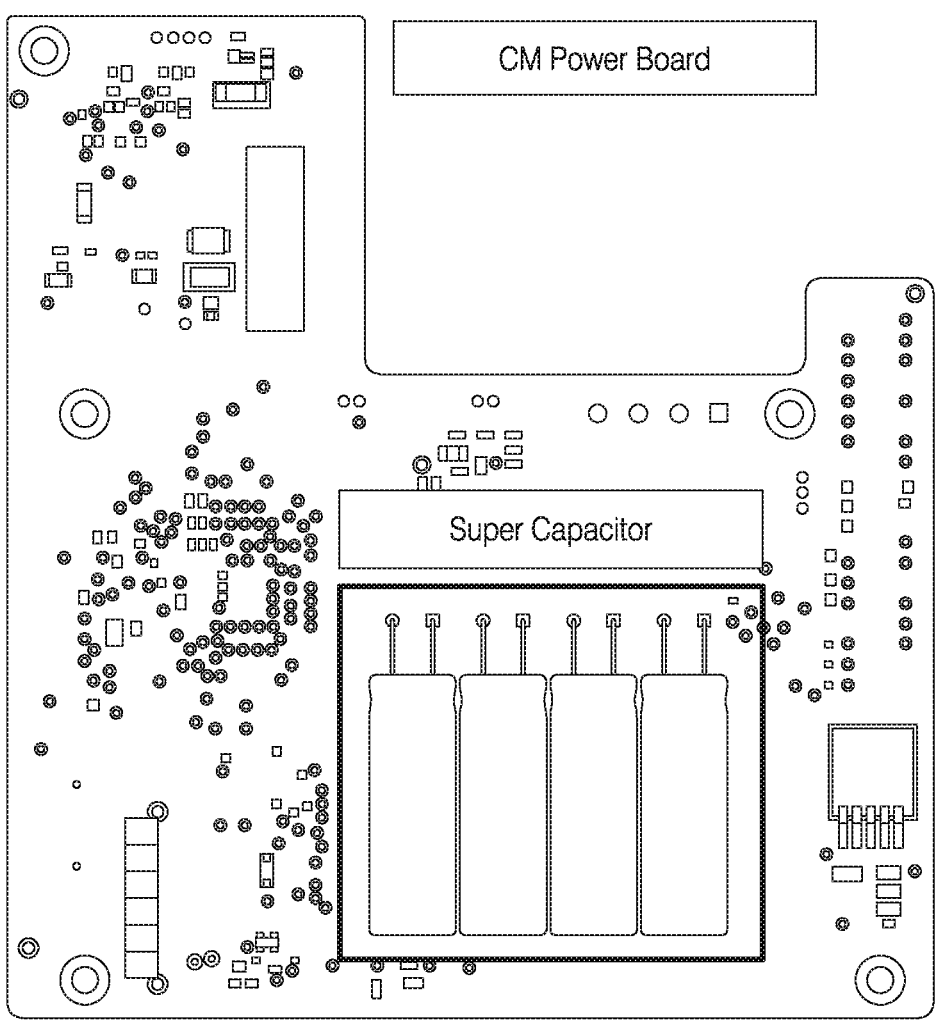
FIG. 25 illustrates an example implementation of a super-capacitor array on a power board of a camera module of a gel electrophoresis system, in accordance with implementations of the present disclosure.

FIG. 25 illustrates an example implementation of a super-capacitor array (labeled "Super Capacitor" and denoted by a white box in FIG. 25) integrated into a power board (labeled "CM Power Board" in FIG. 25) of a camera module 130 of a gel electrophoresis system 100. In the illustrated implementation, the supercapacitor array includes four double-layer supercapacitors, with a combined capacitance of about 40 farads. The illustrated supercapacitor array is configured to charge within about 13 to 15 seconds and provide backup power (e.g., after disconnection of the camera module 130 from the base module 120) for about 7 seconds.

Example Deconvolution Techniques

As indicated above, at least some implementations of the present disclosure involve the performance of improved deconvolution processing (whether performed on-system by a gel electrophoresis system 100, or by a separate or remote system).

Figure 26A:
Figure 26C:
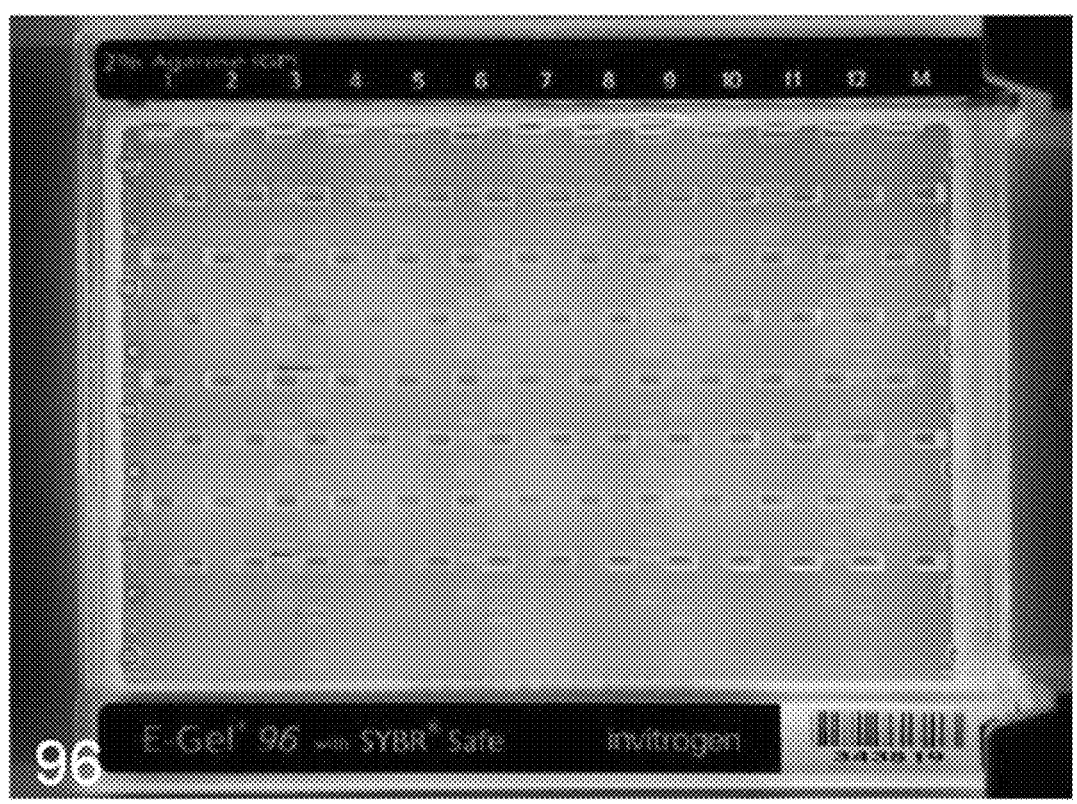

A gel electrophoresis system 100 may be configured to receive various types of gel electrophoresis cassettes. FIGS. 26A, 26B, and 26C illustrate example gel electrophoresis cassettes that may be used with a gel electrophoresis system 100. In particular, FIG. 26A illustrates a gel electrophoresis cassette 2610 that includes 22 wells. FIG. 26B illustrates a gel electrophoresis cassette 2620 that includes 48 wells. FIG. 26C illustrates a gel electrophoresis cassette 2630 that includes 96 wells. In the illustrated examples, the gel electrophoresis cassettes 2620 (48 wells) and 2630 (96 wells) are of the same size, despite having different well configurations.

One will appreciate, in view of the present disclosure, that well configurations that differ from those illustrated in FIGS. 26A through 26C may be utilized on gel electrophoresis cassettes in accordance with the present disclosure. For example, a gel electrophoresis cassette that corresponds in size to the gel electrophoresis cassette 2610 of FIG. 26A may comprise a linear arrangement of 11 wells instead of 22 wells.

The following discussion refers to a number of methods and method acts that may be performed (e.g., utilizing one or more systems that includes components discussed herein, such as processor(s) 102, storage 104, I/O system(s) 110, communication system(s) 112, remote system(s) 114, other components of a gel electrophoresis system 100 or other type of system, etc.). Although the method acts are discussed in a certain order and illustrated in flow charts as occurring in a particular order, no particular ordering is required unless specifically stated, or required because an act is dependent on another act being completed prior to the act being performed. One will appreciate that certain embodiments of the present disclosure may omit one or more of the acts described herein.

FIG. 27 illustrates an example flow diagrams 2700 depicting acts associated with generating a deconvolved image based on an image of a gel electrophoresis cassette captured using a gel electrophoresis system 100.

Act 2702 of flow diagram 2700 includes obtaining an image captured by a camera, the image capturing an electrophoresis gel positioned within a gel electrophoresis cas-sette positioned within a cassette slot. The camera may comprise a camera of a camera module 130 of a gel electrophoresis system. The electrophoresis cassette may correspond in one or more respects (e.g., size, well configu-ration) to one of the gel electrophoresis cassettes 2610, 2620, or 2630 discussed above with reference to FIGS. 26A through 26C.

Act 2704 of flow diagram 2700 includes performing a gel size differentiation operation configured to determine a size of the electrophoresis gel. By way of example, act 2704 may be performed to distinguish gel electrophoresis cassette 2610 from gel electrophoresis cassettes 2620 and 2630 on the bases of size. For example, different deconvolution processing and/or other image processing may be performed on the obtained image based on the size of the gel electro-phoresis cassette captured in the image. For instance, smaller gel electrophoresis cassettes (e.g., gel electrophore-sis cassette 2610, as compared to gel electrophoresis cas-settes 2620 and 2630) may be associated with well configu-rations that are simpler for users to analyze, thereby obviating the need for deconvolution processing.

In some implementations, a gel size differentiation opera-tion in accordance with act 2704 includes various sub-acts, such as (i) performing an edge detection operation to detect a presence of wells within the electrophoresis gel, (ii) performing a region of interest operation to generate a cropped image, and (iii) applying a threshold to the cropped image to identify a label within the cropped image. FIGS. 28 through 30B illustrate conceptual representations of the various sub-acts associated with act 2704.

Figure 28:
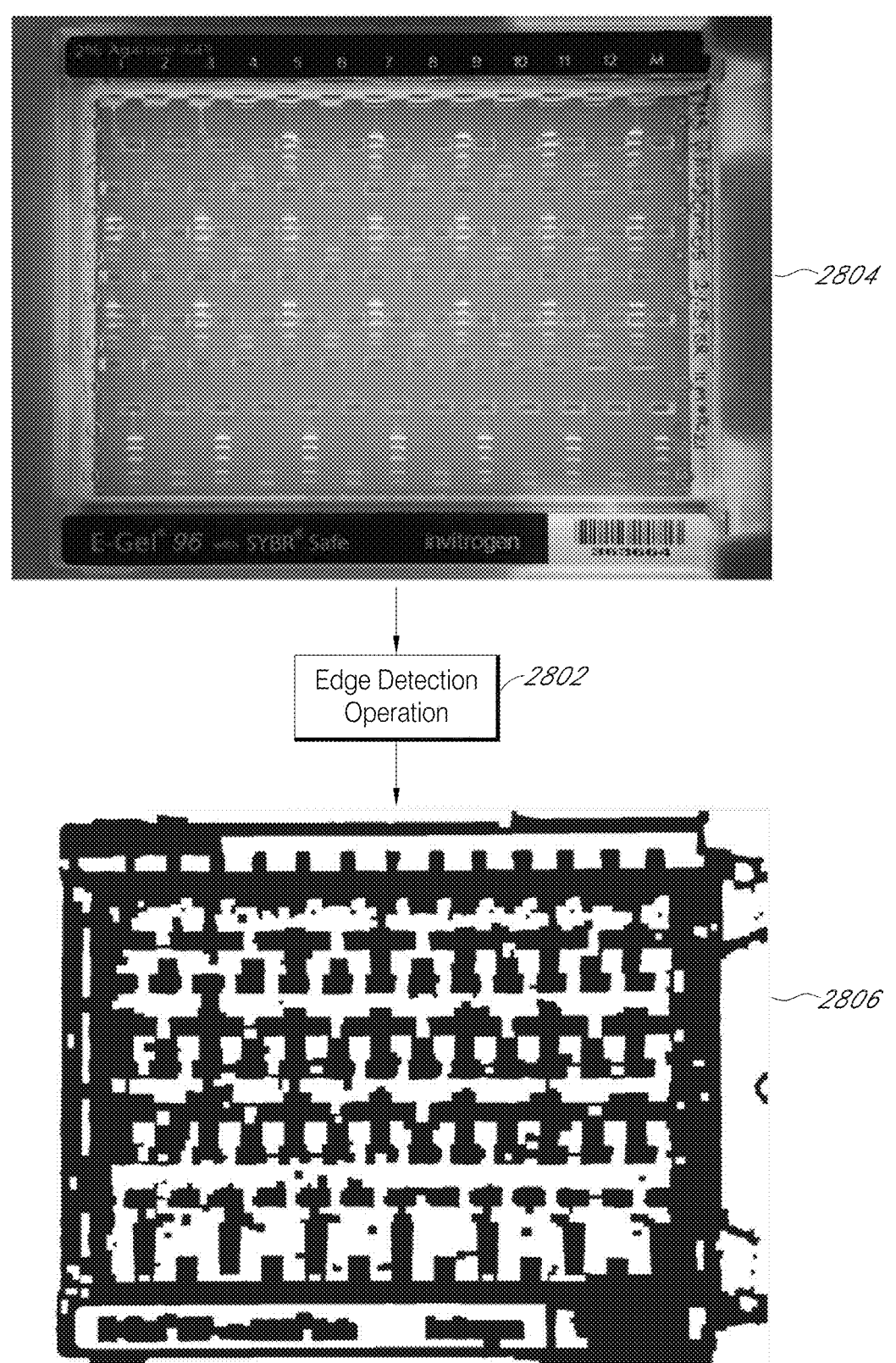
FIG. 28 illustrates a conceptual representation of an edge detection operation for detecting the presence of wells in a gel electrophoresis image; in accordance with implementations of the present disclosure.

FIG. 28 illustrates a conceptual representation of an edge detection operation 2802 for detecting the presence of wells in a gel electrophoresis image, in accordance with act 2704. The example of FIG. 28 shows the edge detection operation 2802 performed on a 96-well image 2804, providing a well edge image 2806. Any suitable edge detection technique(s) may be implemented to perform the edge detection opera-tion 2802 in accordance with the present disclosure, such as Canny edge detection, first-order methods, second-order methods, edge thinning, thresholding and linkage, and/or others. In some implementations, the absence of wells obviates the need for deconvolution processing. Thus, in some implementations, the process for generating a decon-volved image may be terminated (or queued for termination pending user input) in response to detecting an absence of wells in the obtained image.

Figure 29A:
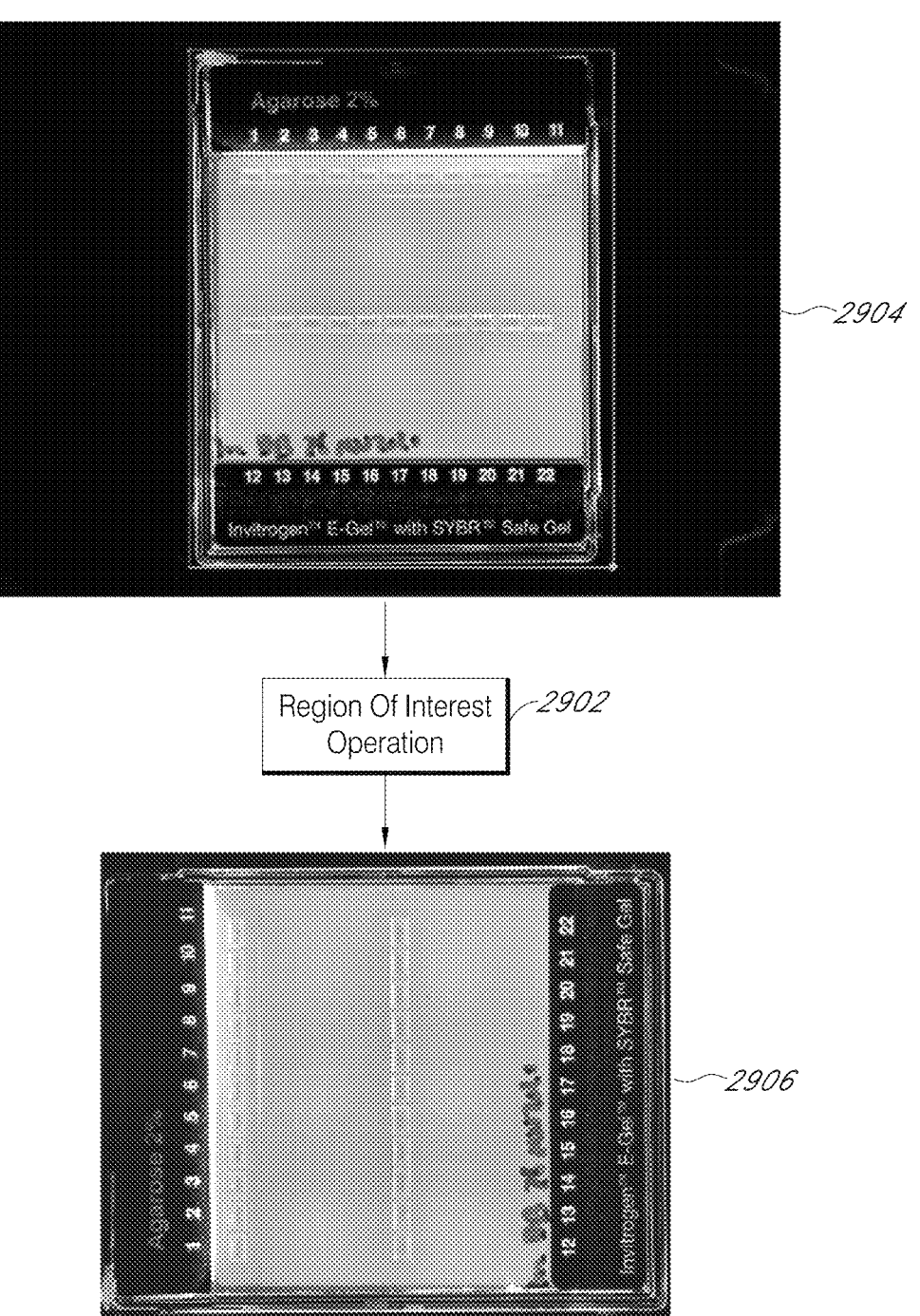
FIGS. 29A and 29B illustrate conceptual representations of a region of interest operation for differentiating among different gel sizes, in accordance with implementations of the present disclosure.
Figure 29B:
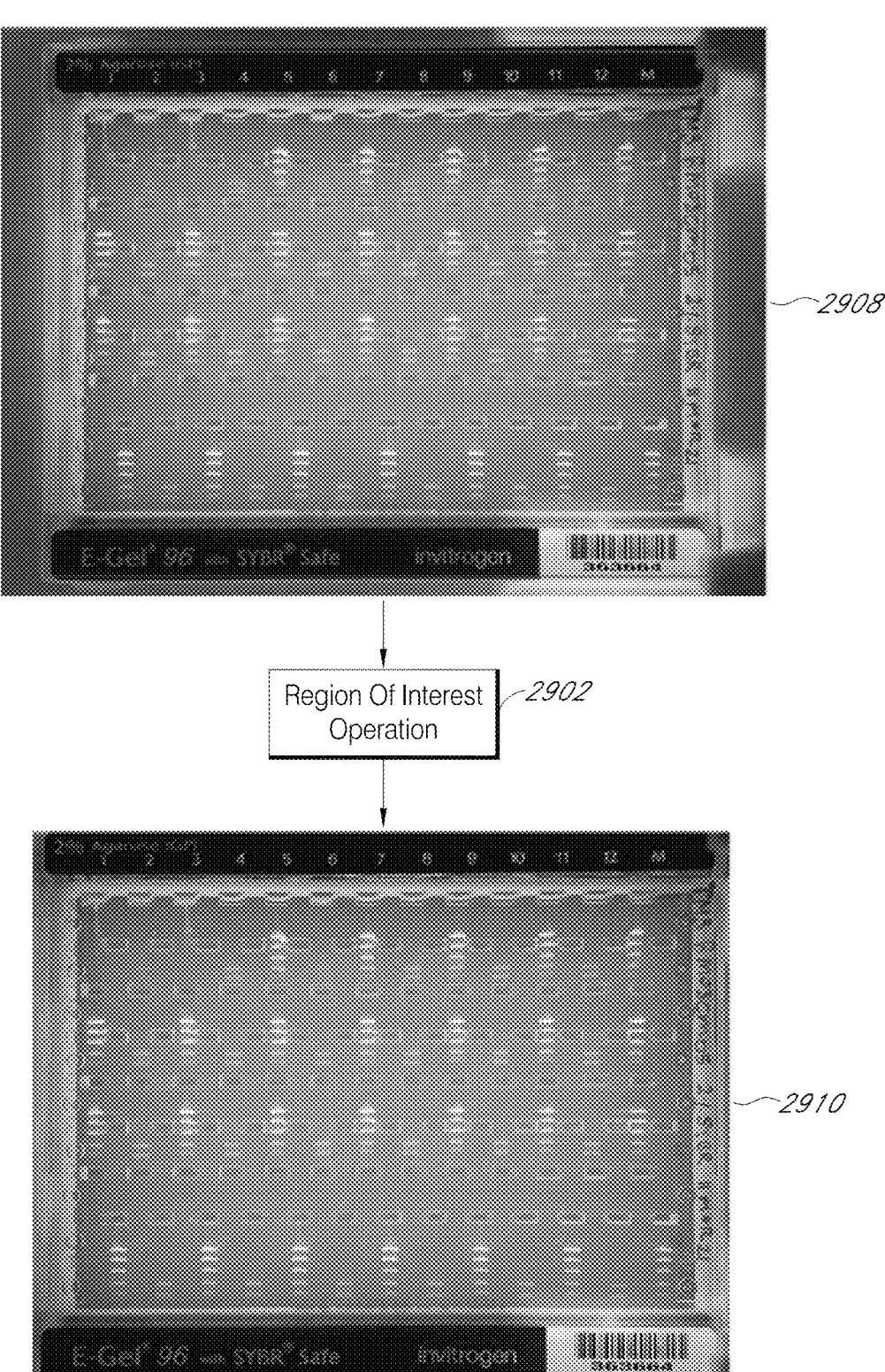

FIGS. 29A and 29B illustrate conceptual representations of a region of interest operation 2902 for differentiating among different gel sizes, in accordance with act 2704. In some implementations, the region of interest operation 2902 comprising identifying a region of interest within the image, cropping the image based on the region of interest to generate a cropped image, and rotating the cropped image, if necessary, to cause a long edge of the cropped image to become a horizontal edge.

FIG. 29A illustrates region of interest operation 2902 performed on a 22-well image 2904 to generate an output image 2906 (e.g., a cropped image). After the cropping the 22-well image 2904, the longest dimension of the cropped image may become the vertical dimension thereof, based on the geometry of the 22-well gel cassette captured in the 22-well image 2904. Accordingly, after cropping the 22-well image 2904, the region of interest operation 2902 may also rotation the cropped image to cause the longest edge of the cropped image to become the horizontal edge, as illustrated in the output image 2906.

FIG. 29B illustrates the region of interest operation 2902 performed on a 96-well image 2908 to generate an output image 2910. After cropping the 96-well image 2908, the longest dimension of the cropped image remains the horizontal dimension thereof, based on the geometry of the 96-well gel cassette captured in the 96-well image 2908. Accordingly, after cropping the 96-well image 2908, the region of interest operation 2902 may refrain from rotating the cropped image to cause the longest edge of the cropped image to remain the horizontal edge, as illustrated in the output image 2910.

Figure 30A:
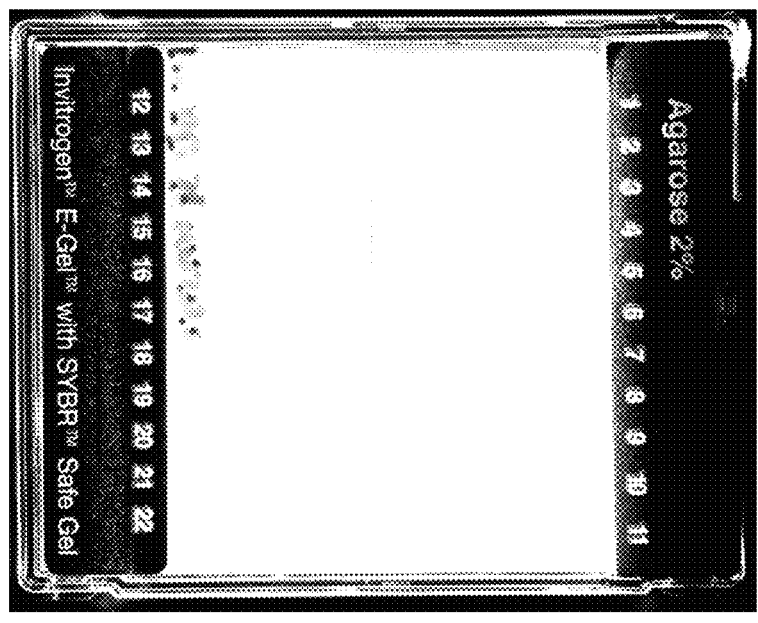
FIGS. 30A and 30B illustrate conceptual representations of a thresholding operation for differentiating among different gel sizes, in accordance with implementations of the present disclosure.
Figure 30B:

FIGS. 30A and 30B illustrate conceptual representations of applying a threshold to the cropped image to identify a label within the cropped image, in accordance with act 2704. A thresholding operation may be performed on a cropped image generated via a region of interest operation 2902 to provide a basis for determining whether the label associated with the captured gel electrophoresis cassette is positioned along a horizontal edge (e.g., top or bottom) of the cropped image or along a vertical side (e.g., right or left side) of the cropped image. In some implementations, because of the rotation associated with the region of interest operation 2902 discussed above, presence of the label along a vertical edge may be associated with a different gel electrophoresis cassette size (e.g., a 11-well or 22-well gel cassette size, as demonstrated in FIG. 30A), whereas presence of the label on a horizontal edge may be associated with one gel electrophoresis cassette size (e.g., a 48-well or 96-well gel cassette size, as demonstrated in FIG. 30B). Accordingly, based on the detected location of the label, gel size of a captured electrophoresis gel may be determined, in accordance with act 2704.

Act 2706 of flow diagram 2700 includes, in response to determining that the size of the electrophoresis gel satisfies a threshold, performing a well configuration detection operation to determine a configuration of wells of the electrophoresis gel. For example, if a detected gel cassette size is associated with both a 48-well gel and a 96-well gel, act 2706 may comprise determining whether a 48-well configuration or a 96-well configuration is present in the captured electrophoresis gel.

A well configuration detection operation in accordance with act 2706 may comprise various sub-acts, such as (i) removing a label region from the image to generate a modified image, (ii) applying edge detection to the modified image to identify well edges, generating a well edge image, (iii) applying a threshold to the well edge image to generate a well contour image, (iv) detecting a band number associated with the well contour image, and (v) determining a well configuration based upon the band number.

Figure 31:
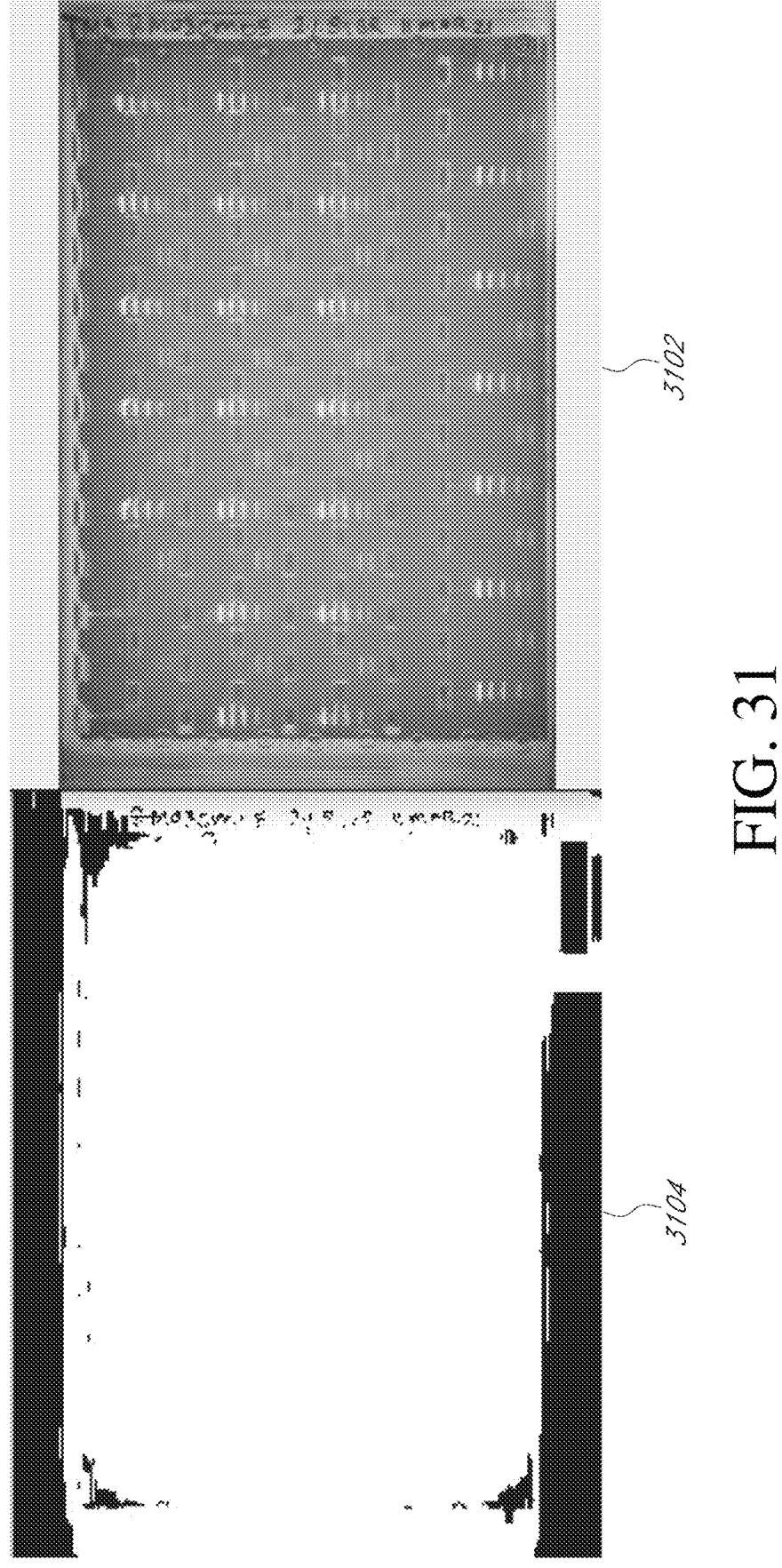
FIG. 31 illustrates a conceptual representation of generating a modified image by removing a label region from a gel electrophoresis cassette image, in accordance with implementations of the present disclosure.

FIG. 31 illustrates a conceptual representation of a modified image 3102 generated by removing a label region from a gel electrophoresis cassette image, in accordance with act 2706. For example, a label region may be determined by thresholding the gel electrophoresis cassette image (corresponding to the black regions shown in the left image 3104 of FIG. 31, which comprises the gel electrophoresis cassette image with thresholding applied thereto, similar to FIG. 30B).

Figure 32:
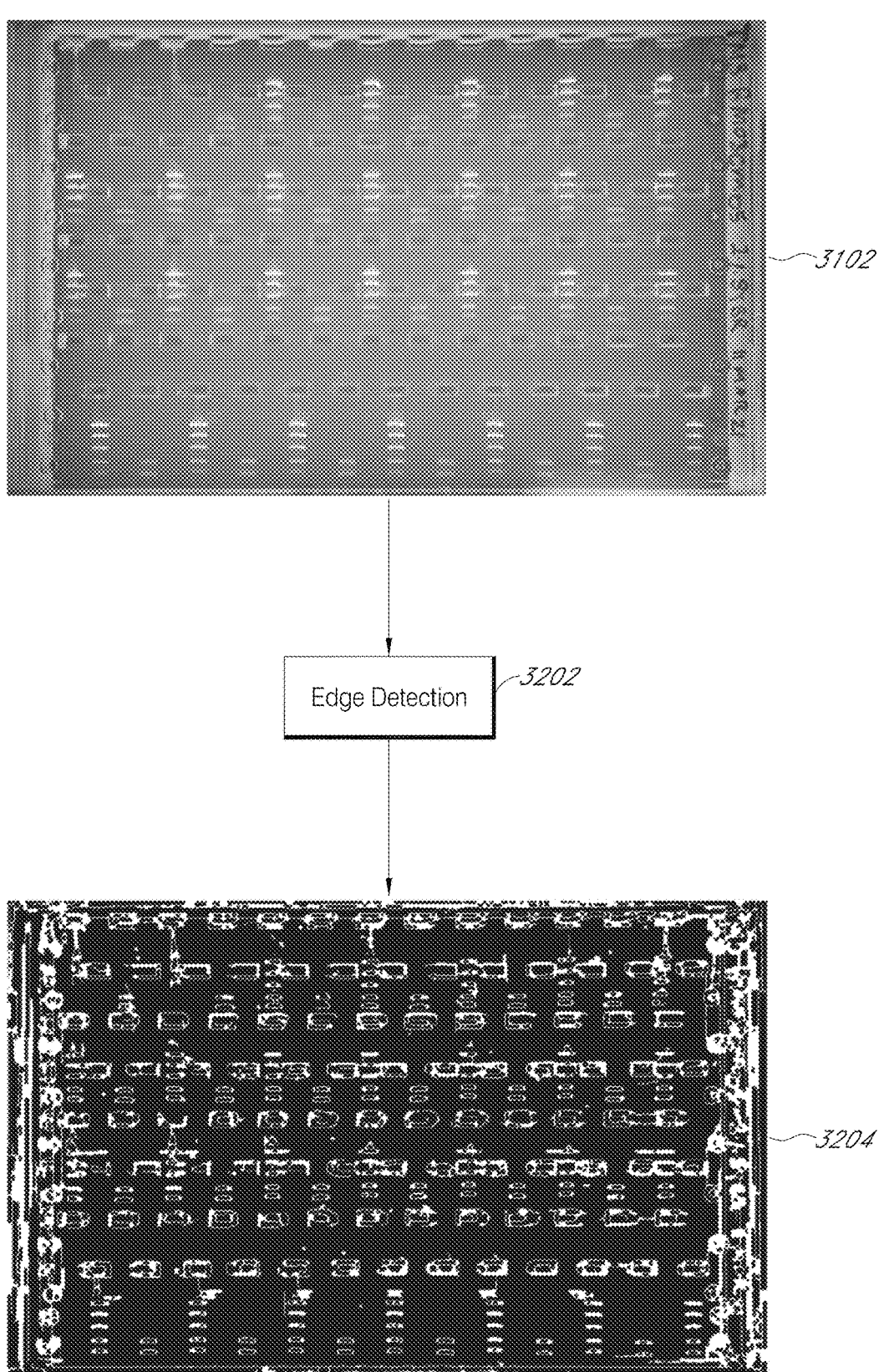
FIG. 32 illustrates a conceptual representation of applying edge detection to a modified image to generate a well edge image, in accordance with implementations of the present disclosure.
Figure 33:
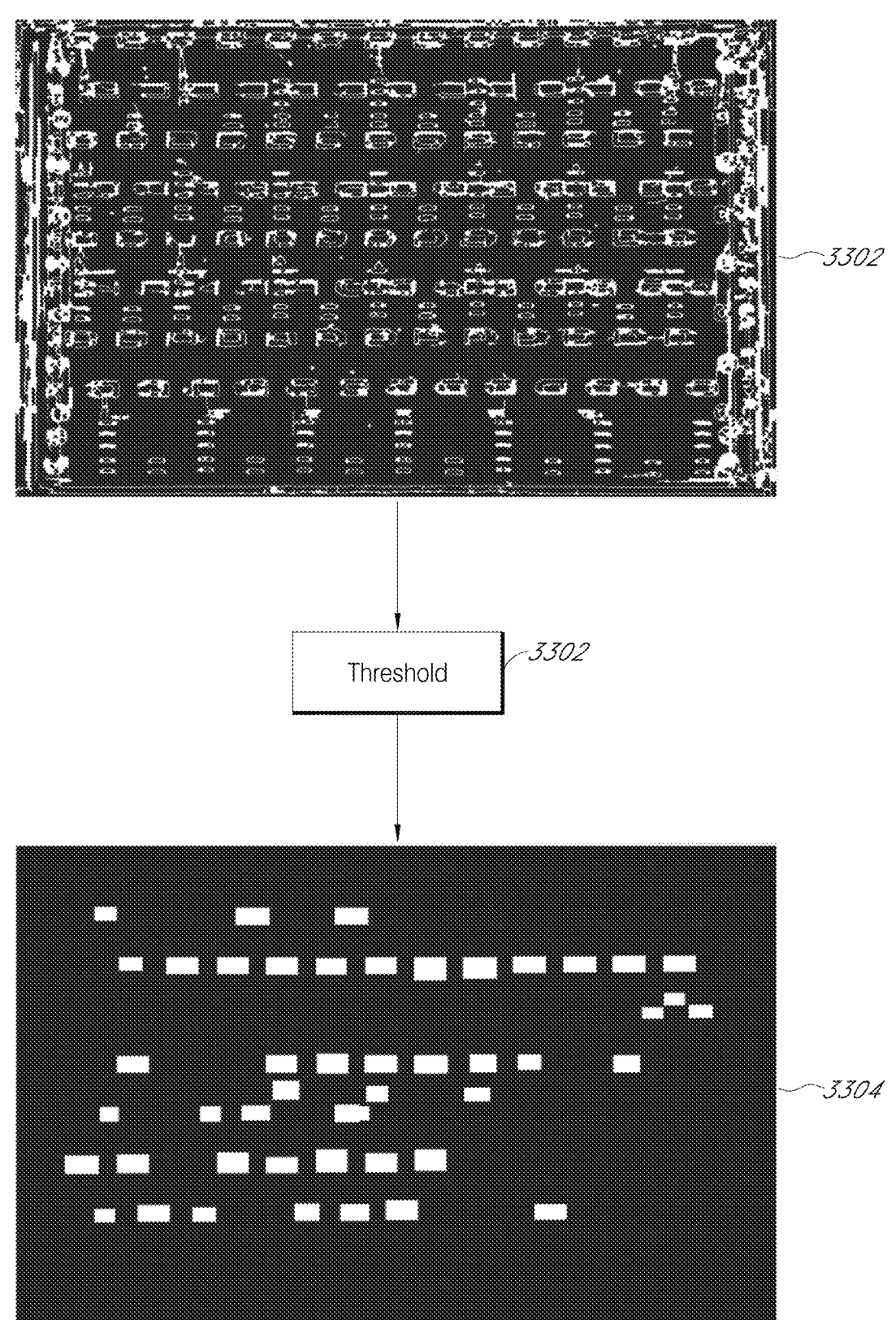
FIG. 33 illustrates a conceptual representation of applying a threshold to a well edge image to generate a well contour image, in accordance with implementations of the present disclosure.

FIG. 32 illustrates a conceptual representation of applying edge detection 3202 to the modified image 3102 to generate a well edge image 3204, in accordance with act 2706. Similar to the edge detection operation 2802 discussed above, edge detection 3202 may comprise any suitable edge detection technique. FIG. 33 illustrates a conceptual representation of applying a threshold 3302 to the well edge image 3204 to generate a well contour image 3304, in accordance with act 2706. In some implementations, the well contours are defined based on various constraints related to the geometry of the wells and/or the lanes (e.g., where a lane comprises an area that encompasses a well and that extends toward adjacent wells (or adjacent well matrix boundaries) in one or more directions (e.g., left, right, down; see, for visualization purposes, the subdivided lanes of FIG. 37). Such constraints may be obtained by analyzing images of gel electrophoresis cassettes that are expected to be used in conjunction with the deconvolution techniques discussed herein (e.g., images of the gel electrophoresis cassettes shown in FIGS. 26A through 26C).

For instance, in some implementations, well width may be assumed to be equal to a region of interest width (e.g., for a region of interest detected in the well edge image 3204) multiplied by a first constant, where the first constant is determined by analysis of other images. Furthermore, the well height may be assumed to be equal to a region of interest height (e.g., for a region of interest detected within the well edge image 3204) multiplied by a second constant, where the second constant is determined by analysis of other images. Still furthermore, the lane height may be assumed to be equal to a region of interest height multiplied by a third constant, where the third constant is obtained by analysis of other images. In one example implementation, the well aspect may be constrained within a range of about 1.2 and 2.1, the well width (in pixels) may be constrained within a range of about 0.7 times the well width to about 1.3 times the well width (where well width is a constant value determined by analysis of other images), and the well height (in pixels) may be constrained within a range of about 0.5 times the well height to about 1.5 times the well height (where well height is a constant value determined by analysis of other images).

The well contour image may be utilized to determine a number of bands (e.g., horizontal arrangements of wells) present in a captured image of a gel electrophoresis cassette, which may indicate the well configuration present in the gel electrophoresis cassette (e.g., referring briefly to FIGS. 26B and 26C, showing the 48-well cassette as including two bands and showing the 96-well cassette as including 8 bands). In some implementations, a band number is determined from a well contour image (e.g., well contour image 3304) based on column-wise average pixel values obtained for one or more rows of the well contour image.

For example, FIG. 34 illustrates a conceptual representation of detecting a band number associated with the well contour image 3304 of FIG. 33. FIG. 34 illustrates arrows extending across rows of the well contour image 3304, indicating that column-wise average pixels may be obtained for the various pixel rows of the well contour image 3304. FIG. 34 illustrates an example graph 3402 indicating the average column-wise average pixel values for various rows of the well contour image.

To determine whether the column-wise average pixel value of a row (or set of rows) corresponds to the presence of a band (e.g., a horizontal arrangement of wells), the column-wise average pixel value may be compared to a tolerance value. In some implementations, if the column-wise average pixel value exceeds (or at least meets) the tolerance value, the row (or set of rows) is determined to correspond to the presence of a band. The tolerance value may take on values, depending on the particular implementation, In one example, the tolerance value may correspond to a multiple of the well width (or expected well width) for the captured gel electrophoresis image (or images based thereon, such as the well contour image). For instance, the tolerance value may be set to equal three well widths.

Based upon the band number, we well configuration associated with the well contour image 3304 (and the original gel electrophoresis image from which the well contour image 3304 is derived) may be determined. For instance, band number thresholds may be associated with different well configurations, and whether the band number satisfies a band number threshold may be assessed to determine the well configuration. In one example, a band number that is less than 4 may correspond to a 48-well configuration, whereas a band number that is equal to or greater than 4 may correspond to a 96-well configuration (a band number of 1 or less may correspond to an empty gel that contains no wells).

In some implementations, act 2704 and/or act 2706 may comprise detecting one or more identifiers (e.g., a symbol, code (e.g., barcode, QR code, string of characters, etc.), image, and/or other scannable element) that is disposed on the gel electrophoresis cassette, where the identifier indicates the size and/or well configuration of the gel electrophoresis cassette.

Figure 35:
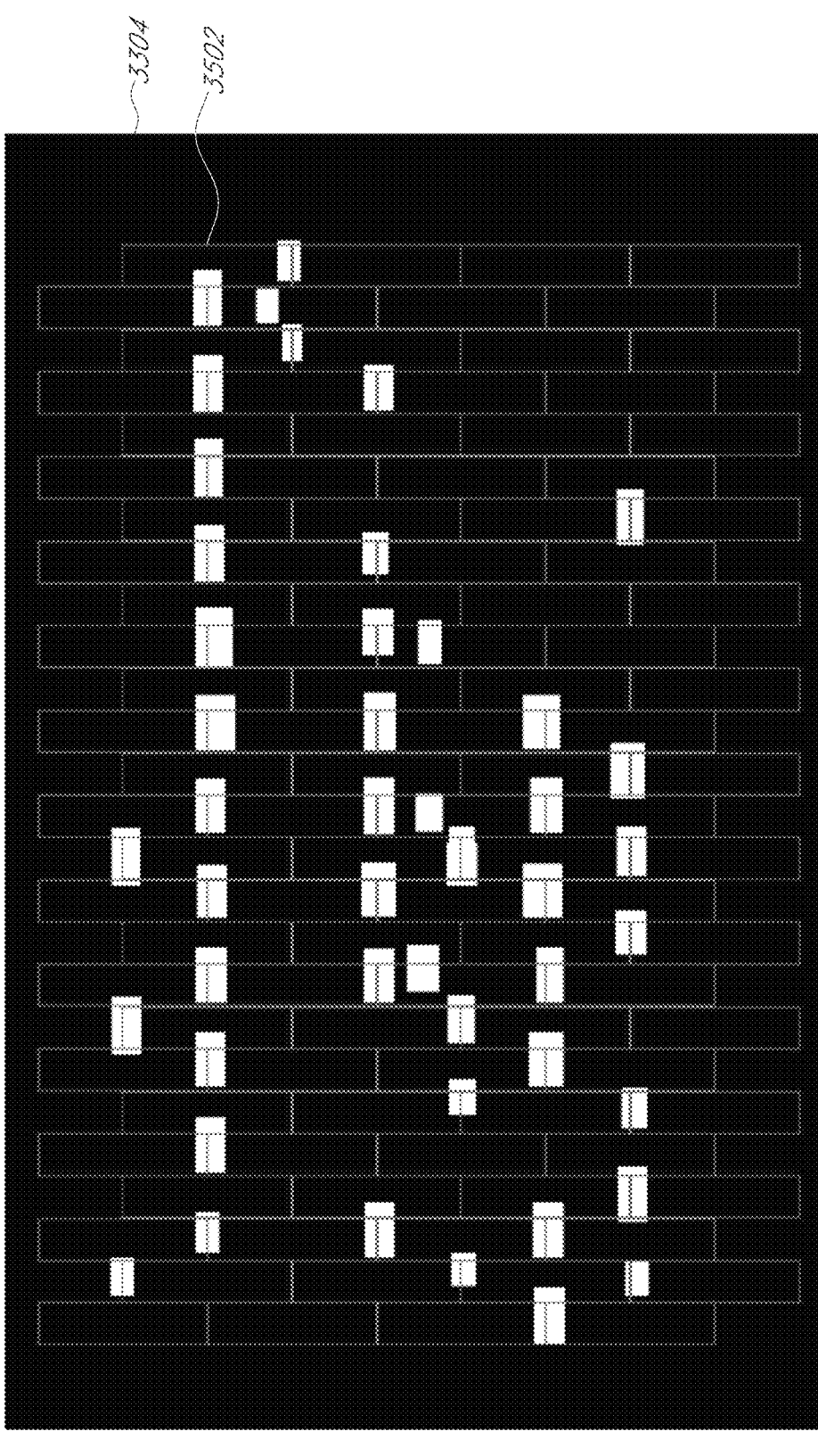
FIG. 35 illustrates a conceptual representation of a well matrix template configured to be fit to a well contour image, in accordance with implementations of the present disclosure.

In some implementations, the well configuration detection operation of act 2706 includes fitting a well matrix template to a well contour image. After fitting, the well matrix may provide a basis for performing deconvolution in accordance with act 2708 (see, briefly, the well matrix of FIG. 37). FIG. 35 illustrates a conceptual representation of a well matrix template 3502 (shown in white lines) configured to be fit to the well contour image 3304.

The example well matrix template 3502 shown in FIG. 35 corresponds to the general configuration of lanes of a 96-well gel electrophoresis cassette. Different well matrix templates may exist for other well configurations. In some implementations, the type of well matrix template selected for fitting to the well contour image is selected based on various factors. For instance, the well matrix template may be automatically selected based on the gel size or cassette size determined in accordance with act 2704 and/or based on the well configuration detected in accordance with other sub-acts of act 2706 (e.g., 48-well or 96-well configuration as determined based on the band number, as discussed with reference to FIG. 34).

Various operations may be performed to fit the well matrix template 3502 to the expected well positions associated with the well contour image 3304. For example, the well matrix template 3502 may be rescaled based on the width of the well contours. The rescaling may be performed based on various predefined rules. For example, in some implementations, if a well width calculated based on the well contour image 3304 (e.g., an average well width) is greater than the well width of the well matrix template 3502, the well matrix template may be enlarged. Correspondingly, if the well width is less than the well width of the well matrix template 3502, the well matrix template may be shrunken. The amount of enlarging or shrinking performed on the well matrix template may be based on the difference between the template well width and the calculated well width. Such operations may be performed iteratively until a stop condition is met (e.g., a predetermined number of iterations have been performed, a similarity metric indicating similarity between the template well width and the calculated well width satisfies a threshold, etc.).

Additionally, or alternatively, the well matrix template may be rescaled based on the separation distance between the rows of well contours. For example, a band separation distance may be calculated based on the well contour image

3304 utilizing at least some information represented in graph 3402 of FIG. 34 to determine pixel rows associated with band locations and/or distance between the band locations. In some implementations, if the band separation distance calculated based on the well contour image 3304 is greater than a lane height associated with the well matrix template 3502 (or greater than a fraction of the lane height, such as half of the lane height), the well matrix template 3502 may be enlarged. Correspondingly, if the band separation distance calculated based on the well contour image 3304 is less than the lane height associated with the well matrix template 3502 (or less than a fraction of the lane height, such as half of the lane height), the well matrix template 3502 may be shrunken. The amount of enlarging or shrinking performed on the well matrix template may be based on the difference between template lane height and the calculated band separation distance. Such operations may be performed iteratively until a stop condition is met (e.g., a predetermined number of iterations have been performed, a similarity metric indicating similarity between the template lane height (or a fraction thereof) and the calculated band separation distance satisfies a threshold, etc.).

Furthermore, the well matrix template 3502 may be translated based on the location of the well contours. For instance, deviations may be computed between each well contour in the well contour image 3304 and its respective nearest well represented in the well matrix template 3502 (e.g., with the top of a lane corresponding to a well represented in the well matrix template 3502). The deviations may be averaged in different dimensions (e.g., providing an x-dimension average deviation and a y-dimension average deviation), and dimension-specific transformations may be performed on the well matrix template 3502 based on the dimension-specific average deviations. The amount of translation may be determined based on the amount of deviation detected. Translation operations may be performed iteratively until a stop condition is met (e.g., a predetermined number of iterations have been performed, a threshold level of deviation (e.g., low deviation) is detected in one or more dimensions, etc.).

Figure 36:
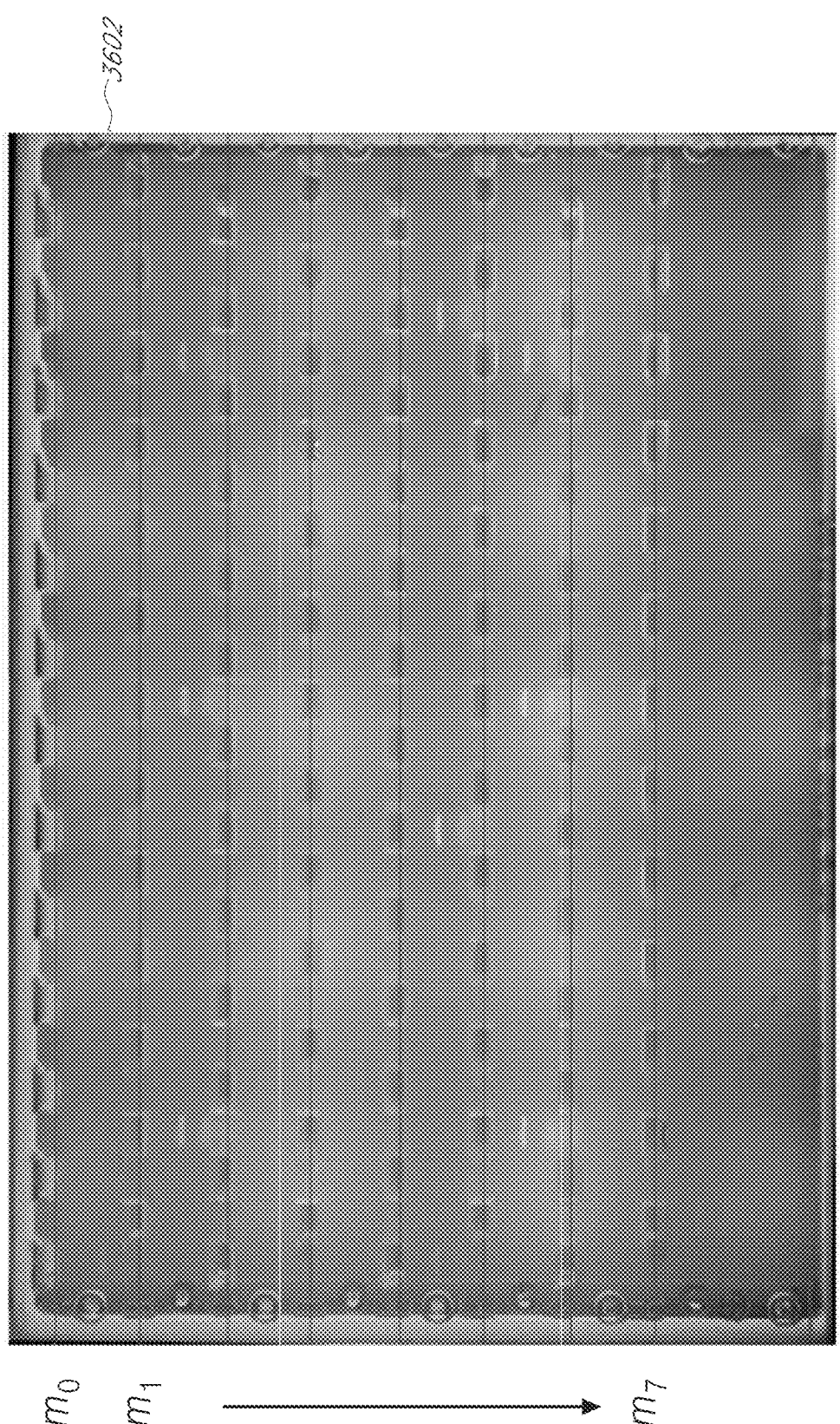
FIG. 36 illustrates a conceptual representation of determining a tilt angle for fitting a well matrix template to a well contour image, in accordance with implementations of the present disclosure.

In some implementations a tilting angle is used to align the gel electrophoresis image (or the well contour image) with the well matrix template to facilitate deconvolution processing. For example, linear regression may be utilized to fit a line to each band detected in the well contour image 3304. FIG. 36 illustrates a depiction of these linear regression lines overlaid on a gel electrophoresis image 3602, each linear regression line being represented by a grey line labeled as $m_k$, where k represents the band index. The gradient or slope of these lines may be averaged, such as according to the following equation:

$$\text{Tilt Angle} = \frac{\sum_{0}^{n-1} m_k}{n}$$

where n represents the number of bands or well rows in the gel electrophoresis image 3602 and $m_k$ represents the slope of the linear regression line associated with each band index. A rotation may be applied to the gel electrophoresis image 3602 based on the calculated tilt angle.

Figure 37:
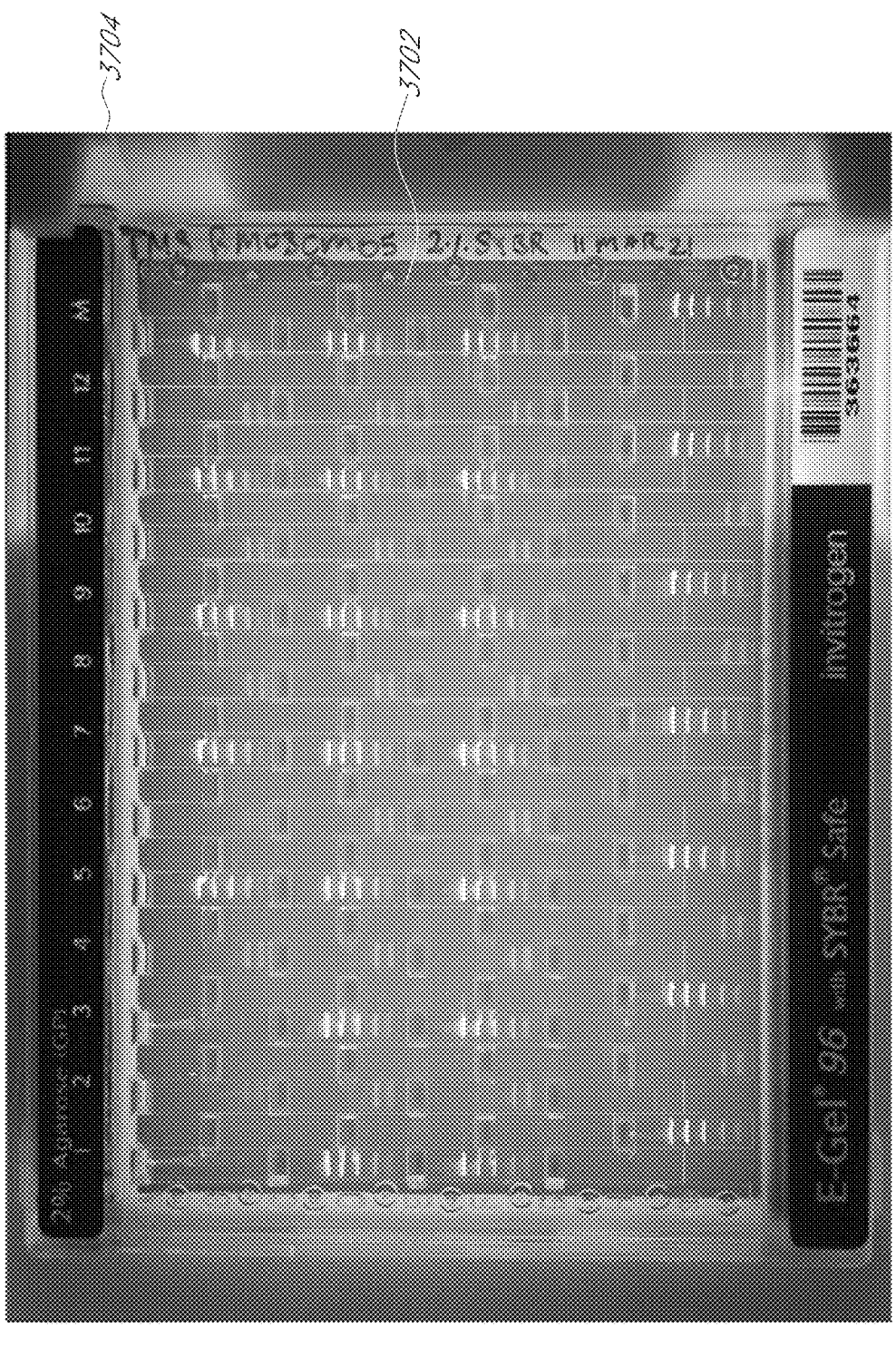
FIG. 37 illustrates a conceptual representation of a well matrix template fit to an image of a gel electrophoresis cassette, in accordance with implementations of the present disclosure.

The above operations may provide a well matrix template that is fit to a gel electrophoresis image. FIG. 37 illustrates a conceptual representation of a well matrix template 3702 fit to an image 3704 of a gel electrophoresis cassette. The well matrix template fit to the image may be utilized for performing an image deconvolution operation to generate a deconvolved image in accordance with act 2708 of flow diagram 2700. For example, a deconvolution operation may comprise cropping the image data of the image 3704 represented in the various lanes defined by the well matrix template 3702 and pasting the image data (on a lane-by-lane basis) into an output image according to a predefined organizational structure, which may provide an output image that represents the image data of the original image 3704 in a more easily consumable format (see, by way of brief example, FIGS. 40A, 40B, and 40C).

In some implementations, a user is provided an opportunity to accept or modify a well matrix template automatically generated by a system.

Figure 38:
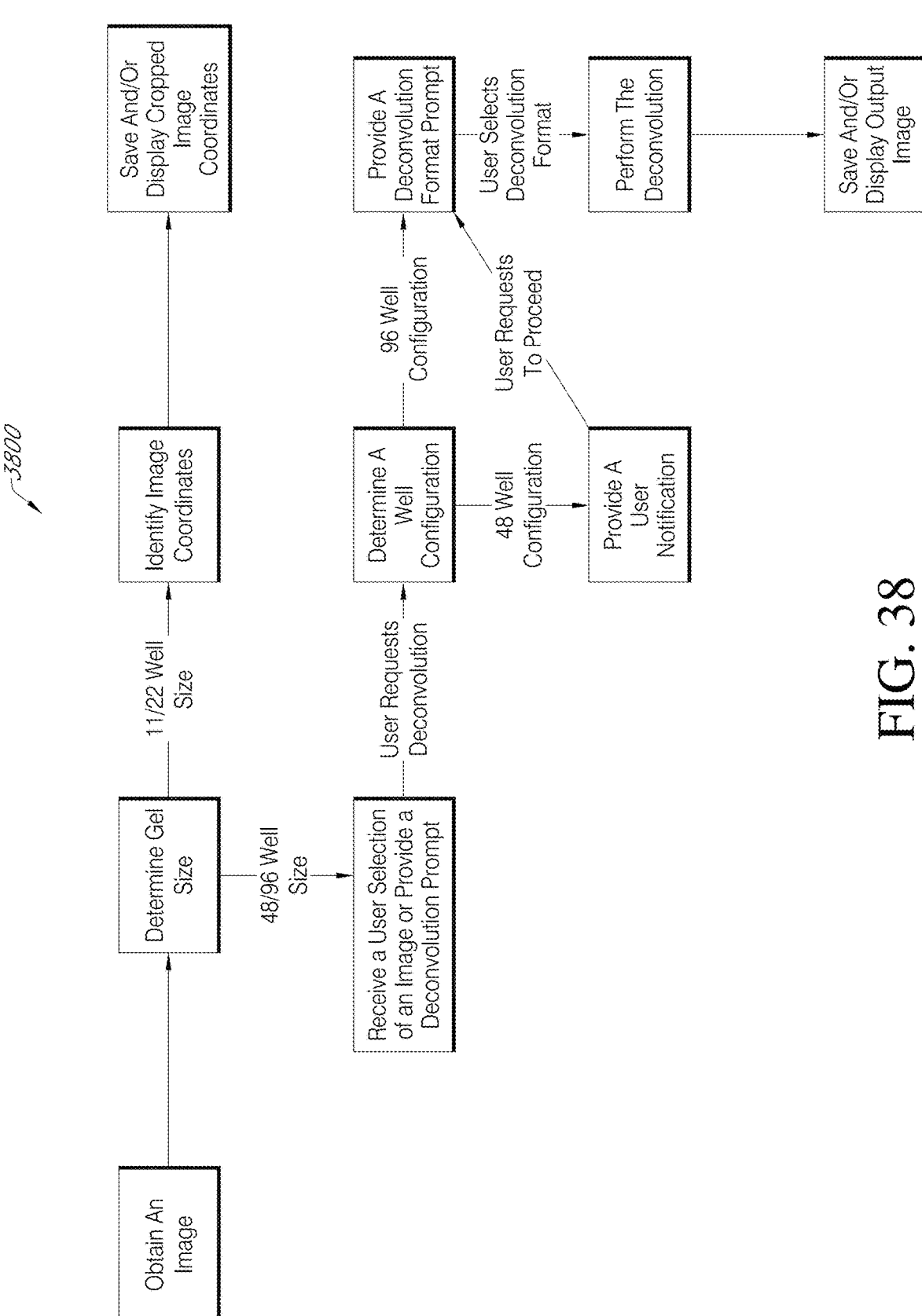
FIG. 38 illustrates an example flow diagram depicting acts associated with generating a deconvolved image based on an image of a gel electrophoresis cassette captured using a gel electrophoresis system, in accordance with implementations of the present disclosure.

In some instances, deconvolution is intended for certain types of gel/cassette sizes and/or for certain well configurations, which may cause a system to refrain from performing deconvolution for certain types of gel/cassette sizes and/or well configurations (or which may cause a system to first prompt a user before proceeding with deconvolution). In some implementations, whether to perform image deconvolution as described herein may be determined automatically and/or may be at least partially influenced by user input. FIG. 38 illustrates an example flow diagram 3800 indicating various acts associated with determining whether to perform image deconvolution.

FIG. 38 depicts that a system (e.g., a gel electrophoresis system 100, or another system) may be configured to obtain an image and determine a gel size based on the image (e.g., in accordance with act 2704 of flow diagram 2700). FIG. 38 illustrates that if the gel size corresponds to a 11 or 22 well gel size, the system may be configured to identify relevant image coordinates and then save and/or display the image according to the cropped image coordinates. For example, in some implementations, the 11 or 22 well configurations may already be arranged in a format that that is suitable for analysis purposes, thereby obviating the need for image deconvolution. In contrast, FIG. 38 shows that if the gel size corresponds to a 48 or 96 well gel size, the system may be configured to receive a user selection of an image (or alternatively to provide a deconvolution prompt, prompting a user to provide input indicating whether to proceed with deconvolution).

Figure 39:
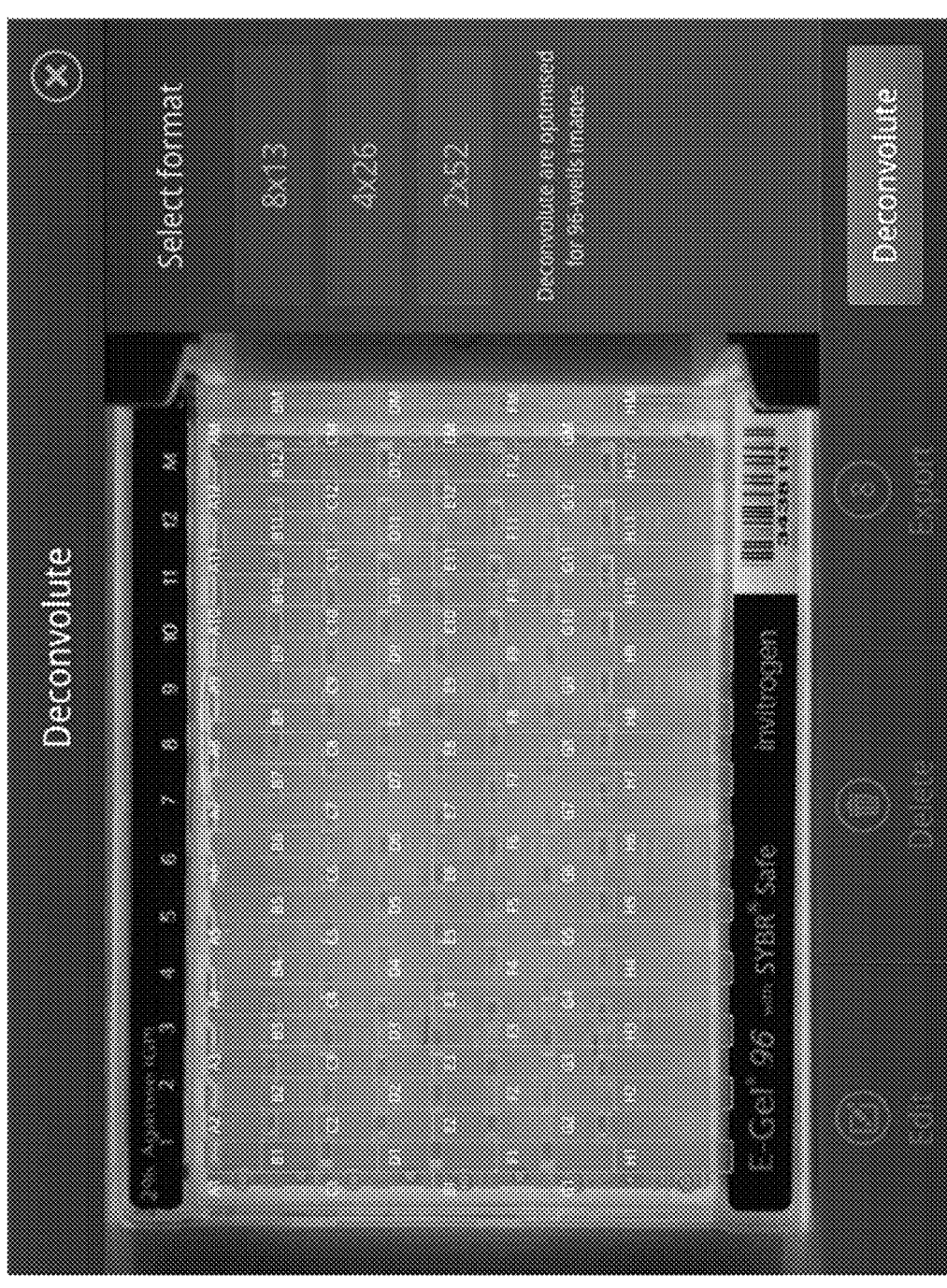
FIG. 39 illustrates an example user interface prompting a user to select an image deconvolution format, in accordance with implementations of the present disclosure.
Figure 40A:
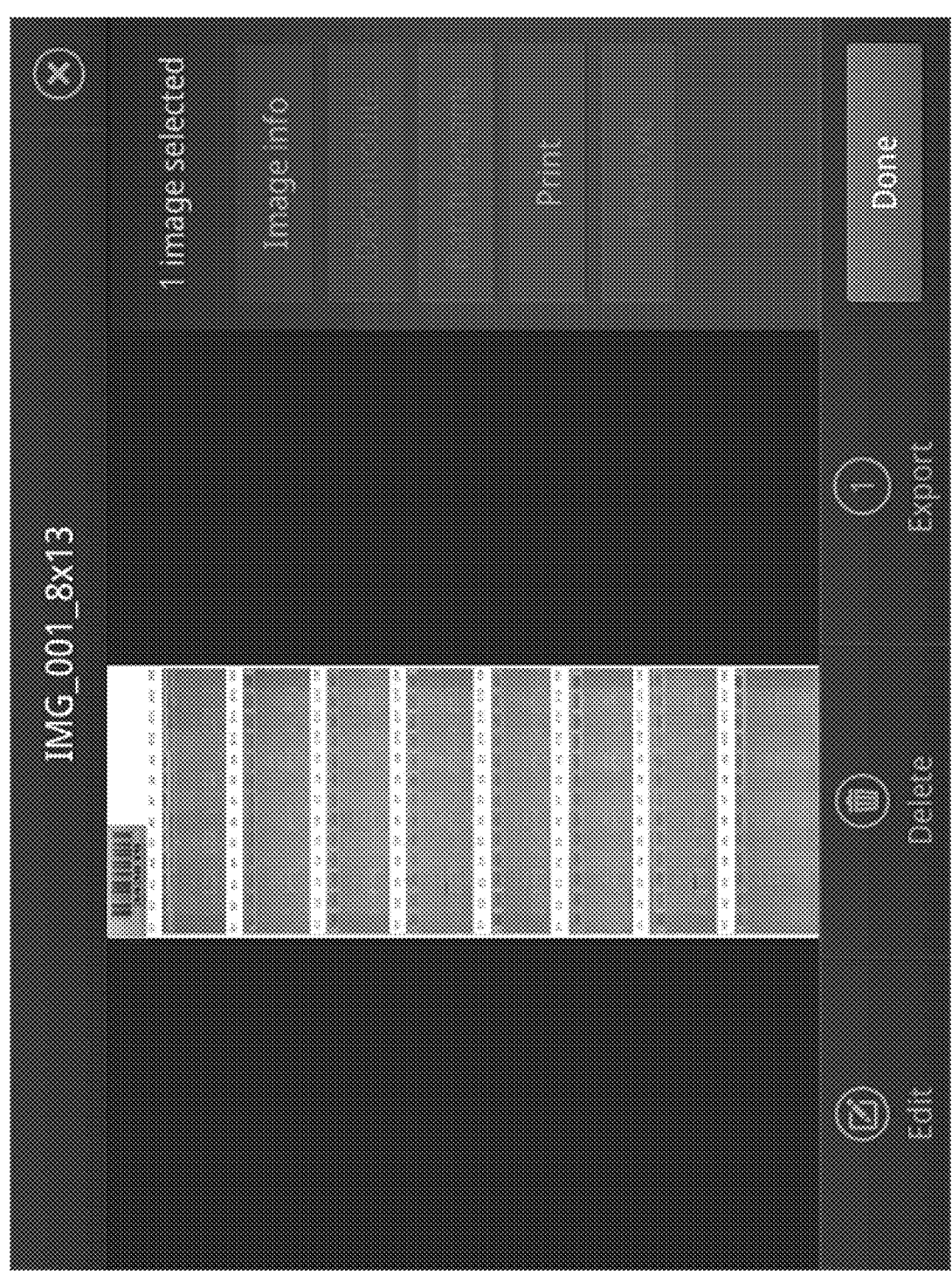
FIGS. 40A, 40B, and 40C illustrate example deconvolved images, in accordance with implementations of the present disclosure.
Figure 40B:
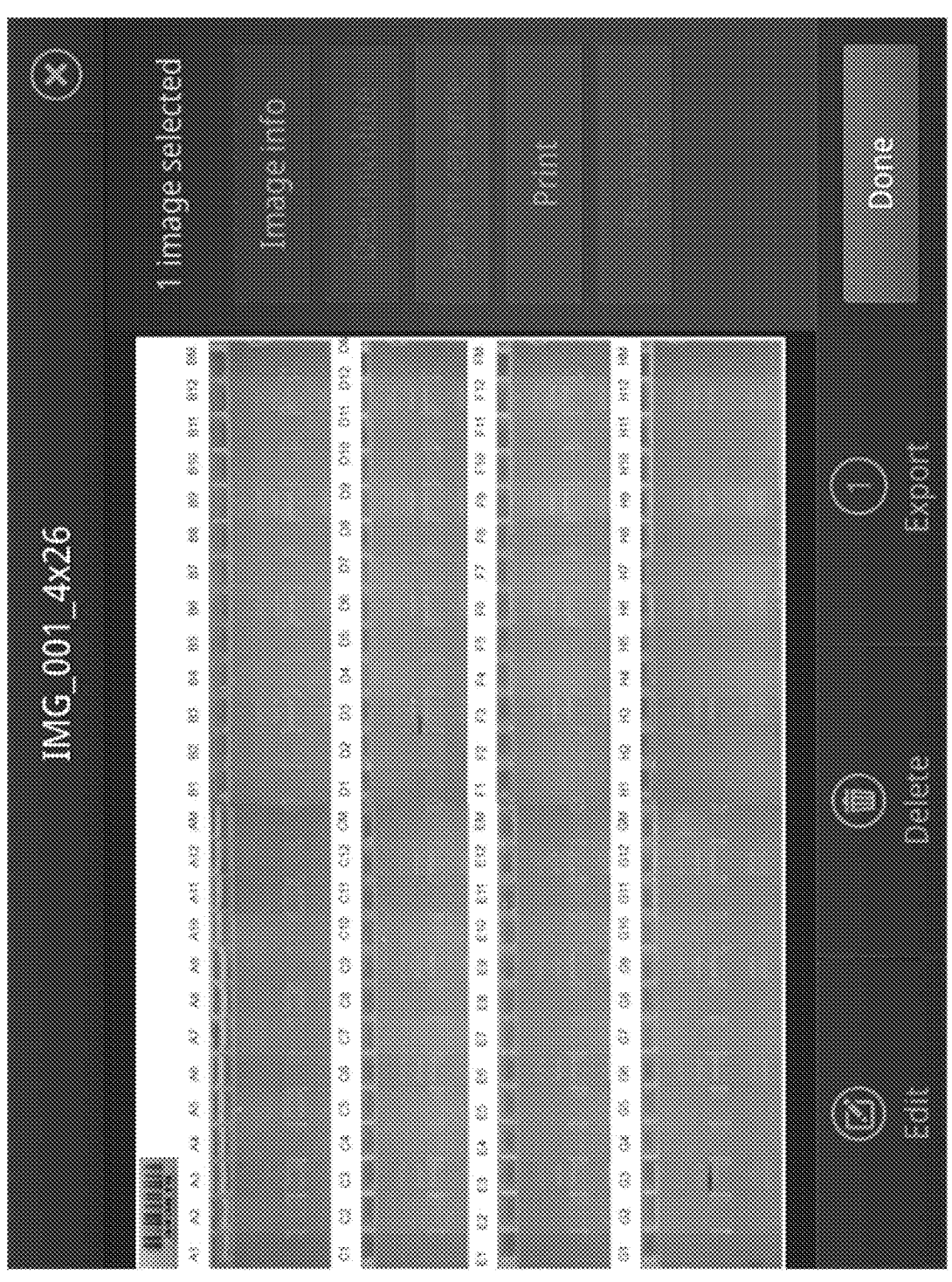
Figure 40C:
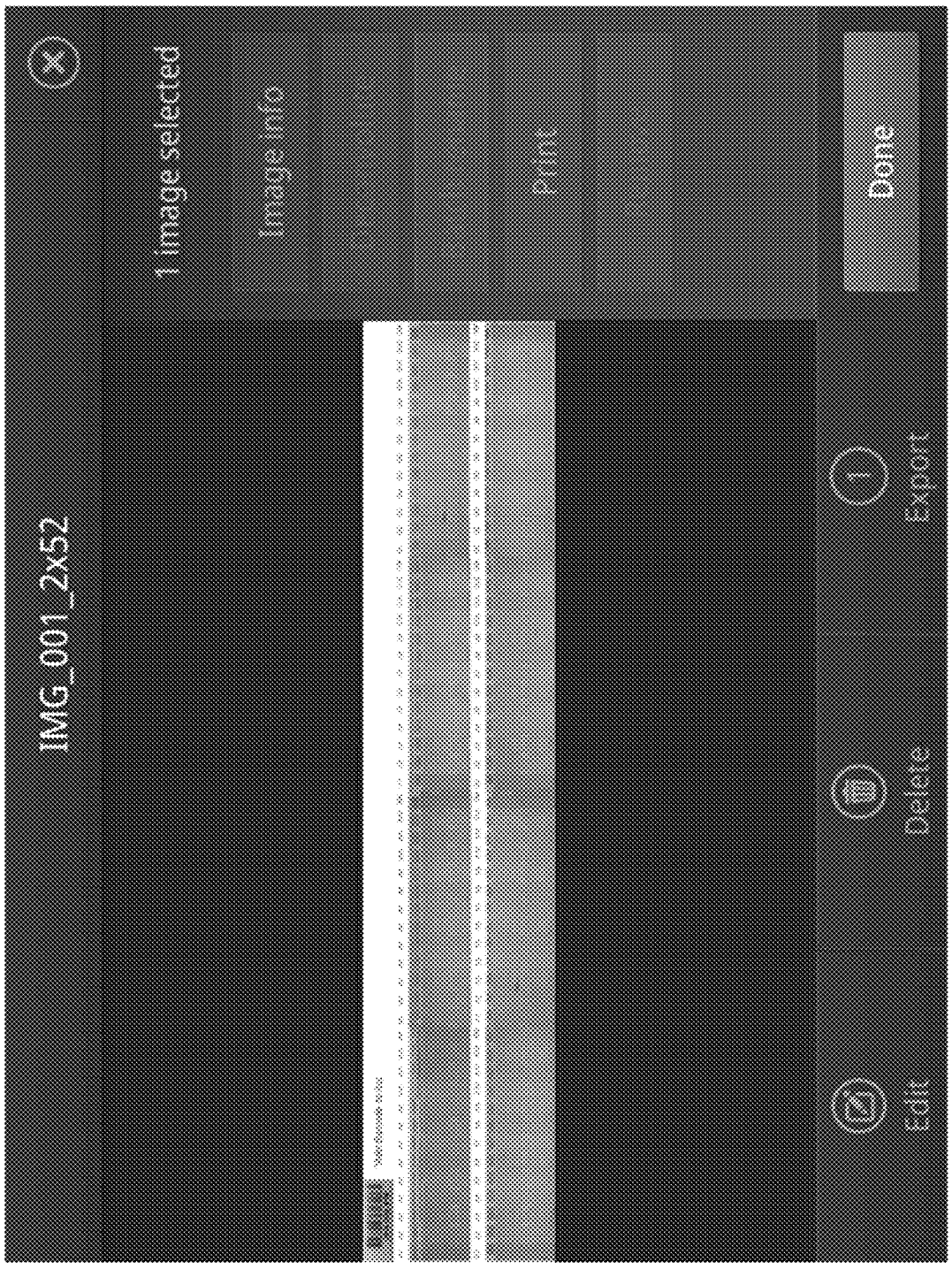

FIG. 38 shows that if the user requests deconvolution, the system may determine a well configuration of the gel (e.g., whether the gel includes a 48 well configuration or a 96 well configuration). In some implementations, as shown in FIG. 38, if a 96 well configuration is detected, the system may provide a deconvolution option upon selection of the corresponding image, or the system may provide a deconvolution format prompt, in which the user can indicate which format the user desires for the output image of the deconvolution processing. FIG. 39 illustrates an example user interface 3900 prompting a user to select an image deconvolution format indicating the number of rows and columns of lanes present in the output image (e.g., an 8×13 format, 4×26 format, or 2×52 format). FIG. 40A provides an example of the 8×13 format, FIG. 40B provides an example of the 4×26 format, and FIG. 40C provides an example of the 2×52 format. Referring again to FIG. 38, after the user selects the deconvolution format, the system may be configured to perform the deconvolution and save and/or display the output image.

In some implementations, as shown in FIG. 38, if a 48 well configuration is detected, the system may provide a user notification indicating to the user that deconvolution processing is tailored to the 96 well configuration and/or that proceeding with image deconvolution may provide undesirable results. As shown in FIG. 38, if the user requests to proceed, the deconvolution format prompt may be provided and processing may proceed as discussed above.

Additional Computer System Details

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that embodiments of the present disclosure may be practiced in network computing environments with many types of computer system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, pagers, routers, switches, wearable devices, and the like. The present disclosure may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

In some implementations, systems of the present disclosure may comprise or be configurable to execute any combination of software and/or hardware components that are operable to facilitate processing using machine learning models or other artificial intelligence-based structures/architectures. For example, one or more processors may comprise and/or utilize hardware components and/or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the present disclosure as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the presently claimed embodiments, which is defined in the appended claims. All changes which come within the meaning and range of equivalency of the claims are to be embraced within their scope.

The invention claimed is:
1. A gel electrophoresis system, comprising:
a base module, comprising:
  a cassette slot configured to receive a gel electrophoresis cassette;
  a light element configured to illuminate the gel electrophoresis cassette when the gel electrophoresis cassette is positioned within the cassette slot; and a camera module comprising a camera, wherein the camera module is selectively connectable to the base module to facilitate imaging of the gel electrophoresis cassette when the gel electrophoresis cassette is positioned within the cassette slot, wherein the base module and the camera module each comprise one or more magnets that correspond to facilitate selective connection between the camera module and the base module.

2. The gel electrophoresis system of claim 1, wherein the camera module is configured to receive power from the base module when the camera module is selectively connected over a top portion of the base module.

3. The gel electrophoresis system of claim 1, wherein the base module further comprises a fan assembly, the fan assembly comprising one or more fans configured to facilitate air cooling of contents of the gel electrophoresis cassette when the gel electrophoresis cassette is positioned within the cassette slot.

4. The gel electrophoresis system of claim 3, wherein the one or more fans are configured to direct air along an upper air cooling path that extends over a top of the gel electrophoresis cassette when the gel electrophoresis cassette is positioned within the cassette slot and wherein the one or more fans are configured to direct air along a bottom air cooling path that extends below the cassette slot.

5. The gel electrophoresis system of claim 4, wherein the bottom air cooling path extends through a heatsink positioned below a light emitting diode (LED) array positioned below the cassette slot.

6. The gel electrophoresis system of claim 1, wherein the base module further comprises an excitation filter arranged between the light element and the gel electrophoresis cassette when the gel electrophoresis cassette is positioned within the cassette slot, and wherein a distance between light element and the excitation filter is within a range of about 20 mm to about 27 mm.

7. The gel electrophoresis system of claim 1, wherein one or more spring-loaded pin connectors facilitate electrical communication between the camera module and the base module when the camera module is selectively connected to a top portion of the base module.

8. The gel electrophoresis system of claim 1, wherein the base module comprises a flex catch slot, and wherein the camera module comprises a corresponding flex catch, the flex catch slot and the corresponding flex catch being configured to engage with one another when the camera module is selectively connected over a top portion of the base module to reduce tilting motion of the camera module relative to the base module.

9. The gel electrophoresis system of claim 1, wherein the base module further comprises a viewing window configured to provide a view of the gel electrophoresis cassette when the gel electrophoresis cassette is positioned within the cassette slot, and wherein the base module further comprises a perimeter wall extending upward from the viewing window and about a perimeter of the viewing window.

10. The gel electrophoresis system of claim 9, wherein the camera module defines an imaging chamber on an underside thereof, the imaging chamber being configured to be disposed over the viewing window when the camera module is selectively connected to the base module, the camera module further comprising an engagement wall configured to reside over the viewing window and within a perimeter defined by the perimeter wall of the base module when the camera module is selectively connected to the base module.

11. The gel electrophoresis system of claim 1, wherein the camera module comprises an air inlet path.

12. The gel electrophoresis system of claim 1, wherein the camera module further comprises a camera adjustment stage supporting the camera.

13. The gel electrophoresis system of claim 12, wherein the camera module further comprises a lens assembly extending from the camera adjustment stage.

14. The gel electrophoresis system of claim 13, wherein the lens assembly comprises a lens sleeve, the lens sleeve housing a lens, the lens sleeve being rotatable to facilitate focusing of the lens.

15. The gel electrophoresis system of claim 14, wherein the lens assembly comprises an octopus ring that facilitates optical alignment between the camera and the lens.

16. The gel electrophoresis system of claim 1, wherein the camera module further comprises a supercapacitor array, the supercapacitor array being configured to become charged when the camera module is selectively connected to the base module, the supercapacitor array being configured, when charged, to supply power to one or more components of the camera module when the camera module is selectively disconnected from the base module.

17. The gel electrophoresis system of claim 1, further comprising:
one or more processors; and
one or more hardware storage devices storing instructions that are executable by the one or more processors to configure the gel electrophoresis system to:
obtain an image captured by the camera, the image capturing an electrophoresis gel positioned within a gel electrophoresis cassette positioned within the cassette slot;
perform a gel size differentiation operation configured to determine a size of the electrophoresis gel;
in response to determining that the size of the electrophoresis gel satisfies a threshold, perform a well configuration detection operation to determine a configuration of wells of the electrophoresis gel; and
perform an image deconvolution operation based on the image to generate a deconvolved image.

18. The gel electrophoresis system of claim 17, wherein the gel size differentiation operation comprises:
performing an edge detection operation to detect a presence of wells within the electrophoresis gel;
performing a region of interest operation, the region of interest operation comprising identifying a region of interest within the image, cropping the image based on the region of interest to generate a cropped image, and rotating the cropped image if necessary to cause a long edge of the cropped image to become a horizontal edge; and
applying a threshold to the cropped image to identify a label within the cropped image, wherein presence of the label along a right side or left side of the cropped image indicates a first gel size, and wherein presence of the label along a top or a bottom of the cropped image indicates a second gel size.

19. The gel electrophoresis system of claim 18, wherein the well configuration detection operation comprises:
removing a label region from the image, generating a modified image;
applying edge detection to the modified image to identify well edges, generating a well edge image; and
applying a threshold to the well edge image to generate a well contour image.

20. A gel electrophoresis system, comprising:
a base module, comprising:

a cassette slot configured to receive a gel electrophoresis cassette;

a light element configured to illuminate the gel electrophoresis cassette when the gel electrophoresis cassette is positioned within the cassette slot; and a camera module comprising a camera, wherein the camera module is selectively connectable to the base module to facilitate imaging of the gel electrophoresis cassette when the gel electrophoresis cassette is positioned within the cassette slot, wherein the camera module comprises an air inlet path.

21. The gel electrophoresis system of claim 20, wherein the base module further comprises a fan assembly, the fan assembly comprising one or more fans configured to facilitate air cooling of contents of the gel electrophoresis cassette when the gel electrophoresis cassette is positioned within the cassette slot.

22. The gel electrophoresis system of claim 20, wherein the camera module further comprises a supercapacitor array, the supercapacitor array being configured to become charged when the camera module is selectively connected to the base module, the supercapacitor array being configured, when charged, to supply power to one or more components of the camera module when the camera module is selectively disconnected from the base module.

23. The gel electrophoresis system of claim 20, further comprising:

one or more processors; and one or more hardware storage devices storing instructions that are executable by the one or more processors to configure the gel electrophoresis system to:

obtain an image captured by the camera, the image capturing an electrophoresis gel positioned within a gel electrophoresis cassette positioned within the cassette slot;

perform a gel size differentiation operation configured to determine a size of the electrophoresis gel;

in response to determining that the size of the electrophoresis gel satisfies a threshold, perform a well configuration detection operation to determine a configuration of wells of the electrophoresis gel; and perform an image deconvolution operation based on the image to generate a deconvolved image.

24. A gel electrophoresis system, comprising:

a base module, comprising:

a cassette slot configured to receive a gel electrophoresis cassette;

a light element configured to illuminate the gel electrophoresis cassette when the gel electrophoresis cassette is positioned within the cassette slot; and a camera module comprising a camera, wherein the camera module is selectively connectable to the base module to facilitate imaging of the gel electrophoresis cassette when the gel electrophoresis cassette is positioned within the cassette slot, wherein the camera module further comprises a supercapacitor array, the supercapacitor array being configured to become charged when the camera module is selectively connected to the base module, the supercapacitor array being configured, when charged, to supply power to one or more components of the camera module when the camera module is selectively disconnected from the base module.

25. The gel electrophoresis system of claim 24, further comprising:

one or more processors; and one or more hardware storage devices storing instructions that are executable by the one or more processors to configure the gel electrophoresis system to:

obtain an image captured by the camera, the image capturing an electrophoresis gel positioned within a gel electrophoresis cassette positioned within the cassette slot;

perform a gel size differentiation operation configured to determine a size of the electrophoresis gel;

in response to determining that the size of the electrophoresis gel satisfies a threshold, perform a well configuration detection operation to determine a configuration of wells of the electrophoresis gel; and perform an image deconvolution operation based on the image to generate a deconvolved image.

26. A gel electrophoresis system, comprising:

a base module, comprising:

a cassette slot configured to receive a gel electrophoresis cassette;

a light element configured to illuminate the gel electrophoresis cassette when the gel electrophoresis cassette is positioned within the cassette slot;

a camera module comprising a camera, wherein the camera module is selectively connectable to the base module to facilitate imaging of the gel electrophoresis cassette when the gel electrophoresis cassette is positioned within the cassette slot;

one or more processors; and one or more hardware storage devices storing instructions that are executable by the one or more processors to configure the gel electrophoresis system to:

obtain an image captured by the camera, the image capturing an electrophoresis gel positioned within a gel electrophoresis cassette positioned within the cassette slot;

perform a gel size differentiation operation configured to determine a size of the electrophoresis gel;

in response to determining that the size of the electrophoresis gel satisfies a threshold, perform a well configuration detection operation to determine a configuration of wells of the electrophoresis gel; and perform an image deconvolution operation based on the image to generate a deconvolved image.

* * * * *